US012776506B2

(12) United States Patent
Smith et al.

(10) Patent No.: US 12,776,506 B2
(45) Date of Patent: Oct. 27, 2026

(54) FLOW CHANNELS FOR OPTIMAL OR IMPROVED DELIVERY OF FLUID TO POROUS ELECTROCHEMICAL / CHEMICAL MEDIA

(71) Applicant: THE BOARD OF TRUSTEES OF THE UNIVERSITY OF ILLINOIS, Urbana, IL (US)

(72) Inventors: Kyle Christopher Smith, Champaign, IL (US); Erik Richard Reale, Martinez, CA (US); Irwin Cunnie Loud, IV, Oak Park, IL (US); Vu Quoc Do, Urbana, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 784 days.

(21) Appl. No.: 17/980,017

(22) Filed: Nov. 3, 2022

(65) Prior Publication Data

US 2023/0142846 A1 May 11, 2023

Related U.S. Application Data

(60) Provisional application No. 63/414,698, filed on Oct. 10, 2022, provisional application No. 63/278,140, filed on Nov. 11, 2021.

(51) Int. Cl.

| | |
|---|---|
| ***H01M 8/0265*** | (2016.01) |
| ***H01M 4/86*** | (2006.01) |
| ***H01M 4/88*** | (2006.01) |
| ***H01M 8/0258*** | (2016.01) |
| ***H01M 8/0438*** | (2016.01) |
| ***H01M 8/04746*** | (2016.01) |

(Continued)

(52) U.S. Cl.
CPC ........... *H01M 8/188* (2013.01); *H01M 4/861* (2013.01); *H01M 4/8626* (2013.01); *H01M 4/8878* (2013.01); *H01M 8/0258* (2013.01); *H01M 8/04432* (2013.01); *H01M 8/04783* (2013.01); *B33Y 80/00* (2014.12)

(58) Field of Classification Search
CPC ............... H01M 8/188; H01M 8/0258; H01M 8/04432; H01M 8/04783; H01M 4/861; H01M 4/8626; H01M 4/8878
See application file for complete search history.

(56) References Cited

U.S. PATENT DOCUMENTS

| | | | |
|---|---|---|---|
| 8,857,182 | B1 | 10/2014 | Roper et al. |
| 9,648,782 | B2 | 5/2017 | Brunschwiler et al. |
| 11,053,142 | B2 | 7/2021 | Smith et al. |

(Continued)

OTHER PUBLICATIONS

Galarneau, Anne , et al., "Synthesis and Textural Characterization of Mesoporous and Meso-/Macroporous Silica Monoliths Obtained by Spinodal Decomposition", Inorganics 2016, 4, 9; doi:10.3390/inorganics4020009, Apr. 18, 2016, 25 Pages.

(Continued)

*Primary Examiner* — James Lee
(74) *Attorney, Agent, or Firm* — Guntin & Gust, PLC; Kenneth S. Kwan

(57) ABSTRACT

Aspects of the subject disclosure may include, for example, a porous electrode that includes a porous layer, and a pattern of flow channels defined in the porous layer, wherein a first flow channel in the pattern of flow channels has a shape that at least partially approximates a cube-root profile. Additional embodiments are disclosed.

20 Claims, 29 Drawing Sheets

200

(51) Int. Cl.
*H01M 8/18* (2006.01)
*B33Y 80/00* (2015.01)

(56) References Cited

U.S. PATENT DOCUMENTS

| | | | |
|---|---|---|---|
| 2007/0105000 | A1 | 5/2007 | Chapman et al. |
| 2017/0288243 | A1 | 10/2017 | Thomsen et al. |
| 2019/0088972 | A1 | 3/2019 | Hanafusa et al. |
| 2019/0221867 | A1 | 7/2019 | Gambini et al. |
| 2019/0318055 | A1 | 10/2019 | Gerard et al. |
| 2023/0155136 | A1 | 5/2023 | Smith |
| 2024/0194898 | A1 | 6/2024 | Suzuki et al. |

OTHER PUBLICATIONS

Agbangla, et al., "Experimental investigation of pore clogging by microparticles: Evidence for a critical flux density of particle yielding arches and deposits", Sep. 21, 2012, 7 pages.
Ahn, et al., "High performance electrochemical saline water desalination using silver and silver-chloride electrodes", Nov. 28, 2019, 7 pages.
Ahn, et al., "Nafion-coated Prussian blue electrodes to enhance the stability and efficiency of battery desalination system", Nov. 21, 2020, 8 pages.
Alewell, et al., "Global phosphorus shortage will be aggravated by soil erosion", 2020, 12 pages.
Alexander, et al., "Differences in Phosphorus and Nitrogen Delivery to The Gulf of Mexico from the Mississippi River Basin", 2008, 9 pages.
Anderson, et al., "Capacitive deionization as an electrochemical means of saving energy and delivering clean water. Comparison to present desalination practices: Will it compete?", Feb. 12, 2010, 12 pages.
Aparicio, et al., "Thermal decomposition of Prussian blue under inert atmosphere", Sep. 14, 2011, 9 pages.
Autebert, et al., "Microfluidic: An innovative tool for efficient cell sorting", Jul. 11, 2012, 11 pages.
Bacchin, et al., "Colloidal surface interactions and membrane fouling: Investigations at pore scale", Oct. 26, 2010, 10 pages.
Bai, et al., "Preparation of Sodium Sulfonates Using by Copper as Catalyst", Sep. 30, 2014, 3 pages.
Balasubramanian, "X-Ray Absorption Studies of Poly(vinylferrocene) Polymers for Anion Separation", Jul. 16, 2002, 7 pages.
Behdani, et al., "Shape-based separation of micro-/ nanoparticles in liquid phases", Oct. 23, 2018, 27 pages.
Ben, et al., "Targeted Synthesis of a Porous Aromatic Framework with High Stability and Exceptionally High Surface Area", 2009, 4 pages.
Bhagat, et al., "Microfluidics for cell separation", Apr. 23, 2010, 16 pages.
Bhat, et al., "Reducing impedance to ionic flux in capacitive deionization with Bitortuous activated carbon electrodes coated with asymmetrically charged polyelectrolytes", Feb. 27, 2019, 9 pages.
Bhattarai, et al., "Advanced porous electrodes with flow channels for vanadium redox flow battery", Dec. 4, 2016, 8 pages.
Bhuiyan, et al., "A Solubility and Thermodynamic Study of Struvite", May 11, 2010, 13 pages.
Biesheuvel, et al., "Capacitive Deionization—defining a class of desalination technologies", Jul. 18, 2017, 3 pages.
Biesheuvel, "Thermodynamic cycle analysis for capacitive deionization", Jan. 22, 2009, 7 pages.
Bitaw, et al., "Low-recovery, energy-consumption, emission hybrid systems of seawater desalination: Energy optimization and cost analysis", Jul. 26, 2019, 12 pages.
Bocarsly, et al., "Effects of Surface Structure on Electrode Charge Transfer Properties Induction of Ion Selectivity at Tee Chemically Derivatized Interface", 1982, 6 pages.
Boiarkina, et al., "Prediction of Future Phosphate Rock: A Demand Based Model", Jun. 4, 2017, 13 pages.
Bortolin, et al., "CFD study on electrolyte distribution in redox flow batteries", 2015, 11 pages.
Brouder, et al., "Interpreting Nitrate Concentration in Tile Drainage Water", 2005, 7 pages.
Bruckenstein, et al., "Time-Resolved Mono-anion, Di-anion, and Solvent Transfers into a Poly(vinylferrocene)-Modified Electrode", 1997, 4 pages.
Brushett, et al., "On Lifetime and Cost of Redox-Active Organics for Aqueous Flow Batteries", Feb. 20, 2020, 6 pages.
Byars-Winston, et al., "Influence of Social Cognitive and Ethnic Variables on Academic Goals of Underrepresented Students in Science and Engineering: A Multiple-Groups Analysis", Apr. 1, 2011, 27 pages.
Cao, et al., "Na3V2(PO4)3@C as Faradaic Electrodes in Capacitive Deionization for High-Performance Desalination", 2019, 6 pages.
Cao, et al., "The effect of guanidinium functionalization on the structural properties and anion affinity of polyelectrolyte multilayers", Nov. 24, 2015, 10 pages.
Cerbelaud, et al., "Understanding the Structure of Electrodes in Li-Ion Batteries: A Numerical Study", May 14, 2015, 9 pages.
Chambers, et al., "Conductances of Concentrated Aqueous Sodium and Potassium Chloride Solutions at 25 Degrees", 1956, 2 pages.
Chen, et al., "Directed self-assembly of a colloidal kagome lattice", Jan. 20, 2011, 6 pages.
Chen, et al., "Efficient fast-charging of lithium-ion batteries enabled by laser-patterned three-dimensional graphite anode architectures", Jun. 27, 2020, 9 pages.
Chen, et al., "Nucleation, growth, and superlattice formation of nanocrystals observed in liquid cell transmission electron microscopy", 2020, 14 pages.
Chen, et al., "Supracolloidal Reaction Kinetics of Janus Spheres", Jan. 14, 2011, 5 pages.
Chowdhury, et al., "Key sustainability challenges for the global phosphorus resource, their implications for global food security, and options for mitigation", Jul. 4, 2016, 19 pages.
Cieslik, et al."A review of phosphorus recovery methods at various steps of wastewater treatment and sewage sludge management. The concept of "no solid waste generation" and analytical methods", Nov. 21, 2016, 13 pages.
Cordell, et al., "The story of phosphorus: Global food security and food for thought", 2009, 14 pages.
Craig, Paul, "Synthesis of Ion Exchange Resins", 1953, 12 pages.
Cremer, et al., "Collaborative routes to clarifying the murky waters of aqueous supramolecular chemistry", 2018, 9 pages.
Darling, et al., "The Influence of Electric Field on Crossover in Redox-Flow Batteries", Jul. 15, 2015, 10 pages.
Darling, et al., "The Influence of Electrode and Channel Configurations on Flow Battery Performance", Jun. 20, 2014, 8 pages.
Davis, et al., "Production of Acids and Bases for Ion Exchange Regeneration from Dilute Salt Solutions Using Bipolar Membrane Electrodialysis", Aug. 18, 2015, 6 pages.
Dennison, et al., "Enhancing Mass Transport in Redox Flow Batteries by Tailoring Flow Field and Electrode Design", Nov. 17, 2015, 8 pages.
Devendran, et al., "Diffraction-based acoustic manipulation in microchannels enables continuous particle and bacteria focusing", Jul. 2020, 15 pages.
Di Carlo, Dino, "Inertial microfluidics", Sep. 22, 2009, 9 pages.
Diogo, et al., "Separation Technologies for Stem Cell Bioprocessing", Aug. 22, 2012, 12 pages.
Do, et al., "A numerical modeling study on inertial focusing of microparticle in spiral microchannel", Jul. 21, 2020, 13 pages.
Doornbusch, et al., "Fluidized bed electrodes with high carbon loading for water desalination by capacitive deionization", 2016, 6 pages.
Dressaire, et al., "Clogging of microfluidic systems", 2016, 12 pages.
El Azhar, et al., "Remineralization of Reverse Osmosis (RO)-desalted water for a Moroccan desalination plant: optimization and cost evaluation of the lime saturator post", Jun. 23, 2012, 5 pages.

(56) References Cited

OTHER PUBLICATIONS

Elimelech, et al., "The Future of Seawater Desalination: Energy, Technology, and the Environment", Aug. 5, 2011, 7 pages.
Elloian, et al., "Ablation of piezoelectric polyvinylidene fluoride with a 193 nm excimer laser", Mar. 11, 2020, 9 pages.
Fogarty, et al., "Coral spawning, unsynchronized", Sep. 6, 2019, 3 pages.
Garbin, et al., "Acoustophoresis of disk-shaped microparticles: A numerical and experimental study of acoustic radiation forces and torques", 2015, 12 pages.
Garcia-Salaberri, et al., "Modeling the Effect of Channel Tapering on the Pressure Drop and Flow Distribution Characteristics of Interdigitated Flow Fields in Redox Flow Batteries", Jul. 1, 2020, 26 pages.
Gecys, et al., "CIGS thin-film solar module processing: case of high-speed laser scribing", Jan. 13, 2017, 9 pages.
George, et al., "Interaction of 157-nm excimer laser radiation with fluorocarbon polymers", Apr. 21, 2009, 4 pages.
Gillis, et al., "Iterative Cross-CoupIng with MIDA Boronates: Towards a General Platform for Small Molecule Synthesis", Apr. 18, 2012, 35 pages.
Gower, Malcolm, "Industrial applications of laser micromachining", Jul. 17, 2000, 12 pages.
Griffiths, et al., "A combined network model for membrane fouling", Jun. 26, 2014, 9 pages.
Grzelczak, et al., "Stimuli-responsive self-assembly of nanoparticles", 2019, 20 pages.
Guan, et al., "Spiral microchannel with rectangular and trapezoidal cross-sections for size based particle separation", Mar. 18, 2013, 9 pages.
Guedes, et al., "Phosphorus Recovery in Sewage Sludge by Electrokinetic Based Technologies: A Multivariate and Circular Economy View", Jun. 15, 2017, 10 pages.
Guyes, et al., "Several orders of magnitude increase in the hydraulic permeability of flow-through capacitive deionization electrodes via laser perforations", 2017, 6 pages.
H. Strathmann, , "Electrodialysis, a mature technology with a multitude of new applications", Apr. 29, 2010, 21 pages.
Ha, et al., "Estimating the system price of redox flow batteries for grid storage", 2015, 40 pages.
Han, et al., "Exploring the impact of pore size distribution on the performance of carbon electrodes for capacitive deionization", May 24, 2014, 7 pages.
Hawks, et al., "Performance metrics for the objective assessment of capacitive deionization systems", Nov. 12, 2018, 12 pages.
Hou, et al., "A comparative study of electrosorption selectivity of ions by activated carbon electrodes in capacitive deionization", Feb. 13, 2013, 6 pages.
Huang, et al., "Carbon electrodes for capacitive deionization", Nov. 16, 2016, 27 pages.
Ihsanullah, et al., "Desalination and environment: A critical analysis of impacts, mitigation strategies, and greener desalination technologies", Mar. 19, 2021, 18 pages.
Ikeshoji, Tamio , "Separation of Alkali Metal Ions by Intercalation into a Prussian Blue Electrode", 1986, 3 pages.
Inoue, et al., "Thermal stability of poly(vinylidene fluoride) films pre-annealed at various temperatures", Jul. 27, 2007, 8 pages.
Jagiello, et al., "2D-NLDFT adsorption models for carbon slit-shaped pores with surface energetical heterogeneity and geometrical corrugation", Dec. 27, 2012, 11 pages.
Jeon, et al., "Desalination via a new membrane capacitive deionization process utilizing flow-electrodes", Mar. 4, 2013, 5 pages.
Jiang, et al., "Water electro-transport with hydrated cations in electrodialysis", Mar. 10, 2015, 9 pages.
Jones, et al., "The state of desalination and brine production: A global outlook", Dec. 7, 2018, 14 pages.
Kandemir, et al., "Selective Particle Filtering in a Large Acoustophoretic Serpentine Channel", May 9, 2019, 10 pages.
Ketterings, et al., "Soil pH for Field Crops", 2005, 2 pages.
Khoeini, et al., "Microfluidic enhancement of self-assembly systems", Apr. 9, 2021, 15 pages.
Kilpimaa, et al., "Removal of phosphate and nitrate over a modified carbon residue from biomass gasification", Apr. 4, 2014, 11 pages.
Kim, et al., "Ammonium Removal from Domestic Wastewater Using Selective Battery Electrodes", Aug. 13, 2018, 6 pages.
Kim, et al., "Clogging mechanism of poly(styrene) particles in the flow through a single micro-pore", Apr. 8, 2017, 8 pages.
Kim, et al., "In Situ Electron Microscopy Imaging and Quantitative Structural Modulation of Nanoparticle Superlattices", Oct. 10, 2016, 8 pages.
Kim, et al., "Reconfigurable polymer shells on shape-anisotropic gold nanoparticle cores", 2018, 21 pages.
Kim, et al., "Tip-Patched Nanoprisms from Formation of Ligand Islands", Jul. 17, 2019, 5 pages.
Kingsbury, et al., "Microstructure Determines Water and Salt Permeation in Commercial Ion-Exchange Membranes", Oct. 25, 2018, 12 pages.
Neang, et al., "A Microfluidic Fuel Cell with Flow-Through Porous Electrodes", Nov. 18, 2021, 7 pages.
Koelle, et al., "Permethylated Electron-Excess Metallocenes", 1980, 2 pages.
Lee, et al., "Rocking Chair Desalination Battery Based on Prussian Blue Electrodes", Apr. 26, 2017, 7 pages.
Lehmann, et al., "Towards the generalized iterative synthesis of small molecules", Feb. 7, 2018, 20 pages.
Lei, et al., "Boosting lithium storage in covalent organic framework via activation of 14-electron redox chemistry", 2018, 13 pages.
Li, et al., "Faradaic Electrodes Open a New Era for Capacitive Deionization", 2020, 52 pages.
Lin, et al., "Covalent organic frameworks comprising cobalt porphyrins for catalytic CO2 reduction in water", Sep. 11, 2015, 7 pages.
Liu, et al., "Electricity generation using continuously recirculated flow electrodes in reverse electrodialysis", Apr. 25, 2017, 5 pages.
Liu, et al., "Linking the polyatomic arrangements of interstitial H2O and cations to bonding within Prussian blue analogues ab initio using gradient-boosted machine learning", Mar. 8, 2021, 21 pages.
Liu, et al., "Modeling of electrochemical deionization across length scales: Recent accomplishments and new opportunities", May 21, 2020, 8 pages.
Liu, , "Simple technique for measurements of pulsed Gaussian-beam spot sizes", May 1982, 3 pages.
Luo, et al., "Hierarchical self-assembly of 3D lattices from polydisperse anisometric colloids", 2019, 9 pages.
Machado, et al., "Separation by Cell Size Enriches for Mammary Stem Cell Repopulation Activity", Feb. 13, 2013, 5 pages.
Majchrzak, et al., "An efficient catalytic synthesis and characterization of new styryl-ferrocenes and their trans-pi-conjugated organosilicon materials", 2016, 8 pages.
Margenot, et al., "Toward a Regional Phosphorus (Re)cycle in the US Midwest", Jul. 30, 2019, 17 pages.
Marschewski, et al., "3D-printed fluidic networks for high-power-density heat-managing miniaturized redox flow batteries", 2017, 14 pages.
Marschewski, et al., "3D-printed fluidic networks for high-power-density heat-managing miniaturized redox flow batteries", Jan. 31, 2017, 8 pages.
Martel, et al., "Inertial Focusing in Microfluidics", May 29, 2014, 28 pages.
Masaeli, et al., "Continuous Inertial Focusing and Separation of Particles by Shape", Sep. 12, 2012, 13 pages.
Matthews, et al., "Microfluidic voltammetry: simulation of the chronoamperometric response of microband electrodes sited within microreactors", Jul. 5, 2006, 9 pages.
Mauter, et al., "Desalination for a circular water economy", 2020, 4 pages.
McGrath, et al., "Deterministic lateral displacement for particle separation: a review", 2014, 20 pages.
Metzger, et al., "Techno-economic analysis of capacitive and intercalative water deionization", 2020, 17 pages.
Moussa, et al., "A comprehensive review of electrocoagulation for water treatment: Potentials and challenges", Sep. 11, 2016, 18 pages.

(56) References Cited

OTHER PUBLICATIONS

Nam, et al., "Bismuth as a New Chloride-Storage Electrode Enabling the Construction of a Practical High Capacity Desalination Battery", Aug. 4, 2017, 9 pages.
Neal, et al., "Interfacial Supramolecular Structures of Amphiphilic Receptors Drive Aqueous Phosphate Recognition", Apr. 26, 2019, 11 pages.
Neild, et al., "Growing Season Characteristics and Requirements inthe Corn Belt", 1988, 11 pages.
Nemani, et al., "Assignment of energy loss contributions in redox flow batteries using exergy destruction analysis", Oct. 29, 2019, 13 pages.
Nemani, et al., "Uncovering the role of flow rate in redox-active polymer flow batteries: simulation of reaction distributions with simultaneous mixing in tanks", Jul. 4, 2017, 11 pages.
Neuenschwander, et al., "Surface structuring with ultra-short laser pulses: Basics, limitations and needs for high throughput", 2014, 12 pages.
Nguyen, et al., "An OpenFOAM solver for multiphase and turbulent flow", Apr. 6, 2020, 13 pages.
Nir, et al., "Closing the cycle: Phosphorus removal and recovery from diluted effluents using acid resistive membranes", 2018, 9 pages.
Nürnberg, et al., "Trophic state decrease after lanthanum-modified bentonite (Phoslock) application to a hypereutrophic polymictic urban lake frequented by Canada geese (*Branta canadensis*)", Feb. 16, 2016, 16 pages.
Oliveira, et al., "Improving the energy efficiency of an electrodialytic process to extract phosphorus from municipal solid waste digestate through different strategies", 2019, 9 pages.
Ou, et al., "Kinetic pathways of crystallization at the nanoscale", Apr. 2020, 7 pages.
Ou, et al., "Liquid-phase TEM imaging of self-assembly pathways of anisotropic nanoparticles", 2019, 2 pages.
Ou, et al., "Nanoscale Cinematography of Soft Matter System under Liquid-Phase TEM", Oct. 9, 2020, 12 pages.
Paltrinieri, et al., "Functionalized Anion-Exchange Membranes Facilitate Electrodialysis of Citrate and Phosphate from Model Dairy Wastewater", 2019, 9 pages.
Paltrinieri, et al., "Hybrid polyelectrolyte-anion exchange membrane and its interaction with phosphate", 2018, 10 pages.
Pantos, et al., "Guanidinium group: A versatile moiety inducing transport and multicompartmentalization in complementary membranes", 2008, 13 pages.
Pasta, et al., "A Desalination Battery", 2012, 5 pages.
Phillips, et al., "High speed, intermediate resolution, large area laser beam induced current imaging and laser scribing system for photovoltaic devices and modules", Sep. 21, 2016, 7 pages.
Poorasgari, et al., "Fouling of enhanced biological phosphorus removal-membrane bioreactors by humic-like substances", Jul. 9, 2014, 7 pages.
Porada, et al., "Nickel Hexacyanoferrate Electrodes for Continuous Cation Intercalation Desalination of Brackish Water", Sep. 23, 2017, 10 pages.
Porneala, et al., "Time-resolved dynamics of nanosecond laser-induced phase explosion", Jul. 7, 2009, 8 pages.
Rambo, et al., "Covalent Polymers Containing Discrete Heterocyclic Anion Receptors", 2010, 53 pages.
Reale, et al., "Capacitive Performance and Tortuosity of Activated Carbon Electrodes with Macroscopic Pores", Jun. 7, 2018, 10 pages.
Reale, et al., "Effect of conductive additives on the transport properties of porous flow-through electrodes with insulative particles and their optimization for Faradaic deionization", Aug. 17, 2019, 10 pages.
Ren, et al., "A high-throughput acoustic cell sorter", 2015, 11 pages.
Sajeesh, et al., "Particle separation and sorting in microfluidic devices: a review", 2014, 52 pages.
Salafi, et al., "Advancements in microfluidics for nanoparticle separation", 2017, 23 pages.
Sauret, et al., "Clogging by sieving in microchannels: Application to the detection of contaminants in colloidal suspensions", Aug. 18, 2014, 6 pages.
Sayed, et al., "Faradic capacitive deionization (FCDI) for desalination and ion removal from wastewater", Feb. 17, 2021, 24 pages.
Schnitkey, Gary , "Historic Fertilizer, Seed, and Chemical Costs with 2019 Projections", Jun. 5, 2018, 4 pages.
Seo, et al., "A Rational Design of Highly Controlled Suzuki-Miyaura Catalyst—Transfer Polycondensation for Precision Synthesis of Polythiophenes and Their Block Copolymers: Marriage of Palladacycle Precatalysts with MIDA-Boronates", Mar. 9, 2018, 9 pages.
Sholl, et al., "Seven chemical separations to change the world", Apr. 28, 2016, 4 pages.
Shrivastava, et al., "Electron Conduction in Nanoparticle Agglomerates Limits Apparent Na+ Diffusion in Prussian Blue Analogue Porous Electrodes", Jun. 13, 2018, 12 pages.
Shrivastava, et al., "Linking capacity loss and retention of nickel hexacyanoferrate to a two-site intercalation mechanism for aqueous Mg2+ and Ca2+ ions", Aug. 28, 2019, 12 pages.
Smith, et al., "Comment on: "Na-Ion Desalination (NID) Enabled by Na-Blocking Membranes and Symmetric Na-Intercalation: Porous-Electrode Modeling"", Aug. 13, 2016, 2 pages.
Smith, et al., "Maximizing Energetic Efficiency in Flow Batteries Utilizing Non-Newtonian Fluids", Jan. 24, 2014, 12 pages.
Smith, et al., "Na-Ion Desalination (NID) Enabled by Na-Blocking Membranes and Symmetric Na-Intercalation: Porous-Electrode Modeling", Jan. 5, 2016, 12 pages.
Smith, Kyle , "Theoretical evaluation of electrochemical cell architectures using cation intercalation electrodes for desalination", Feb. 4, 2017, 9 pages.
Solvay, "Solef PVDF Design & Processing Guide", 2017, 64 pages.
Son, et al., "Improving the Thermodynamic Energy Efficiency of Battery Electrode Deionization Using Flow-Through Electrodes", Feb. 24, 2020, 8 pages.
Sosa-Fernandez, et al., "Experimental Evaluation of Anion Exchange Membranes for the Desalination of (Waste) Water Produced after Polymer-Flooding", Nov. 18, 2020, 22 pages.
Staton, et al., "Managing soil pH for optimal soybean production", Mar. 28, 2012, 4 pages.
Stone, et al., "Preferential Flow Estimates to an Agricultural Tile Drain with Implications for Glyphosate Transport", Aug. 9, 2006, 11 pages.
Strathmann, et al., "An Introduction to Membrane Science and Technology", 2006, 30 pages.
Su, et al., "Asymmetric Faradaic systems for selective electrochemical separations", Apr. 18, 2017, 12 pages.
Su, et al., "Electrochemically-mediated selective capture of heavy metal chromium and arsenic oxyanions from water", 2018, 9 pages.
Subramani, et al., "Treatment technologies for reverse osmosis concentrate vol. minimization: A review", 2014, 18 pages.
Suresh, et al., "Electrochemically mediated deionization: a review", 2021, 27 pages.
Suss, et al., "Capacitive desalination with flow-through electrodes", 2012, 10 pages.
Suss, et al., "Water desalination via capacitive deionization: what is it and what can we expect from it?", 2015, 25 pages.
Taguet, et al., "Crosslinking of Vinylidene Fluoride Containing Fluoropolymers", 2005, 49 pages.
Tang, et al., "Various cell architectures of capacitive deionization: Recent advances and future trends", 2019, 27 pages.
Tedesco, et al., "Nernst-Planck transport theory for (reverse) electrodialysis: II. Effect of water transport through ion-exchange membranes", 2017, 11 pages.
Tian, et al., "Porous Aromatic Frameworks (PAFs)", 2020, 53 pages.
Torkzaban, et al., "Colloid release and clogging in porous media: Effects of solution ionic strength and flow velocity", 2015, 11 pages.
Van Vuuren, et al., "Phosphorus demand for the 1970-2100 period: A scenario analysis of resource depletion", 2010, 12 pages.
Venkiteshwaran, et al., "Meta-analysis of non-reactive phosphorus in water, wastewater, and sludge, and strategies to convert it for enhanced phosphorus removal and recovery", 2018, 14 pages.

(56) References Cited

OTHER PUBLICATIONS

Villen-Guzman, et al., "Electrodialytic phosphorus recovery from sewage sludge ash under kinetic control", 2018, 11 pages.
Vishwanathan, et al., "Generation and application of sub-kilohertz oscillatory flows in microchannels", 2020, 10 pages.
Von Allmen, et al., "Laser-Beam Interactions with Materials", 1995, 206 pages.
Wang, et al., "Effects of flow channel geometry on cell performance for PEM fuel cells with parallel and interdigitated flow fields", 2008, 5334- 5343.
Wang, et al., "Energy Efficiency of Capacitive Deionization", 2019, 3366-3378.
Witmer, "An ethnographic justification for establishment of a contextual engineering discipline", 2019, 26 pages.
Witmer, "Contextual engineering assessment using an influence-identification tool", 2018, 23 pages.
Witmer, et al., "Contextual Engineering to Address Preservation of Rural Societies", 2018, 1-9.
Woodward, et al., "Encyclopedia of Snow, Ice and Glaciers", 2011, 40 pages.
Wu, et al., "A review of phosphorus management through the food system: identifying the roadmap to ecological agriculture", 2016, 45-54.
Wu, et al., "From Fundamental Understanding to Engineering Design of High-Performance Thick Electrodes for Scalable Energy-Storage Systems", 2021, 16 pages.
Wu, et al., "Separation of Leukocytes from Blood Using Spiral Channel with Trapezoid Cross-Section", 2012, 9324-9331.
Yan, et al., "Multistage-batch electrodialysis to concentrate high-salinity solutions: Process optimisation, water transport, and energy consumption", 2019, 245-257.
Yao, et al., "Machine Learning to Reveal Nanoparticle Dynamics from Liquid-Phase TEM Videos", 2020, 1421-1430.
Yermiyahu, et al., "Rethinking Desalinated Water Quality and Agriculture", 2007, 920-921.
Yuan, et al., "Targeted synthesis of a porous aromatic framework with a high adsorption capacity for organic molecules", 2011, 13498-13502.
Zeman, , "Modeling Farmer Decision-Making Using an Agent-Based Model for Studying Best Management Practice Adoption Rates: A Typological Approach", 2019, 122 pages.
Zhao, et al., "Energy consumption in membrane capacitive deionization for different water recoveries and flow rates, and comparison with reverse osmosis", 2013, 35-41.
X, Li , et al., "Review of bipolar plates in PEM fuel cells: Flow-field designs", International Journal of Hydrogen Energy, Elsevier, Amsterdam, NL, vol. 30, No. 4, Mar. 1, 2005 (Mar. 1, 2005), pp. 359-371, XP004739235, ISSN: 0360-3199, DOI: 10.1016/J.IJHYDENE.2004.09.019, 13 Pages.

100

200

Variation of channel width with distance along the channel for the various inlet aspect ratios $h_0/l_0$ marked in the legend (i.e., $h_0/l_0 = 0, 0.2, 0.5, 1, 2, 5, 10$, and $\infty$)

260

304

302

400

410

420

430

440

442

FLOW CHANNELS FOR OPTIMAL OR IMPROVED DELIVERY OF FLUID TO POROUS ELECTROCHEMICAL / CHEMICAL MEDIA

CROSS REFERENCE TO RELATED APPLICATIONS

This application claims the benefit of and priority to U.S. Provisional Patent Application Ser. No. 63/278,140, filed on Nov. 11, 2021, and U.S. Provisional Patent Application Ser. No. 63/414,698, filed on Oct. 10, 2022. All sections of each of the aforementioned applications are incorporated herein by reference in their entirety.

STATEMENT REGARDING FEDERALLY SPONSORED RESEARCH OR DEVELOPMENT

This invention was made with government support under 1931659 awarded by the National Science Foundation and with government support under N00014-22-1-2577 awarded by the United States Navy. The United States government has certain rights in the invention.

FIELD OF THE DISCLOSURE

The subject disclosure generally relates to flow channels for optimal or improved delivery of fluid to porous electrochemical/chemical media.

BACKGROUND

Porous electrochemical/chemical media, such as porous electrodes, may be composed of active material particles and conductive (e.g., carbon) additive particles fastened together by a binding material, with void spaces being filled with an ion-conducting liquid electrolyte. As opposed to a planar electrode, a porous electrode offers a larger area for charge transfer reactions at an electrode/electrolyte interface, and can provide improved control over the distribution of the reactions, transport of active species, and heat distribution.

BRIEF DESCRIPTION OF THE DRAWINGS

Reference will now be made to the accompanying drawings, which are not necessarily drawn to scale, and wherein.

DETAILED DESCRIPTION

Figure 1:
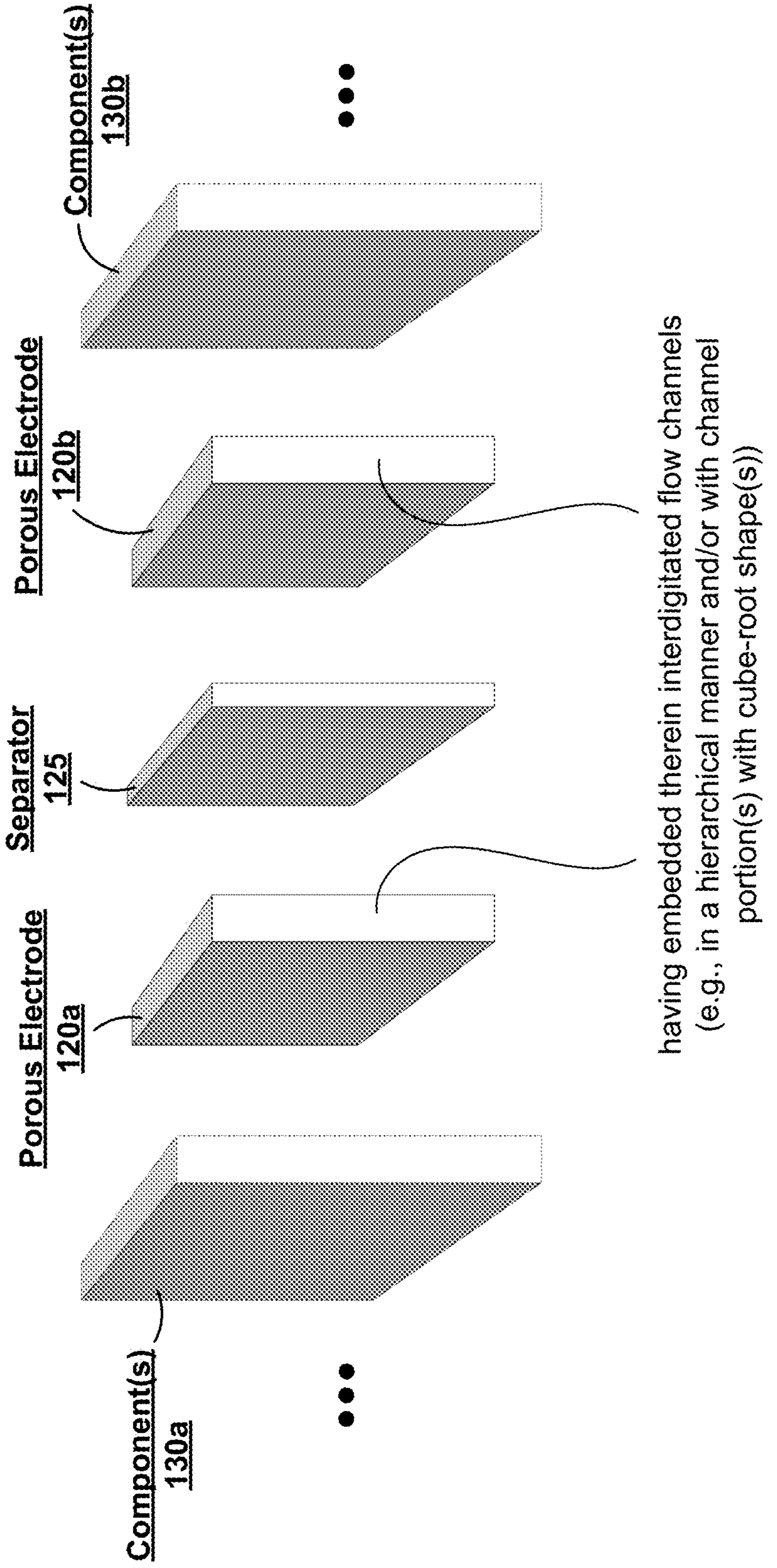
FIG. 1 is an exploded view of an example, non-limiting embodiment of a system/cell that employs porous electrodes, in accordance with various aspects described herein.

Conventional porous electrodes generally have low hydraulic permeability, and thus are incapable of supporting high flow rates at low pressures. Due to this, higher pressures may be needed to operate systems that utilize such electrodes. Forcing fluid to flow therethrough at substantial rates, however, results in increased energy consumption. Doing so also has mechanical implications—i.e., requires more robust mechanical designs—since higher pressures can burden system components with added stress.

The subject disclosure describes, among other things, illustrative embodiments of a porous electrochemical/chemical medium (or layer)—e.g., a porous electrode—having a pattern or arrangement of flow channels configured therein that provide optimal or improved delivery of fluid through the medium. In certain embodiments, a system or cell may employ a pair of such patterned, porous electrodes, with a separator disposed therebetween, and assembled with various components (e.g., bipolar plates, current collectors, manifolds, etc.) applicable for the system/cell design or functionality.

In exemplary embodiments, the pattern or arrangement of flow channels (which may also be referred to herein as microchannels) may include inlet and outlet flow channels, and may be provided or embedded in a surface of the porous electrode. In various embodiments, the pattern of flow channels may be an interdigitated arrangement design that provides flow fields that span across the porous medium, as described in more detail herein. In one or more embodiments, the profile or shape of the individual flow channels may be defined to provide optimal fluid delivery to/through the porous medium. As described herein, the flow channel profile or shape may be defined based on certain physics-based constraints, which, when applied, enable engendering of interdigitated flow channels that provide uniformized (or near uniformized) flow of fluid into or across the surface of a porous medium in directions transverse to the longitudinal direction of such channels. Based on these constraints, and under certain conditions (such as those relating to the dimensions or length scale of the flow channel's inlet/outlet), the optimal profile for (e.g., at least a portion of) a flow channel may be a tapered (or, more particularly, a cube-root) shape.

In one or more embodiments described herein, an improved configuration, profile, design, technique and so forth can be utilized rather than, or in addition to, an optimal configuration, profile, design, technique and so forth to provide desired fluid delivery to/through the porous medium.

In exemplary embodiments, the profile of a flow channel may vary along the length of the channel. In various embodiments, the overall profile may transition from being linear at one end (e.g., the inlet or outlet) of the channel to being cube-root at the other end of the channel, as described in more detail herein (e.g., with respect to FIG. 2A). It is to be appreciated and understood that, in practice, the transition may be continuous or discrete, depending on manufacturing constraints and other criteria. For larger length scale inlets/outlets (e.g., wider inlets/outlets), a linear profile may be more optimal over a cube-root profile for the entirety (or for a longer portion) of the channel. For smaller length scale inlets/outlets (e.g., more narrow inlets/outlets), a cube-root profile may be more optimal over a linear profile for the entirety (or for a longer portion) of the channel. Example system/cell implementations having porous electrodes with optimally-defined configurations/shapes of flow channels therein have been shown to provide performance improvements of multiple orders of magnitude over those having porous electrodes of different constructions.

In exemplary embodiments, the pattern of flow channels may be a hierarchical arrangement of flow channels. For example, in one or more embodiments, a porous electrode may include two, three, four, or more scales of interdigitated flow channels embedded therein, which may further enhance the fluid flow through the porous medium. In various embodiments, portions of some or all of the flow channels in the hierarchical, interdigitated pattern may be defined in accordance with the abovementioned physics-based constraints and thus at least partially exhibit, or approximate, cube-root profiles. As an example, partially exhibiting or approximating can include satisfying particular thresholds in whole or in part.

In some embodiments, the porous electrode may be a monolithic, self-supporting medium, and the pattern or arrangement of flow channels may be provided in a surface of the medium and additionally, or alternatively, in a surface of an impermeable/impervious layer that may abut the medium. In certain embodiments, the porous electrode may include an impermeable/impervious substrate and a porous medium that is supported by the substrate, where the pattern or arrangement of flow channels may be provided in a surface of the porous medium and additionally, or alternatively, in a surface of the substrate. In any case, integrating flow channels in a surface of a porous medium (or a structural component thereof), as described herein, contrasts with prior system/cell constructions in which flow channels are merely arranged in a discrete system/cell component adjacent to a porous electrode, such as a bipolar plate, a current collector, or the like. In various embodiments, optimized flow channels described herein can be implemented as replacements of conventional flow channels inside flow fields that improve over prior electrode/flow field designs. In certain system/cell embodiments, the same or a similar pattern or arrangement of flow channels may additionally, or alternatively, be provided in one or more discrete components adjacent to porous electrodes.

It is to be appreciated and understood that embodiments of the porous electrodes described herein can provide improved fluid flow dynamics in a variety of applications, including, for example, power sources (such as reduction-oxidation (redox) flow batteries and fuel cells), electrochemical separation processes (such as desalination), electrolysis cells, metal recovery processes, purification processes, enzymatic reactions, and other existing/emerging technologies in which fluid is made to flow through porous media (e.g., with simultaneous electrochemical or chemical reactions/interactions) and across a membrane.

Providing (e.g., a hierarchy of) interdigitated flow channels (e.g., including higher pressure inlet channels and lower pressure outlet channels) in a porous medium, as described herein, enables more uniform flow of fluid through the porous electrode (rather than over or around the porous electrode, such as on top of the porous electrode or behind it), which increases hydraulic permeability thereof and facilities efficient electrical energy use over other configurations that flow fluid adjacent to electrodes and not through them. This allows the electrode, or the encompassing system/cell, to be operated at significantly reduced pressures, which conserves energy resources. This also reduces or eliminates a need for system designers/manufacturers to expend additional effort on ensuring mechanical/structural integrity of the systems, which can reduce design/manufacturing complexity, time, and associated costs, and can also aid in overcoming technical barriers that may otherwise hinder advancements to existing technologies and development of new technologies.

One or more aspects of the subject disclosure include a porous electrode, comprising a porous layer, and a pattern of flow channels defined in the porous layer, wherein a first flow channel in the pattern of flow channels has a shape that at least partially approximates a cube-root profile.

One or more aspects of the subject disclosure include a system, comprising a pair of porous electrodes, and a separator disposed between the pair of porous electrodes, wherein each porous electrode of the pair of porous electrodes comprises interdigitated flow channels integrated therein, and wherein each flow channel of the interdigitated flow channels has a shape that at least partially approximates a cube-root profile or a quartic-root profile.

One or more aspects of the subject disclosure include a method, comprising obtaining a first porous electrode, and embedding a pattern of flow channels in a surface of the first porous electrode, wherein a first flow channel in the pattern of flow channels comprises a tapered profile or a linear or straight profile.

Other embodiments are described in the subject disclosure.

FIG. 1 is an exploded view of an example, non-limiting embodiment of a system or cell 100 in accordance with various aspects described herein. As shown in FIG. 1, the system 100 may include a porous electrode 120*a*, a porous electrode 120*b*, and a separator 125 disposed between the porous electrodes 120*a* and 120*b*. The separator 125 may include an exchange membrane, such as an ion exchange membrane or the like. In various embodiments, the separator 125 may be a porous or permeable interface that is non-selective or that functions with a selectivity mechanism different than ion selectivity. The porous electrodes 120*a* and 120*b* may have any suitable (e.g., arbitrary) dimensions, and may be composed of active material and conductive (e.g., carbon) additive particles held together, for example, by a binding material. In certain embodiments, void spaces in the porous electrodes 120*a* and 120*b* may be filled with an ion-conducting electrolyte. In one or more embodiments, one or more (e.g., each) of the porous electrodes 120*a* and 120*b* may include a porous medium portion and a base portion. The base portion may include an impermeable/impervious substrate, such as an insulated, inactive material (e.g., graphite, metal, and/or other material), upon which the porous medium is affixed/supported or to which the porous medium is coupled. In some embodiments, one or more (e.g., each) of the porous electrodes 120*a* and 120*b* may include a monolithic, self-supporting medium without a supporting substrate. In these embodiments, the electrode may rather be operably coupled with a solid abutting layer, such as a bi-polar plate or the like, for facilitating fluid delivery and electrical connectivity to an external circuit.

In exemplary embodiments, one or more (e.g., each) of the porous electrodes 120*a* and 120*b* may be patterned with interdigitated array(s) of tapered flow channels, with channel shapes that are optimized (e.g., as described elsewhere herein) to the particular length scale of selected channel inlet/outlet dimensions. In embodiments where a porous electrode includes a supporting substrate, the substrate may additionally, or alternatively, include interdigitated array(s) of tapered flow channels having shapes that are similarly optimized to the particular length scale of selected channel inlet/outlet dimensions.

In various embodiments, the system 100 may be (or may be included as part of) a power source (e.g., a redox flow battery or a fuel cell), an electrolysis cell, or another construction configured to facilitate enzymatic reactions, an electrochemical separation process, a metal recovery process, a purification process, or other process in which fluid is made to flow through porous media. Accordingly, the system 100 may include one or more other components 130*a*/130*b* (e.g., bipolar plates, current collectors, manifolds, etc.), as may be applicable or needed for the system/cell design or functionality. In various embodiments, such as in a case where the porous electrodes 120*a* and 120*b* are employed in a fuel cell, for example, certain components 130*a* and/or 130*b*, such as bipolar plates, may or may not be needed. In certain embodiments, one or more components 130*a* and/or 130*b* that abut the porous electrodes 120*a* and/or 120*b*, such as bipolar plates, current collectors, or the like, may additionally, or alternatively, include interdigitated array(s) of tapered flow channels having shapes that are similarly optimized to the particular length scale of selected channel inlet/outlet dimensions.

Figure 2A:
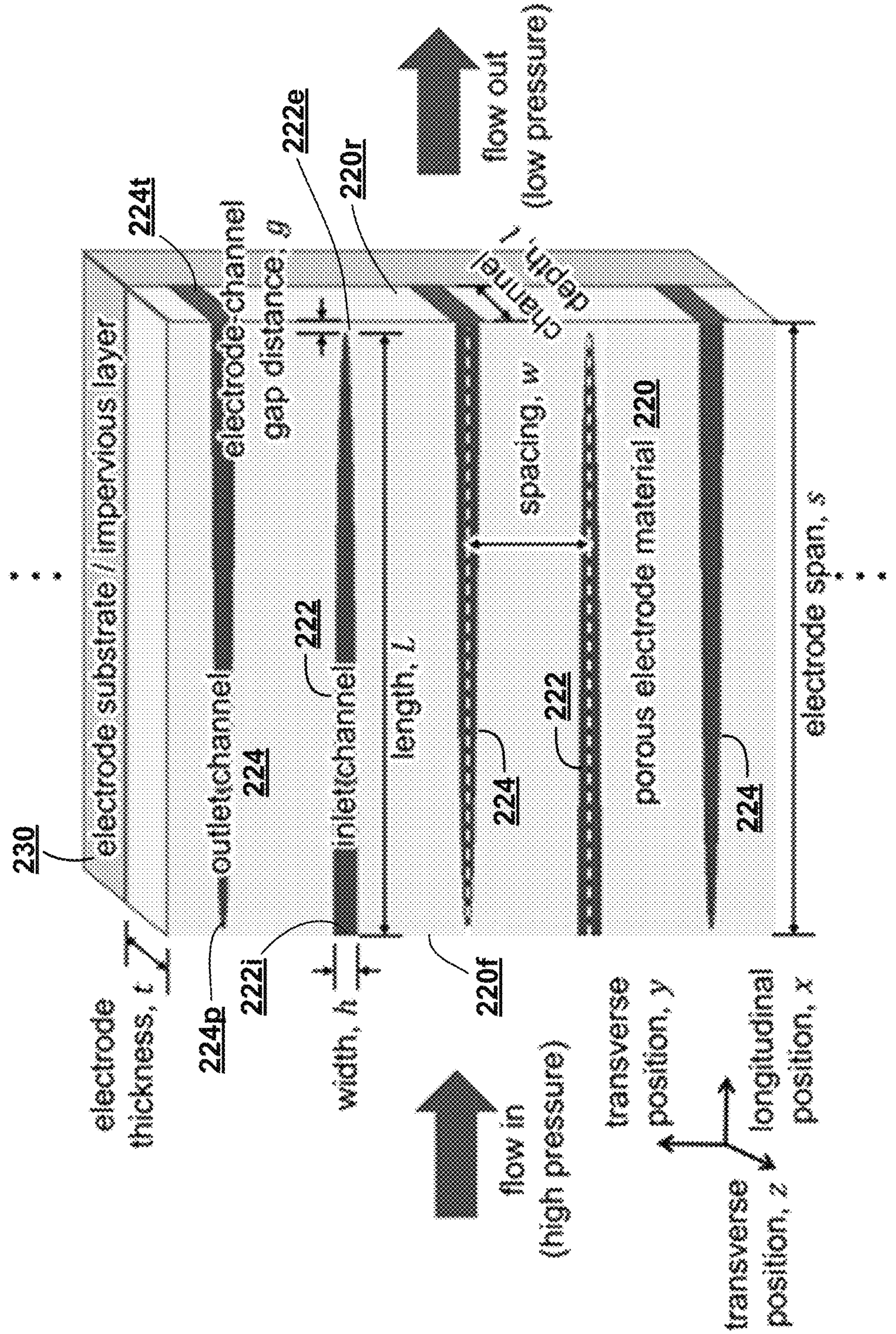
FIG. 2A is a perspective view of a portion of an example, non-limiting embodiment of a porous electrode, including flow channels embedded therein, in accordance with various aspects described herein.

FIG. 2A is a perspective view of a portion of an example, non-limiting embodiment of a porous electrode 200 in accordance with various aspects described herein. In various embodiments, the porous electrode 200 may correspond to (e.g., may be the same as or similar to) one or more of the porous electrodes 120*a* and 120*b*. In these embodiments, the porous electrode 200 may include some or all of the features described above with respect to the porous electrodes 120*a*/120*b*.

The porous electrode 200 may include an electrode substrate 230 (e.g., an impervious or impermeable layer similar to that described above with respect to the porous electrodes 120*a*/120*b*) and a porous electrode material or medium 220 disposed on the electrode substrate 230. The porous medium 220 may be composed of various types of materials and have any suitable dimensions (e.g., similar to that described above with respect to the porous electrodes 120*a*/120*b*).

As shown in FIG. 2A, the porous electrode 200 may span a length s along an x-axis and have a thickness t along a transverse z-axis. Patterned in the porous medium 220 may be an interdigitated array of flow channels that includes inlet channels 222 and outlet channels 224, with a channel spacing w between adjacent inlet/outlet channels. Although only several inlet channels and outlet channels are shown in FIG. 2A, it is to be appreciated and understood that, in various embodiments, the porous medium 220 may include more or fewer inlet channels and/or more or fewer outlet channels, and thus, there may be a repetition of the interdigitated channel pattern along a transverse y-axis. Further, it is to be appreciated and understood that, while FIG. 2A shows a particular interdigitation pattern of inlet/outlet flow channels, the porous electrode 200 may include embedded flow channels arranged in other interdigitated patterns or manners.

As shown in FIG. 2A, one or more (e.g., each) of the inlet channels 222 may include one end 222*i* (e.g., an inlet end) that is coincident with (or near coincident with, such as within a threshold distance from) an edge 220*f* of the porous medium 220, and another end 222*e* that terminates at an electrode-channel gap distance g from an edge 220*r* of the porous medium 220. In certain embodiments, the value of the electrode-channel gap distance g may be similar to (e.g., within a threshold difference from) the value of the channel spacing w, which may yield a relatively sharply-shaped residence time distribution such that, in operation, a substantial portion of fluid flow applied to the porous electrode 200 traverses the flow channels and into the porous electrode. As also depicted in FIG. 2A, one or more (e.g., each)

of the outlet channels 224 may include one end 224_t_ (e.g., an outlet end) that is coincident with (or near coincident with, such as within a threshold distance from) the edge 220_r_ of the porous medium 220, and an opposite end 224_p_. The end 224_p_ of an outlet channel 224 may terminate at the electrode-channel gap distance g from the edge 220_f_ of the porous medium 220 or at a different gap distance.

In some embodiments, the porous medium 220 may be a self-supporting medium, in which case the porous electrode 200 may or may not include the electrode substrate 230. In any case, in embodiments where the porous medium 220 includes electrode substrate 230, the electrode substrate 230 may additionally, or alternatively, include an interdigitated array of flow channels.

In a case where porous electrodes 200 are included in a system/cell, such as the system 100 of FIG. 1, the porous electrodes 200 may be aligned, in the z-axis, and sandwich a separator, such as the separator 125. In various embodiments, respective manifolds (e.g., as may be represented by component(s) 130_a_ and/or 130_b_ in FIG. 1) may be employed for distributing fluid to the edge 220_f_ of the porous medium 220 and for collecting fluid at the edge 220_r_ of the porous medium 220.

Figure 2B:
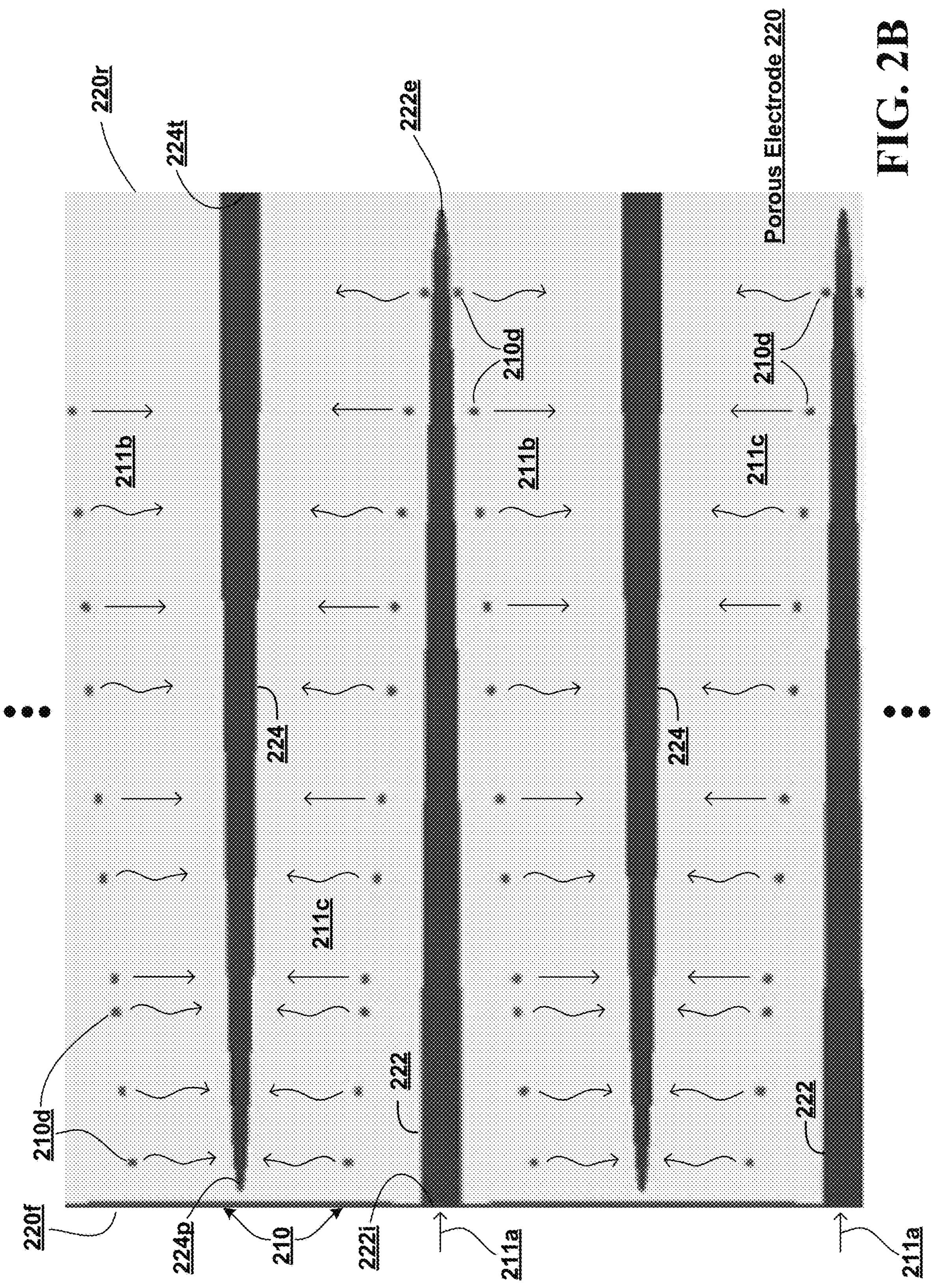
FIGS. 2B-2D illustrate an example progression of fluid flow into, through, and out of the porous electrode of FIG. 2A via the flow channels therein, in accordance with various aspects described herein.
Figure 2C:
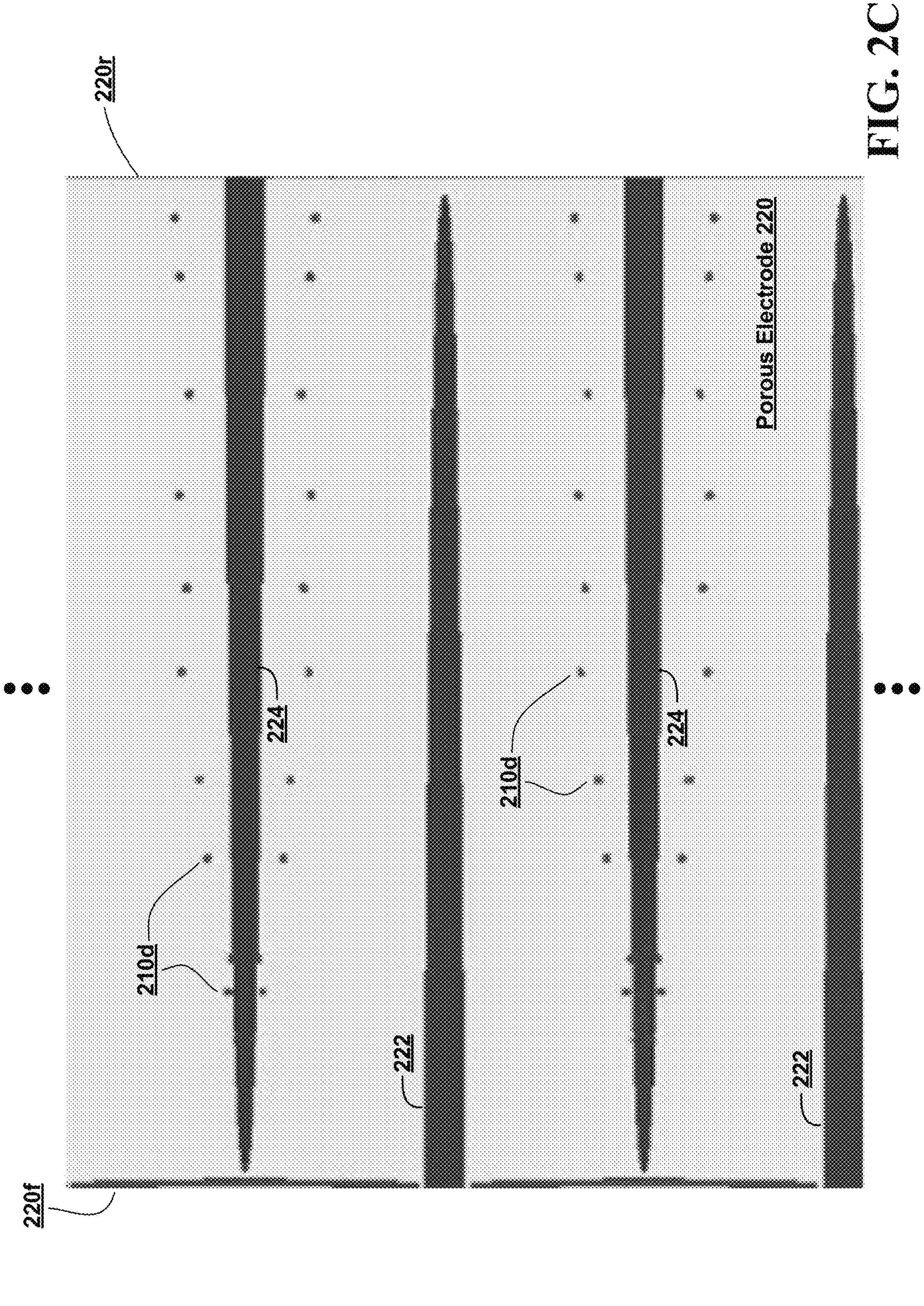
Figure 2D:
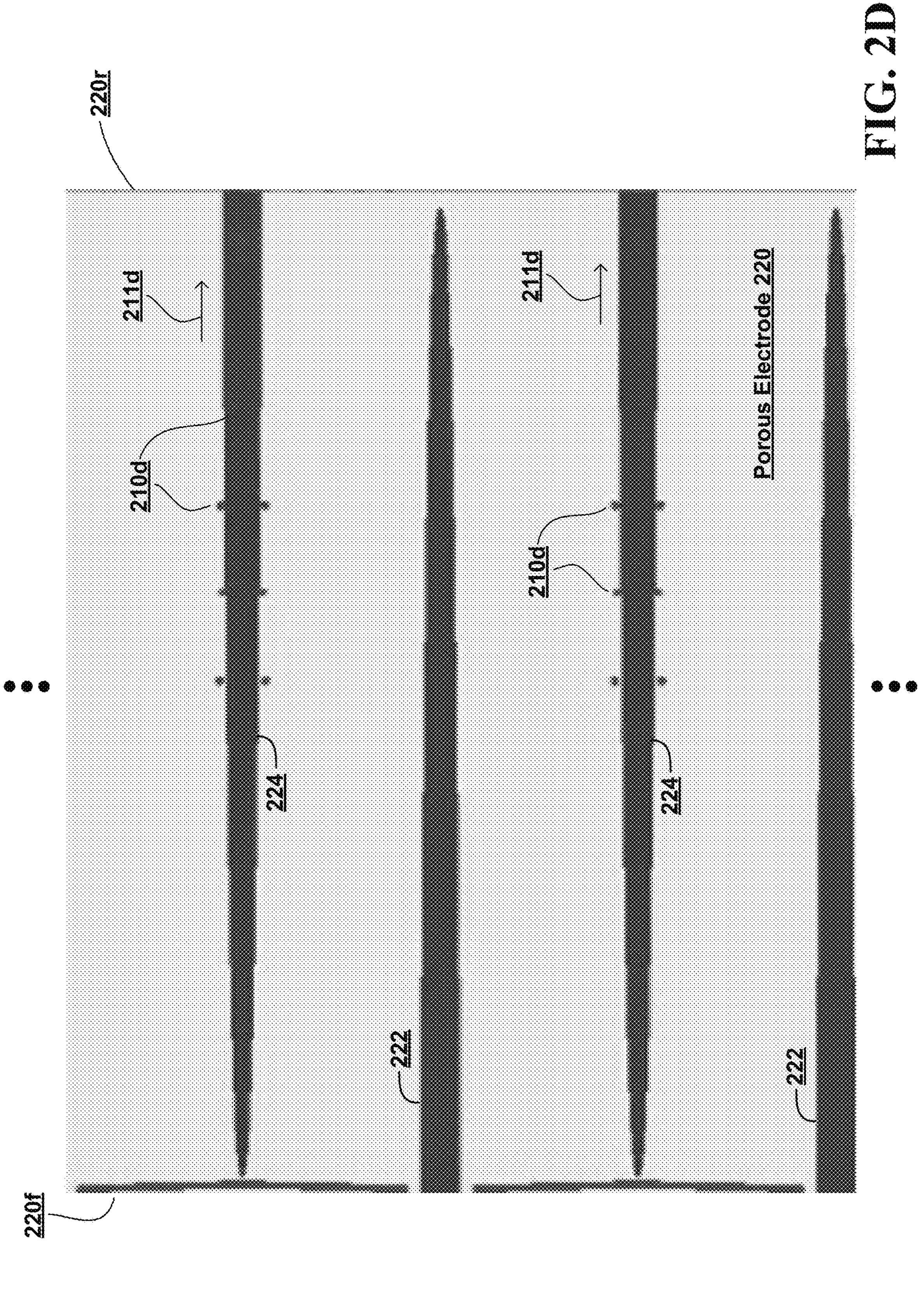

As a brief description of the flow of fluid through the porous medium 220, reference will be made to FIGS. 2B-2D, which (e.g., based on a simulation that resolves the local velocity field using a Darcy-Darcy formulation) show/sample the progression of fluid 210 into, through, and out of the porous medium 220. As shown in FIG. 2B, fluid 210 may be transported to the edge 220_f_ of the porous medium 220, most of which may enter (arrows 211_a_) the inlet ends 222_i_ of the inlet channels 222. Substantial portions of the fluid 210 (shown as particles 210_d_ for sake of illustration) that enter an inlet channel 222 may flow into the porous medium 220, in certain direction(s) (such as, for example, transverse, or near transverse, directions shown by arrows 211_b_ and 211_c_), and enter adjacent outlet channels 224 (FIG. 2C). Therein, the portions 210_d_ may traverse the outlet channel (s) 224 (arrows 211_d_ in FIG. 2D) and exit the outlet channels at the edge 220_r_ of the porous medium 220. By virtue of the layout and configuration/shapes of the flow channels, a significant portion of the fluid can be funneled through the various microchannels and the porous medium 220 rather than over or around the porous electrode structure.

In exemplary embodiments, and as shown in FIGS. 2A-2D, a flow channel (an inlet channel 222 or an outlet channel 224) may have a cube-root channel-width profile with certain (e.g., optimal) dimensions along length L of the flow channel in the porous medium 220. In various embodiments, a cube-root profile may enable uniform flow of fluid into and through the porous medium 220, along the length of the channel. Employing inlet and outlet channels having cube-root profiles thus enables uniform flow of fluid between the inlet and outlet channels, along the lengths of those channels, and throughout the porous medium 220. This is in contrast to flow channels having straight profiles, which, in certain designs, focus fluid flow between the extreme ends of inlet and outlet channels, and in contrast to flow channels having linearly-tapered channels, which, in certain designs, focus fluid flow between midpoints of inlet and outlet channels.

The following describes physics-based constraints that may be used to engender interdigitated flow channels with uniformized flow into porous media transverse to the longitudinal direction associated with such channels. Channels using the particular profiles that uniformize flow may be employed in array(s) of inlet and outlet channels arranged in an interdigitated fashion, such as those described above with respect to FIGS. 2A-2D. With reference to FIG. 2A, for example, a flow channel may have a width h that varies with the cube root of position x along the channel.

A first constraint may be introduced to reproduce a uniform pressure gradient along the channel's longitudinal direction x—i.e., Constraint #1: $G=-\partial_p/\partial x|_{channel\ centerline}=c_1$. While various cross-section shapes are possible in general, the focus here is on rectangle-shaped cross-sections with width h and depth l, owing to their ability to be manufactured by various means (e.g., mechanical milling, laser machining, microfabrication, embossing, and additive manufacturing). It is to be appreciated and understood, however, that other cross-section shapes can be used, including triangles, circles, etc. To enforce Constraint #1, the pressure gradient G of a Poiseuille flow may be modeled, where analytical expressions exist that relate it to a corresponding mean velocity parallel to the channel $\bar{u}_m$ when a channel has a uniform cross-section along its length L:

$$\frac{\bar{u}_{\|}\mu}{G} = f = \frac{h^2}{12} - \frac{16h^3}{\pi^5 l}\sum_{n=1}\frac{\cosh(\beta_n l)-1}{(2n-1)^5\sinh(\beta_n l)} \text{ with } \beta_n=(2n-1)\pi/h. \quad \text{(Eq. 1)}$$

The uniform pressure gradient condition can be written as $G=\bar{u}_{\|}\mu/f=c_1$.

A second constraint may be introduced to couple variation of the mean parallel velocity component $\bar{u}_{\|}$ to the transverse velocity component $u_\perp$ that is to be uniformized along the channel's primary direction x—i.e., Constraint #2: $d(\bar{u}_{\|}hl)/dx=-u_\perp P=c_2$ with P being channel perimeter. These conditions can be combined by substituting $\bar{u}_{\|}$ from Constraint #1 into Constraint #2 to arrive at a differential equation governing channel shape:

$$\frac{G}{\mu}\frac{d[f(h,l)\cdot h\cdot l]}{dx} = -u_\perp P. \quad \text{(Eq. 2)}$$

Integrating Eq. 2 with respect to position x along the channel, results in the following algebraic equation that governs channel shape, where x=L is assumed to be the channel's length at which the velocity parallel to it vanishes:

$$u_\perp P\mu L(1-x/L)/G = f(h,l)\cdot h\cdot l$$

Also, by assuming that all flow at the inlet of the channel ultimately exits the channel transverse to it, conservation of volumetric flow (i.e., $u_\perp PL=\bar{u}_{\|}hl$) can be used to simplify the above expression:

$$\frac{x}{L} = 1 - \frac{f(h,l)}{f(h_0,l_0)}\cdot\frac{h}{h_0}\cdot\frac{l}{l_0}. \quad \text{(Eq. 4)}$$

Here, $h_0$ and $l_0$ are the cross-sectional dimensions of the channel at its inlet (i.e., at x=0). The preceding expression defines the shape of the associated channel subject to arbitrary variations of channel height h and channel depth l with respect to each other.

It should be appreciated and understood that both Constraint #1 and Constraint #2 may be needed since, at any given position x along the span of a porous medium (e.g., span s of the porous medium 220), it is the difference in pressure inside a high pressure channel relative to that inside an adjacent low pressure channel, at corresponding x position, which the transverse velocity is proportional to by virtue of Darcy's law for flow through porous media. Assuming that the distance between these two channels (e.g., channel spacing w in FIG. 2A) is essentially constant, having a constant pressure gradient along the longitudinal direction in the x-axis would produce a uniform flow between these two channels in the transverse direction (along the y-axis in FIG. 2A). Because the flow rate through a channel decreases farther down the channel (since fluid may be lost from the channel in a transverse direction thereto due to outflow into the porous medium), having a channel shape that constricts along the longitudinal direction of the channel can provide a constant pressure gradient along that longitudinal direction.

Figure 2E:
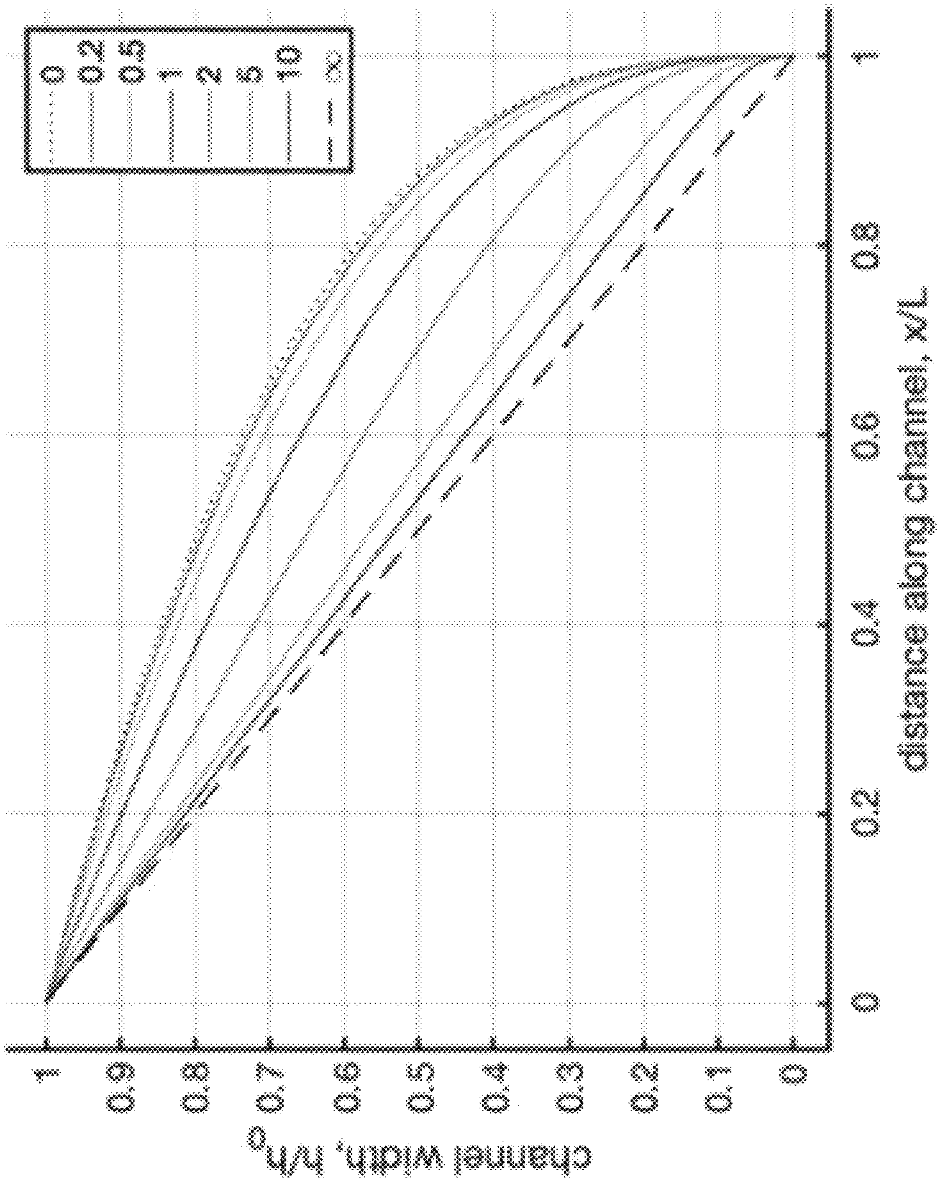
FIG. 2E is a graphical representation showing exemplary flow channel shapes that are capable of providing uniformized fluid flow, in accordance with various aspects described herein.

FIG. 2E is a graphical representation illustrating example channel shapes that, for various select aspect ratios $h_0/l_0$ of a channel's inlet cross-section and where width h is allowed to vary and depth l is fixed along the channel's length, provide for uniformized fluid flow (according to Eq. 4). In the limit where $h_0/l_0$ approaches zero (i.e., the channel's inlet is very thick relative to its width), the optimal channel shape approaches a cube-root profile, as demonstrated below. In the limit where $h_0/l_0$ approaches infinity (i.e., the channel's inlet is very wide relative to its thickness), the optimal channel shape approaches a linear profile, as also demonstrated below. It can be seen from FIG. 2E that the profiles for intermediate $h_0/l_0$ may be a synthesis of a linear profile near the inlet of the channel with a cube-root profile at the downstream end of the channel. In other words, an optimal channel overall shape may take the form of some combination of a linear profile and a cube-root profile, such as a transition from a linear profile to a cube-root profile along a length of the channel. For instance, in a case where cross-sectional dimensions (e.g., width) of the channel is on the order of microns, the linear profile may provide poor fluid distribution, but the cube-root profile may provide uniform distribution of fluid across the porous electrode.

Examples of optimized channel shapes are illustrated in FIGS. 2F, 2G, 2H, and 2J, subject to specific shape conditions.

Figure 2F:
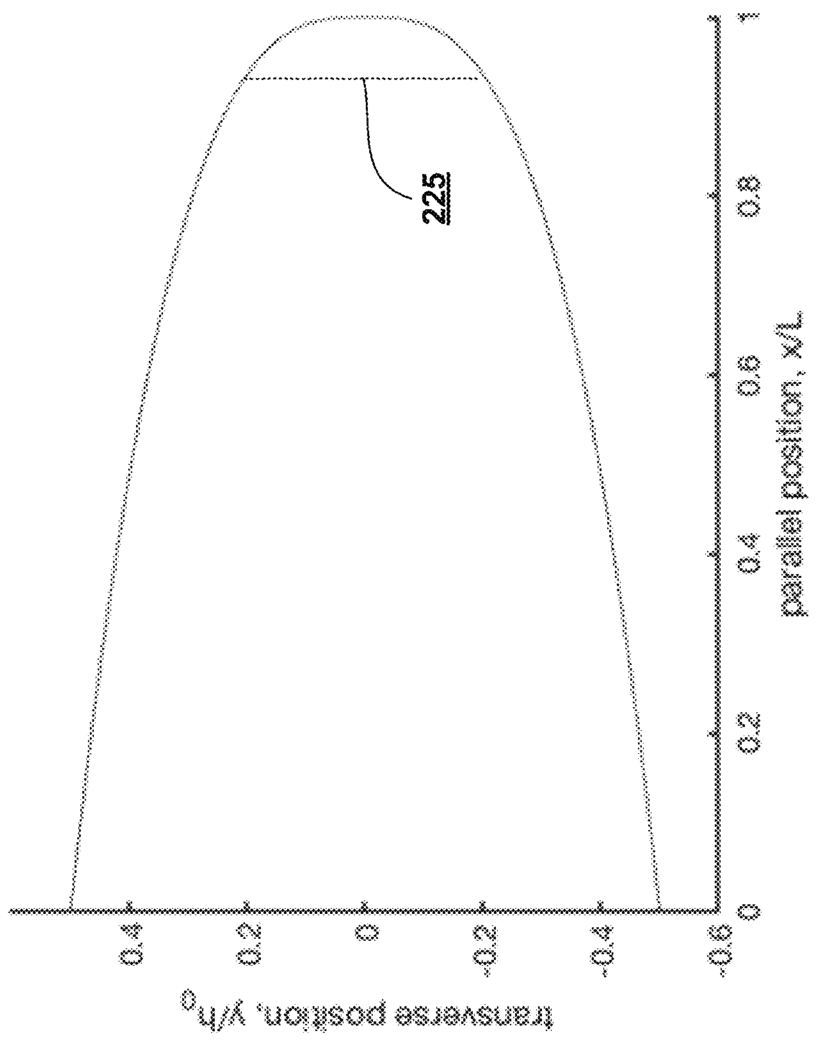
FIGS. 2F, 2G, 2H, and 2J illustrate non-limiting examples of optimized flow channel shapes, subject to specific shape conditions, in accordance with various aspects described herein.

The following describes how the cube-root and linear channel profiles shown in FIG. 2E may be obtained in the respective limits discussed above. The optimal channel profile for the conditions posed here is shown in FIG. 2F. In a case where h<<l, the profiles shown in FIG. 2E may be obtained by fixing l and varying h in Eq. 4 for cases where h<<l and h>>l.

In the limit of h<<l, it can be found that $f=h^2/12$, such that Constraint #1 reduces to $12\bar{u}_{||}\mu/h^2=c_1$. This result provides an explicit expression for the mean parallel velocity component $\bar{u}_{||}=h^2c_1/12\mu$ with $$c_1 = 12\mu\bar{u}_{||,0}/h_0^2.$$

Constraint #2 also reduces to $l\cdot d(\bar{u}_{||}h)/dx=c_2$ subject to these conditions. Substituting the expression for $\bar{u}_{||}$ from Constraint #1 into Constraint #2 yields an equation from which h(x) may be solved directly:

$$d(h^3)/dx = 12\mu c_2/c_1 l = -u_\perp h_0^2/\bar{u}_{||,0}.$$

Integrating this equation and invoking a boundary condition for width ($h(x=0)=h_0$) yields a cube-root profile for the variation of channel width with distance along the channel:

$$h = h_0\cdot\sqrt[3]{1-u_\perp x/\bar{u}_{||,0}h_0}\,.$$

If all flow from the channel flows out of it transverse to it, the channel width reduces to $$h = h_0\cdot\sqrt[3]{1-x/L}\,,$$

where L is channel length.

In the limit of h>>l, it can be found that $f=l^2/12$, such that Constraint #1 reduces to $12\bar{u}_{||}\mu/l^2=c_1$. This result provides an explicit expression for the mean parallel velocity component $\bar{u}_{||}=l^2c_1/12\mu$ with $c_1=12\mu\bar{u}_{||,0}/l^2$. Constraint #2 also reduces to $l\cdot d(\bar{u}_{||}h)/dx=c_2$ subject to these conditions. Substituting the expression for $\bar{u}_{||}$ from Constraint #1 into Constraint #2 yields an equation from which h(x) may be solved directly: $l^2\, dh/dx=12\,\mu c_2/c_1 l=-u_\perp l^2/\bar{u}_{||,0}$. Integrating this equation and invoking a boundary condition for width ($h(x=0)=h_0$) yields a linear profile for the variation of channel width with distance along the channel: $h=h_0\cdot(1-u_\perp x/\bar{u}_{||,0}h_0)$. If all flow from the channel flows out of it transverse to it, the channel width reduces to $h=h_0\cdot(1-x/L)$, where L is channel length.

Figure 2G:
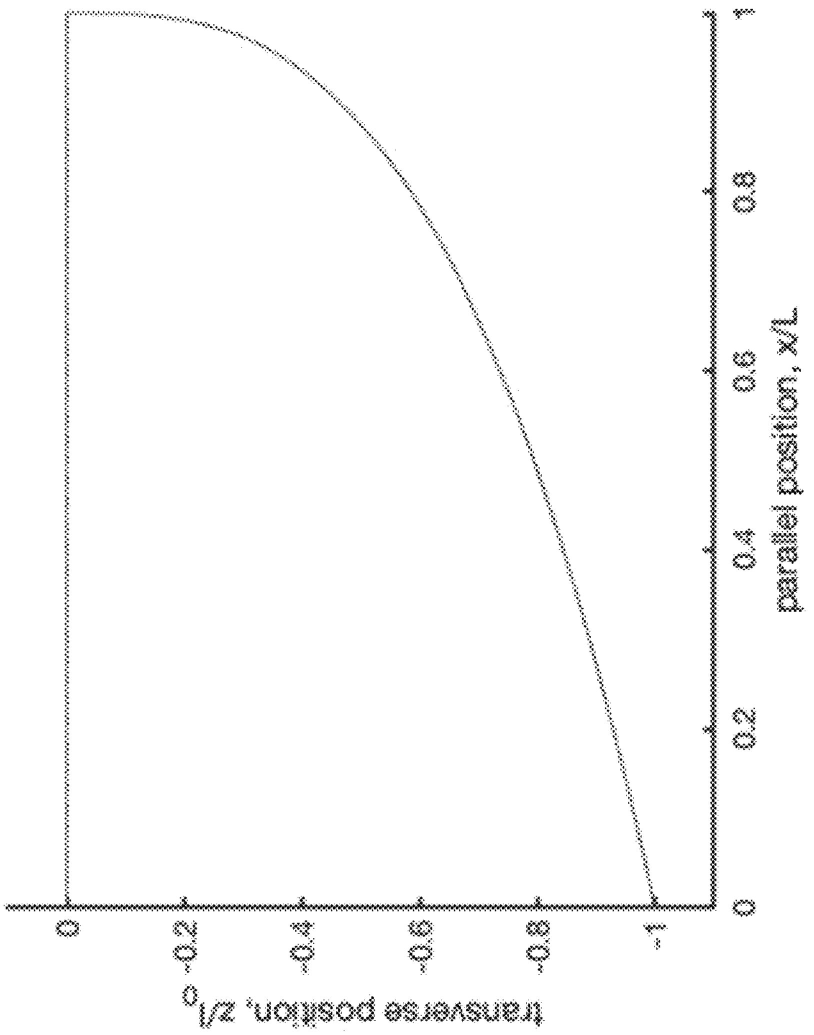

The following describes how other cube-root and linear profiles can be generated by varying l while respectively fixing h. It can be seen that the channel areas generated by varying l while fixing h are identical to those obtained when varying h and fixing l, if the definitions of h and l are transposed. The optimal channel profile for the conditions posed here is shown in FIG. 2G.

Here, in the limit of l<<h, it can be found that $f=l^2/12$, such that Constraint #1 reduces to $12\bar{u}_{||}\mu/l^2=c_1$. This result provides an explicit expression for the mean parallel velocity component $\bar{u}_{||}=l^2c_1/12\mu$ with $$c_1 = 12\mu\bar{u}_{||,}/l_0^2.$$

Constraint #2 also reduces to $h\cdot d(\bar{u}_{||}l)/dx=c_2$ subject to these conditions. Substituting the expression for $\bar{u}_{||}$ from Constraint #1 into Constraint #2 yields an equation from which l(x) may be solved directly:

$$d(l^3)/dx = 12\mu c_2/c_1 h = -u_\perp l_0^2/\bar{u}_{||,0}.$$

Integrating this equation and invoking a boundary condition for width ($l(x=0)=/0$) yields a cube-root profile for the variation of channel depth with distance along the channel:

$$l = l_0\cdot\sqrt[3]{1-u_\perp x/\bar{u}_{||,0}l_0}\,.$$

If all flow from the channel flows out of it transverse to it, the channel depth reduces to $$l = l_0 \cdot \sqrt[3]{1 - x/L},$$

where L is channel length.

In the limit of l>>h, it can be found that $f=h^2/12$, such that Constraint #1 reduces to $12\bar{u}_{\|}\mu/h^2=c_1$. This result provides an explicit expression for the mean parallel velocity component $\bar{u}_{\|}=h^2c_1/12\mu$ with $c_1=12\mu\bar{u}_{\|,0}/h^2$. Constraint #2 also reduces to h $d(\bar{u}_{\|}l)/dx=c_2$ subject to these conditions. Substituting the expression for $\bar{u}_{\|}$ from Constraint #1 into Constraint #2 yields an equation from which l(x) may be solved directly: $h^2\, dl/dx=12\, \mu c_2/c_1 h=-u_{\perp}h^2/\bar{u}_{\|,0}$. Integrating this equation and invoking a boundary condition for width $(l(x=0)=l_0)$ yields a linear profile for the variation of channel depth with distance along the channel: $l=l_0\cdot(1-u_{\perp}x/\bar{u}_{\|,0}l_0)$. If all flow from the channel flows out of it transverse to it, the channel depth reduces to $l=l_0\cdot(1-x/L)$, where L is channel length.

Figure 2H:
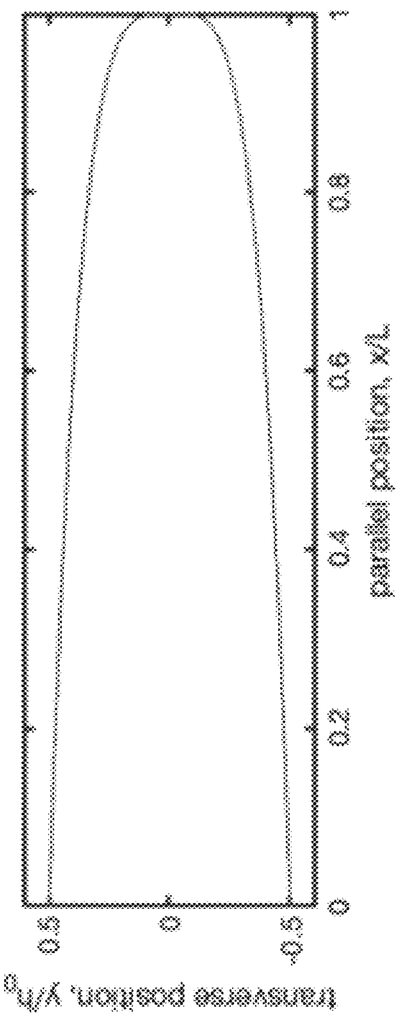
Figure 2J:
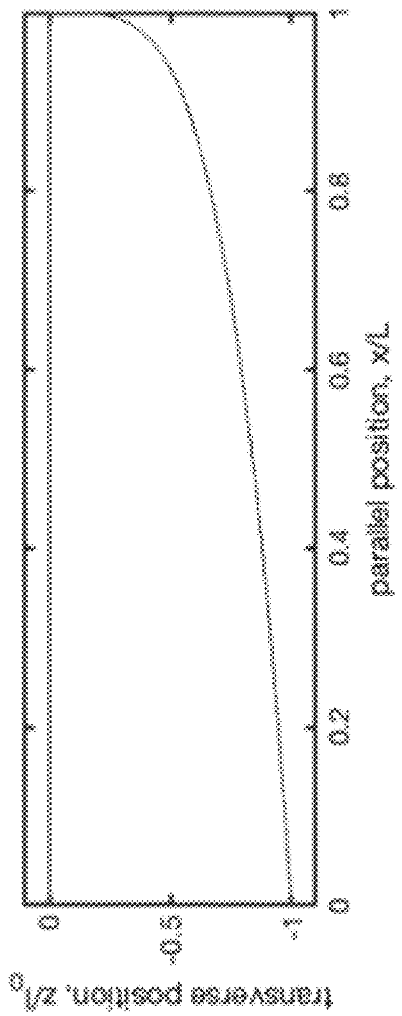

The following describes how other profiles can be generated by allowing h to vary in proportion to l. When the two dimensions vary in proportion to each other (that is, when the variation of channel cross-section dimensions is at proportional rates in both directions within the cross-section), a quartic-root profile may (e.g., always) be produced, which is a result that can also be produced for a channel with circular cross-section. The optimal channel profiles (quartic-root shapes) for the conditions posed here are shown in FIGS. 2H and 2J. These are shown in both the xy and xz planes due to proportional varying of channel width relative to depth. Flow channels having quartic-root (or near quartic-root) profiles may be applicable in devices that employ electrodes or other devices that employ flow through porous chemically, reactive materials, such as devices that provide chromatography processes of various types (e.g., liquid or ion chromatography).

In this scenario, assume that l=ah. It can be found that $f=f_0\cdot(h/h_0)^2$, such that Constraint #1 reduces to $$h_0^2\bar{u}_{\|}\mu / f_0h^2 = c_1.$$

This result provides an explicit expression for the mean parallel velocity component $$\bar{u}_{\|} = h^2c_1f_0/h_0^2\mu$$

with $c_1=\mu\bar{u}_{\|,0}/f_0$Constraint #2 also reduces to $\alpha\cdot d(\bar{u}_{\|}h^2)/dx=c_2$ subject to these conditions. Substituting the expression for $\bar{u}_{\|}$ from Constraint #1 into Constraint #2 yields an equation from which h(x) may be solved directly:

$$d(h^4)/dx = \mu c_2h_0^2/c_1f_0\alpha = -u_{\perp}P_0h_0^2/\bar{u}_{\|,0}\alpha.$$

Integrating this equation and invoking a boundary condition for width $(h(x=0)=h_0)$ yields a quartic-root profile for the variation of channel width and channel depth with distance along the channel: $h=h_0\cdot\sqrt[4]{1-u_{\perp}P_0x/\bar{u}_{\|,0}l_0h_0}$ and $l_0\cdot\sqrt[4]{1-u_{\perp}P_0x/\bar{u}_{\|,0}l_0h_0}$. If all flow from the channel flows out of it transverse to it, the channel width and channel depth reduce to $h=h_0\cdot\sqrt[4]{1-x/L}$ and $l=l_0\cdot\sqrt[4]{1-x/L}$, where L is channel length.

In various embodiments, Constraints #1 and #2 may be applied where l and h may be varied with respect to each other to identify additional channel shapes/cross-section types. Eq. 4 can provide a means for determining the relationships between x, l, and h. Other shapes may also be optimized subject to a modified version of Eq. 4:

$$\frac{x}{L} = 1 - \frac{f}{f_0} \cdot \frac{A_c}{A_{c,0}} \qquad \text{(Eq. 4-mod)}$$

Here, f may be the so-called hydraulic permeability function defined for a given channel cross-section as $$f \equiv \frac{\bar{u}_{\|}\mu}{G}$$

with cross-sectional area $A_c$ and where the subscript 0 indicates a corresponding quantity associated with the inlet cross-section of the channel. Using this approach, it can be shown that equiaxed cross-sections (e.g., a regular polygon or a circle) possess a quartic-root profile: $d=d_0\cdot\sqrt[4]{1-x/L}$, where d is a characteristic dimension of the cross-section (d=diameter for a circle or d=side length for a regular polygon).

Figure 2K:
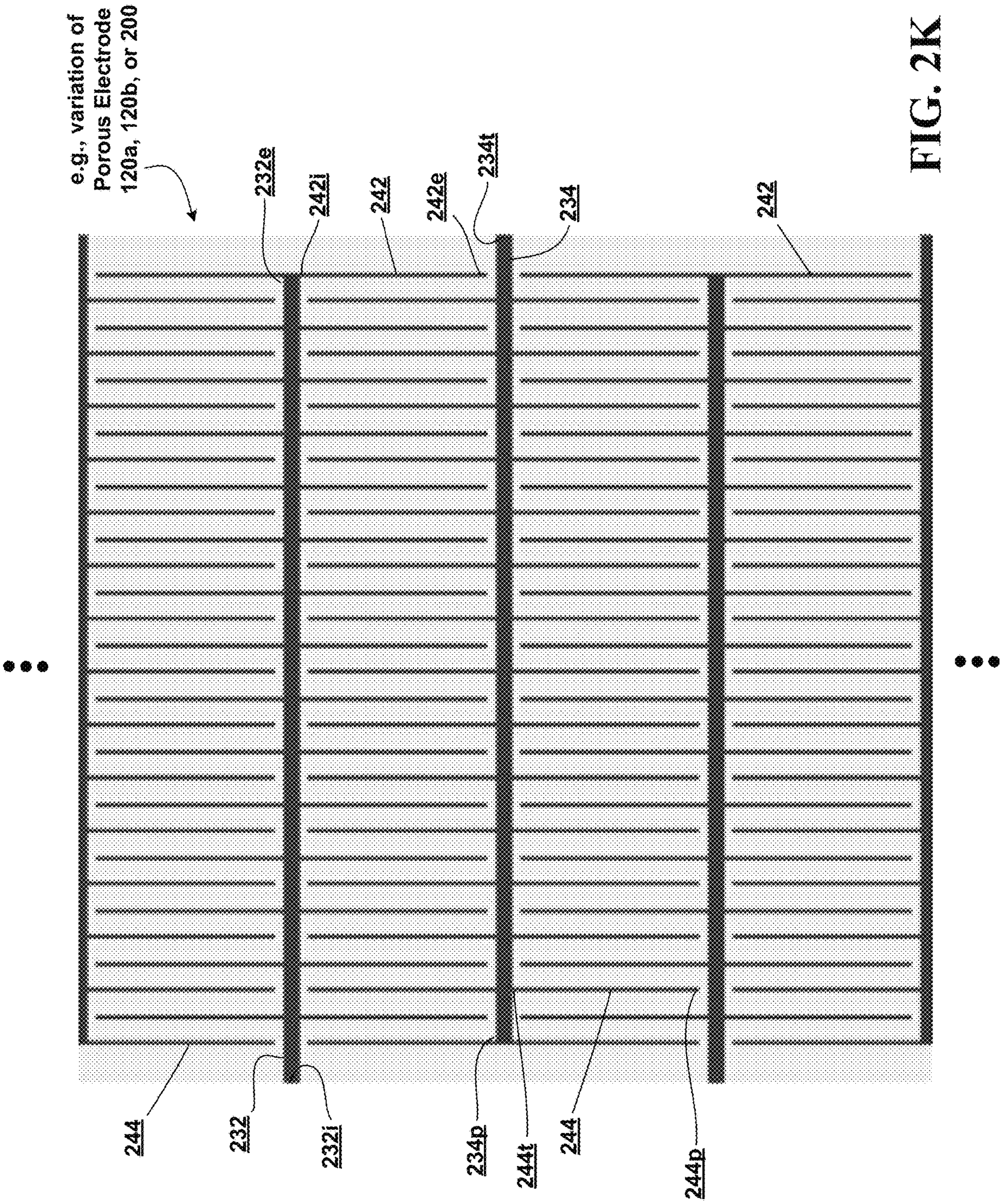
FIG. 2K is a diagram of an example, non-limiting embodiment of a porous electrode having a two-scale hierarchical arrangement of flow channels, in accordance with various aspects described herein.

As briefly described above, a porous electrode may include a hierarchical arrangement of flow channels. The porous electrode 200 described above with respect to FIGS. 2A-2D, for example, includes a one-scale hierarchical arrangement of flow channels 222 and 224. In various embodiments, however, a porous electrode may include higher scales of hierarchical arrangements of flow channels. FIG. 2K is a diagram of an example, non-limiting embodiment of a porous electrode having a two-scale hierarchical arrangement of flow channels, and FIG. 2L is a diagram of an example, non-limiting embodiment of a porous electrode having a three-scale hierarchical arrangement of flow channels.

As shown in FIG. 2K, the porous electrode may include a primary arrangement of smaller interdigitated flow channels, which may be the same as or similar to the arrangement shown in FIGS. 2A-2D. For example, the porous electrode in FIG. 2K may include inlet flow channels 232 similar to inlet flow channels 222, and outlet flow channels 234 similar to outlet flow channels 224. Here, however, the porous electrode may include additional inlet flow channels 242 that extend from various portions of the inlet flow channels 232, and additional outlet flow channels 244 that extend from various portions of the outlet flow channels 234, providing a second scale of inlet and outlet flow channels. As depicted in FIG. 2L, the porous electrode may include primary and secondary arrangements of interdigitated flow channels, which may be the same as or similar to the arrangement shown in FIG. 2K, but may further include additional inlet flow channels 252 that extend from various portions of the secondary inlet flow channels 242, and additional outlet flow channels 254 that extend from various portions of the secondary outlet flow channels 244, providing a third scale of inlet and outlet flow channels. It is to be appreciated and understood that a porous electrode may include an even higher scale hierarchical arrangement of flow channels than that shown in FIG. 2L. In various embodiments, a porous electrode may include one or more hierarchies of interdigitated channels arranged with size scales that are self-similar (thus yielding a certain desired (e.g., optimal or improved) fractal dimension or distribution thereof for the hierarchical structure) or otherwise.

Figure 2L:
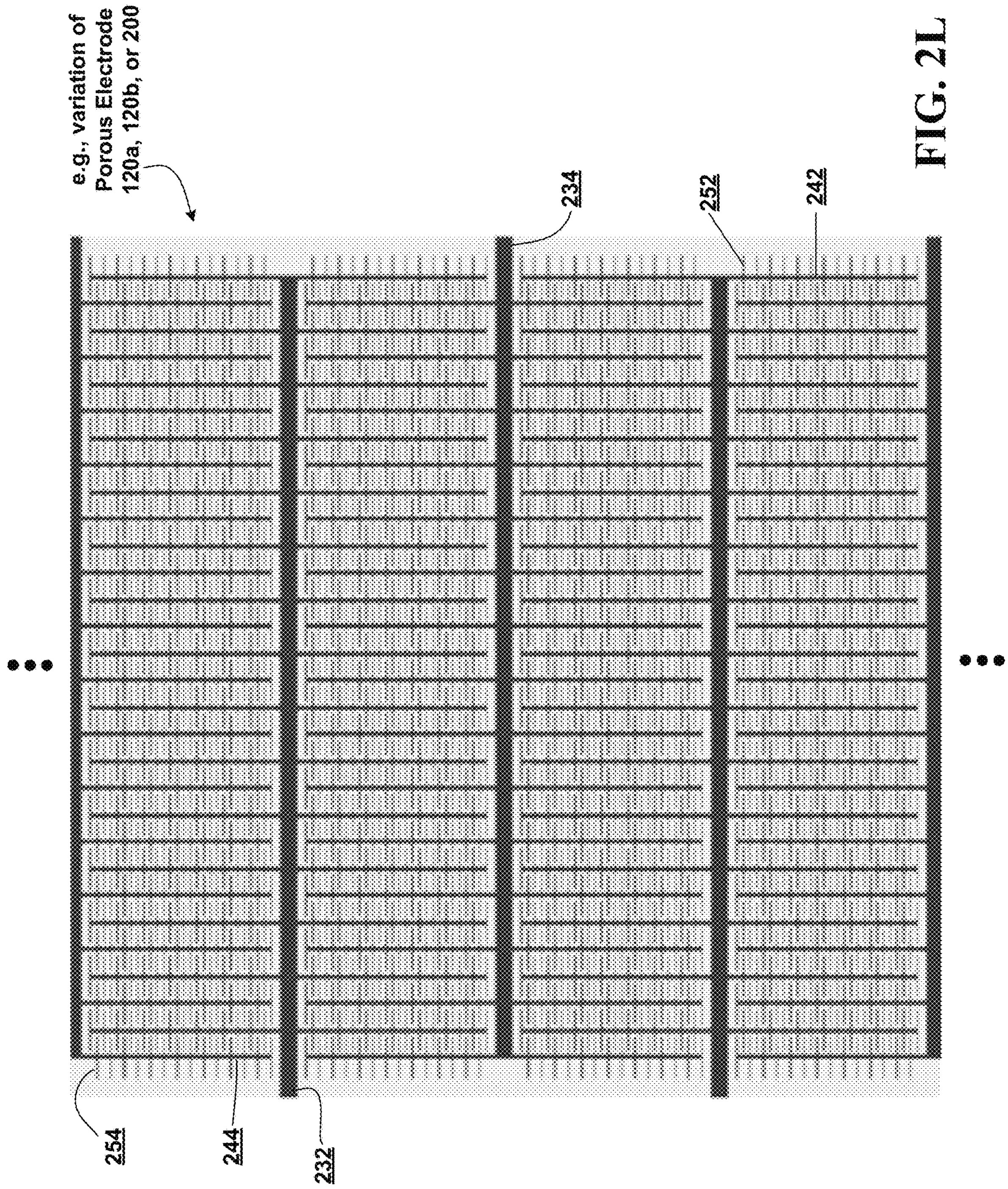
FIG. 2L is a diagram of an example, non-limiting embodiment of a porous electrode having a three-scale hierarchical arrangement of flow channels, in accordance with various aspects described herein.

Although FIGS. 2K and 2L show flow channels having straight profiles, it should be appreciated and understood that, in various embodiments, one or more (e.g., each) of the implementations shown in FIGS. 2K and 2L may include flow channel portions having tapered—e.g., cube-root—profile(s), such as those described herein. For instance, in one or more embodiments, portions of some or all of the inlet and outlet flow channels in either or both of the hierarchical, interdigitated patterns shown in FIGS. 2K and 2L may be defined in accordance with the abovementioned physics-based constraints, and thus exhibit or approximate, at respective hierarchical scales, any of the optimized channel profiles described above with respect to FIGS. 2E-2H and 2J. Referring to FIG. 2K as an example, one or more (e.g., each) of the primary inlet flow channels 232 may have a more linear profile at an end 232*i* that, along the length of the primary inlet flow channel 232 toward end 232*e*, transitions to a cube-root profile. Continuing the example, additionally, or alternatively, one of more (e.g., each) of the secondary inlet flow channels 242 may have a more linear profile at an end 242*i* that, along the length of the secondary inlet flow channel 242 toward end 242*e*, transitions to a cube-root profile.

It is to be appreciated and understood that the flow channel arrangements and profiles may be provided in a porous electrode in any suitable manner. For instance, flow channels may be defined in a porous electrode via laser machining (e.g., ablation), mechanical subtractive milling (e.g., using an end mill), microfabrication (e.g., techniques used for fabricating electronic chips), and/or other types of processes.

As an example, mechanical milling involving a single diameter end-mill that corresponds to a width equal to a desired, fixed width h, may be employed to embed flow channels having the profile represented in FIG. 2F—i.e., by varying depth l (so as to constrict flow in the channel in the z-axis shown in FIG. 2A, for example) and keeping width h constant.

As another example, laser machining, which may or may not provide sufficient control of cuts in depth 1, may be employed to embed flow channels having the profile represented in FIG. 2F—i.e., by varying width h (so as to constrict flow in the channel in the y-axis shown in FIG. 2A, for example) and keeping depth l constant.

Any suitable manufacturing method may be employed even in a case where a porous electrode rests on a substrate (e.g., as described above with respect to FIGS. 1 and 2A). For instance, laser machining can be employed to ablate certain regions of the surface of the porous electrode material (and/or certain regions of the substrate) to define the needed pattern(s) of flow channels.

It may become apparent that, while certain optimal profile (s) may be desired or predicted, as described herein, exact replication of such profile(s) in practice may be limited to the constraints or resolutions of available manufacturing techniques. That is, attempts to manufacture any of the above-described channel shapes may be achieved within certain precision as a result of inherent resolution limitations of the particular manufacturing method chosen.

Figure 2M:
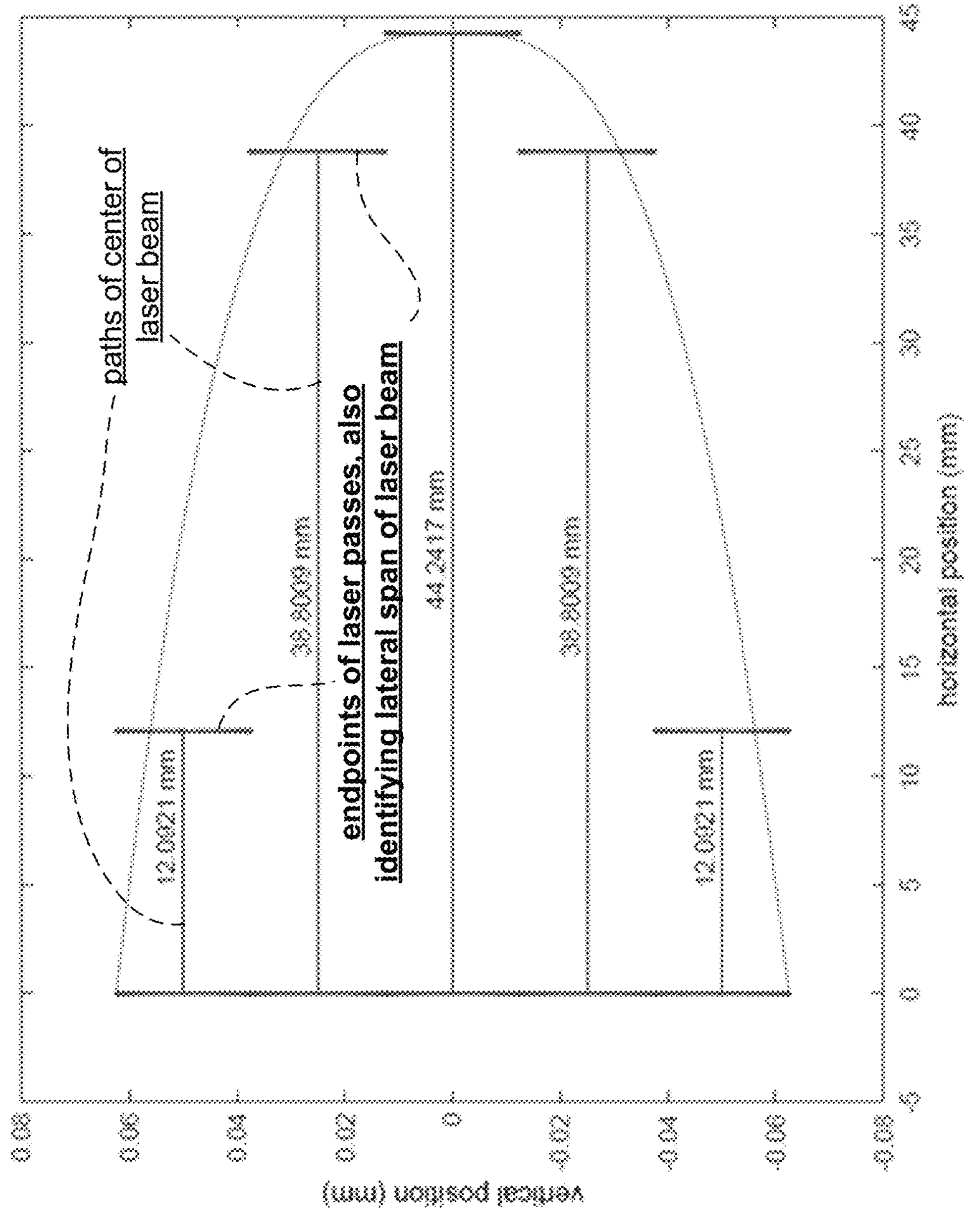
FIG. 2M illustrates example, non-limiting passes of a laser beam for defining the shape of a flow channel, in accordance with various aspects described herein.

For example, with laser machining, the nominal width of a laser beam and the need to run (e.g., horizontal) passes of the laser beam to ablate the porous medium, may affect how well the desired shaped of a flow channel can be resolved. In particular, the ablation may or may not exactly "follow" the contour(s) of the desired profile. For instance, in a case where the laser beam has a nominal width of 25 microns (μm), and where, for example, as shown in FIG. 2M, the vertical direction (y-axis) of a cut is much finer (e.g., two orders of magnitude finer) than the horizontal direction (x-axis), various (e.g., five, as shown in FIG. 2M) passes of the laser beam may provide stair-stepping ablations that result in a channel profile that (e.g., only) approximates an optimal cube-root profile. As described below with respect to FIGS. 2N and 2P, however, even a system/cell that includes porous electrodes having flow channels defined therein that (e.g., only) approximate optimal cube-root profile(s) can provide significant performance improvements over those with certain configurations of flow channels that are merely straight.

It is to be appreciated and understood that the spatial extent to which a flow channel spans may be limited in order to support some fraction of fluid flow through the end/tip of the channel (and not only transverse to the channel). For instance, the optimal profile of a flow channel, where width h is varied and depth l is kept constant (e.g., FIG. 2F), may transition from having finite values to being zero at the end/tip of the channel—i.e., where the width h vanishes and no volumetric flow is carried through the end/tip of the channel. However, as there may be non-negligible flow through the end/tip of the channel, it may not be desirable for the end/tip of the channel to "vanish," but rather for it to have a finite value. In such a case, the optimal profile may be truncated, as shown, for example, by dashed line 225 in FIG. 2F, so as to provide a channel profile that has a non-zero end/tip width. It will be appreciated here that the x-axis in FIG. 2F is made non-dimensional (i.e., normalized by the length L of the channel), and thus the plot shown may be renormalized to more precisely represent or reflect the truncation.

Figure 2N:
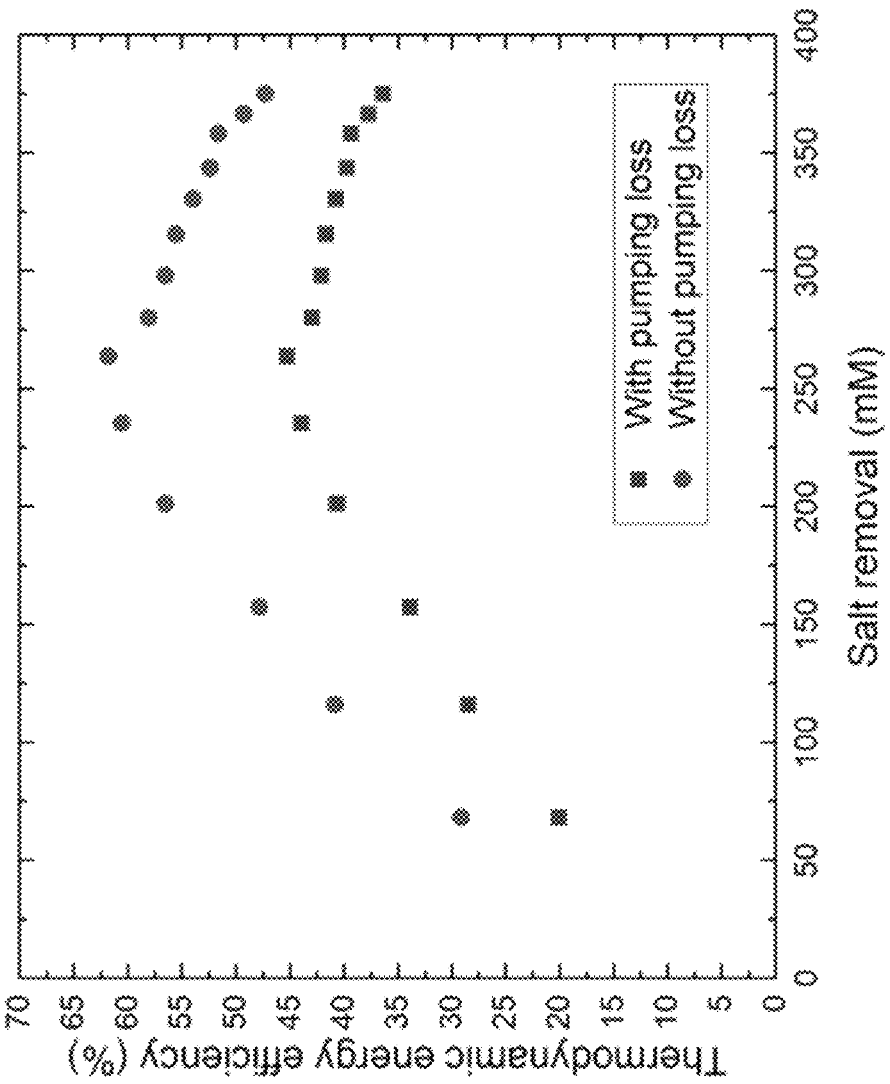
FIG. 2N is a graphical representation of the thermal energy efficiency (TEE) in an example, non-limiting desalination system that employs electrodes with tapered flow channels embedded therein, in accordance with various aspects described herein.
Figure 2P:
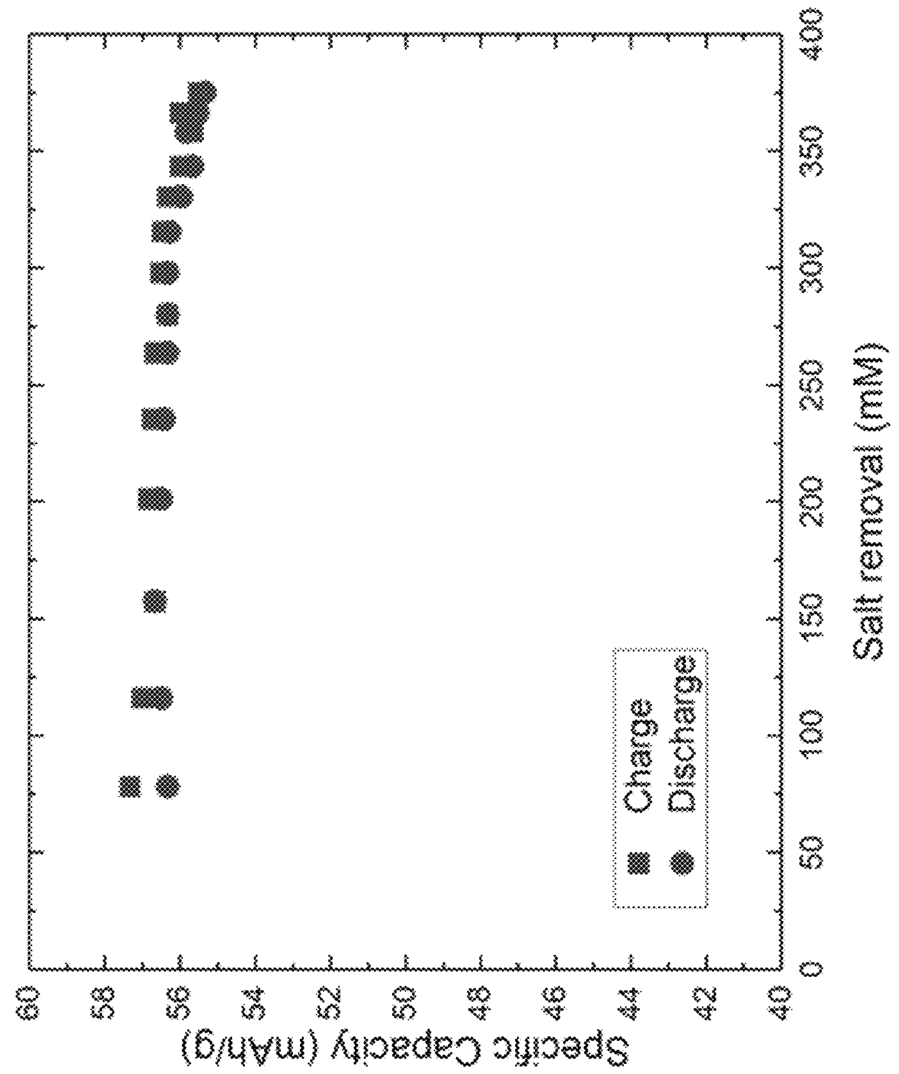
FIG. 2P is a graphical representation of the specific capacity of the example desalination system associated with FIG. 2N, in accordance with various aspects described herein.

FIG. 2N is a graphical representation of the thermal energy efficiency (TEE) in an example desalination system employing electrodes with tapered channels embedded therein (and more particularly, cube-root-shaped channels with tapering widths determined by the equation $w_c=(1-x/l_c)^{1/3}$ and defined via laser milling in the form of five lines of varying length—e.g., as shown in FIG. 2M). FIG. 2P is a graphical representation of the specific capacity of the example desalination system.

As compared with a similar desalination system (i.e., operated with the same electrode composition and desalination experimental parameters, but where the electrodes include a certain configuration of straight (rather than tapered) channels embedded therein—results of the comparison desalination system being omitted here for sake of brevity), the example desalination system provided improved desalination performance due to the (e.g., more) uniform flow of fluid within the electrodes. Particularly, the maximum desalination performance of the example desalination system increased TEE when pumping losses are accounted for (FIG. 2N), and the system had a higher specific capacity and higher maximum salt removal (FIG. 2P). It is to be appreciated and understood that, while it is determined that porous electrodes having cube-root-profiled channels defined therein provide performance improvements in a particular type of electrochemical system (i.e., a desalination cell), similar performance improvements are to be expected in other types of systems that employ such electrodes, by virtue of the (e.g., more) uniform fluid flow therein facilitated by the tapered channels.

Figure 2Q:
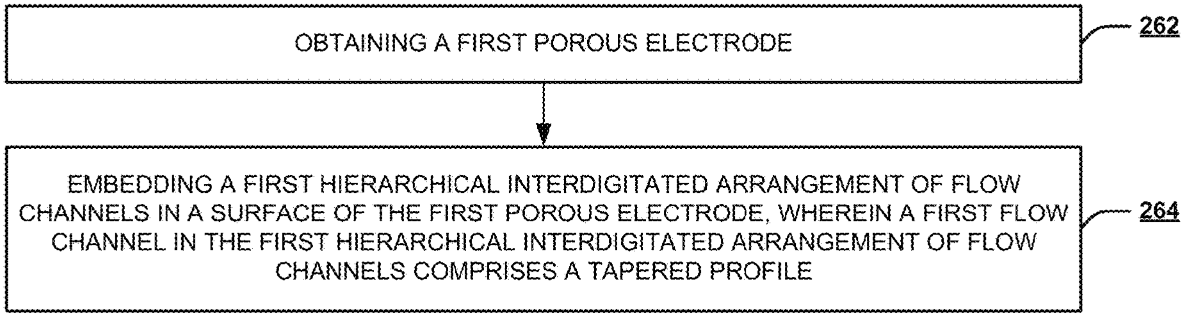
FIG. 2Q depicts an example, non-limiting method in accordance with various aspects described herein.

FIG. 2Q depicts an illustrative embodiment of a method 260 in accordance with various aspects described herein.

At 262, the method can include obtaining a first porous electrode. For example, the method can include obtaining a porous electrode material (e.g., similar to the porous electrode material 220 of FIG. 2A).

At 264, the method can include embedding a first hierarchical interdigitated arrangement of flow channels in a surface of the first porous electrode, wherein a first flow channel in the first hierarchical interdigitated arrangement of flow channels comprises a tapered profile. For example, the method can include defining, or otherwise providing, a hierarchical interdigitated arrangement of flow channels in a surface of the porous electrode material, such as one or more of the various patterns of interdigitated flow channels having optimal shapes described above in relation to one or more of FIGS. 1, 2A-2H, and 2J-2M.

In some implementations, the first hierarchical interdigitated arrangement of flow channels comprises inlet channels and outlet channels, where a first inlet channel of the inlet channels is defined such that there exists a gap distance between an end of the first inlet channel and an edge of the first porous electrode.

In some implementations, the embedding comprises varying, for the first flow channel and along a longitudinal direction of the first flow channel, one or more of a width of the first flow channel and a depth of the first flow channel, relative to the surface of the first porous electrode.

In some implementations, the embedding is performed via laser machining, mechanical milling, microfabrication, or a combination thereof.

In some implementations, the method further comprises obtaining a second porous electrode, and embedding a second hierarchical interdigitated arrangement of flow channels in a surface of the second porous electrode, wherein at least one flow channel in the second hierarchical interdigitated arrangement of flow channels comprises the tapered profile.

In some implementations, the method further comprises assembling the first porous electrode and the second porous electrode together with a separator layer therebetween.

While for purposes of simplicity of explanation, the respective processes are shown and described as a series of blocks in FIG. 2Q, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Laser micromachining can be used to create precisely shaped and precisely positioned microfluidic channels in electrodes used for electrochemical desalination processes, with additional applications of associated micromachining toward other electrochemical and chemical materials. In such applications, the associated materials are porous composites, containing solid active particles (e.g., nickel hexacyanoferrate (NiHCF)), conductive additive particles (e.g., Ketjen black (KB)), and/or deposited polymer binder (e.g., polyvinylidene fluoride (PVDF)), that either exhibit thermally-induced phase change (e.g., melting for polymer binder) or material decomposition (e.g., active material). For instance, laser micromachining or engraving can be employed to embed flow channels, whether tapered or linear/straight, in a porous electrode. Due to the high temperatures associated with laser engraving, however, heat affection may result whereby portions of the flow channels can become cracked or damaged and/or portions of the porous electrode material adjacent to the embedded flow channels can become decomposed (e.g., burnt).

In exemplary embodiments, a porous material of interest, such as a porous electrode (e.g., the porous electrode 120*a* or 120*b*), may be impregnated or imbibed with a phase-change fluid or solid (i.e., incorporated into the pores of the porous material) to facilitate high precision channel embedding or engraving with reduced or minimal heat affected zone formation. In various embodiments, the phase-change material may be chosen to possess a phase-change temperature (e.g., a boiling or melting point) that is lower than phase-change and decomposition temperatures associated with the materials of which the porous electrode is made.

In various embodiments, water may be selected as the phase-change fluid or solid. Intercalation materials, when cycled electrochemically, absorb sodium ions or other cations and certain intercalation materials can degrade if subjected to temperatures above 300° C. By virtue of its phase change, it is believed that water in liquid form provides a protective effect on functional materials embedded into an electrode material—i.e., at a boiling point of 100° C., water is likely preferentially evaporated instead of the material adjacent to an engraved channel becoming decomposed. Furthermore, by virtue of the melting process of water that occurs at an even lower temperature, water in solid (frozen) form can be leveraged, along with its vaporization property, to provide a further protective effect or buffer against heat affection. Demonstration of the impact of the impregnation process has been accomplished using liquid water (boiling point of 100° C.) within the pores of an intercalative desalination electrode comprising nickel hexacyanoferrate [NiHCF] (which decomposes at ~395° C.), Ketjen black [KB], and polyvinylidene fluoride [PVDF] (which melts at ~160° C.). However, it is to be understood and appreciated that other phase-change fluids/solids can be chosen to protect the materials with which the porous composite is made. For instance, another phase-change substance, such as another liquid at a different boiling/vaporization point (e.g., higher than or lower than that of water) can be selected to suit the electrode material of interest.

Figure 3:
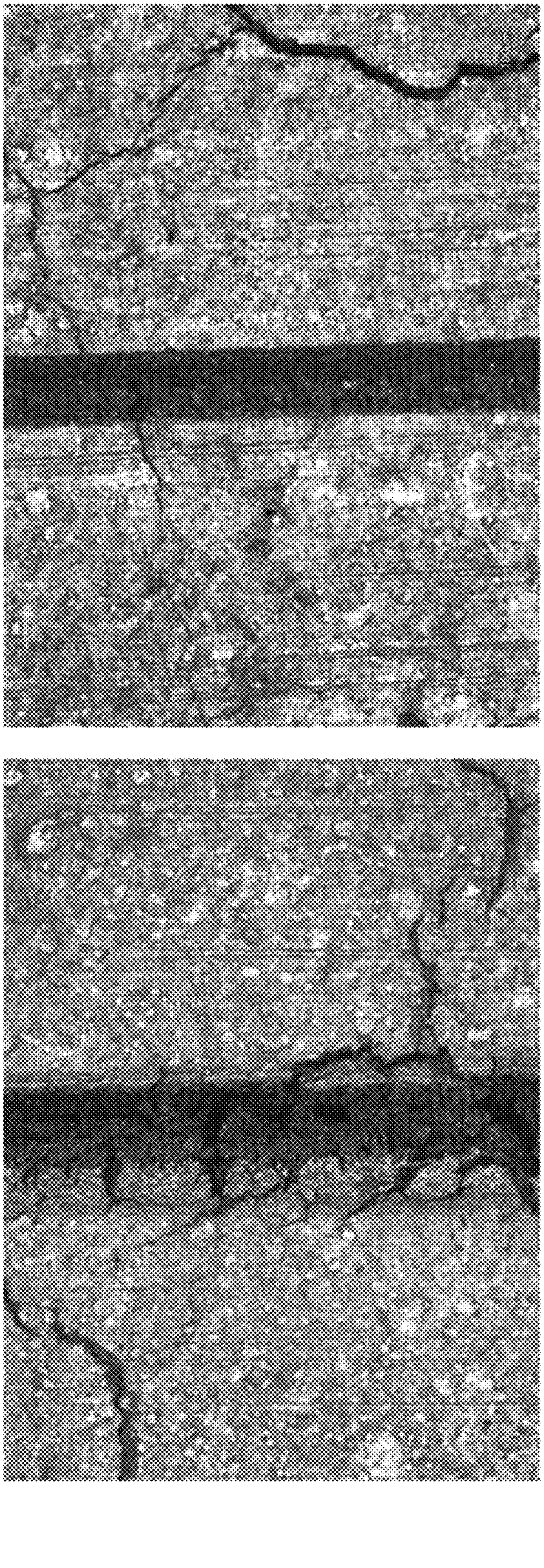
FIG. 3 shows optical microscopies of heat affected zones (HAZs) produced in sample porous materials using a standard impinging air jet as compared to using water impregnation, in accordance with various aspects described herein.

The benefits of engraving flow channels in water-impregnated porous electrodes via laser micromachining have been demonstrated through the use of two different laser sources, namely a 60 watt (W) $CO_2$ laser and a 5.5 W blue diode laser. The similar performance observed among these two lasers having disparate wavelengths (10.6 μm versus 455 nm) suggests that the associated microscopic mechanism is robust to the laser source. In an example demonstration, a composite electrode material was formed by slurry casting onto a 100 μm graphite sheet, dried, and calendered to a total thickness of 300 μm. The resulting porous sample structure is a highly porous (~60% porosity) composite that is ~200 μm thick and is adhered to a graphite sheet/foil. The porous samples were prepared for laser ablation by immersing them in a sonicated deionized (DI) water bath for 5 minutes. This process ensured the removal of air from the pores of the composite material. Once the material was sonicated in contact with water, the material remained immersed in the bath until the sample was ready for laser engraving. This step ensured minimal evaporation of impregnated water and that water remained in the pores of the electrode material. Flow channel patterns were then laser ablated in the composite materials. To maintain consistency between laser sources, the fluence (power per unit area ($kW/cm^2$)) was controlled. Laser ablated patterns were characterized with 3D Optical Profilometry. Laser patterns were attempted at various laser fluences with a standard, air-assisted (AA)

operation and with a water impregnated (WI) approach. During laser engraving, a large amount of radiative heat transfer occurs locally at the site of ablation. This radiation induces sublimation of solid material in the beam's line of sight, resulting in its removal and the creation of engraved channels. When this heat diffuses into the bulk material, degradation can occur in the form of melting or material decomposition. These are referred to as heat-affected zones (HAZs). In a standard, air-assisted operation of the laser, the pores of the composite material are filled with air. During the water-impregnated operation of the laser, these pores are filled with water. FIG. 3 shows optical microscopies of HAZs produced in sample porous materials (e.g., at 11.73 $kW/cm^2$) using a standard impinging air jet (302) as compared to using water impregnation (304). As shown in FIG. 3, the presence of water in the material's pores is shown to greatly decrease the size of HAZs by virtue of water's ability to store energy in the form of latent heat of vaporization (i.e., 2,260 kJ/kg). The water in the pores of the material protects the regions surrounding the target location by absorbing the energy that diffuses through the composite, which prevents the composite from decomposing. In summary, water impregnation of the porous material enabled laser ablation with minimal to no decomposition of the active material contained within it (NiHCF), with minimal to no melting of the polymer binder within it (PVDF), and with minimal to no degradation of the graphite sheet beneath it. In the air-assisted mode of laser ablation, the energy that diffuses to the regions surrounding the cut is enough to cause significant HAZs. Water impregnating porous electrodes demonstrably generates more uniform flow channels. Qualitatively, results show that the channels created with water-impregnated laser samples are generally more symmetric and have more uniform side walls. Quantitatively, results show that the root-mean-square roughness along the center-line and side walls of the channels are generally lower when the water impregnation approach is used. In addition to the uniformity of the channels produced, at a specific laser fluence, smaller channel dimensions were achieved with the water-impregnation method. The width and depth of the channels in the standard, air-assisted laser ablation mode were inconsistent and difficult to determine due to the HAZs.

Thus, impregnation of a porous electrode (e.g., composed of heterogenous electrode materials) with a phase-change fluid or solid enables protected, precision laser micromachining. Such impregnation has various applications, including in the fabrication of so-called bi-tortuous electrodes for energy storage batteries as well as other types of electrodes.

As briefly noted above, higher pressures (i.e., higher pumping power) used to pump fluid through electrodes having low permeability undesirably increases energy consumption. With large-area electrodes, the pumping energy can significantly increase due to the larger pressure drop, as pumping power $\dot{E}_{pump}$ scales with the square of the pressure drop $\Delta p$ ($\dot{E}_{pump}=Q\Delta p \propto \Delta p^2$, where Q is the volumetric flow rate that results from an imposed $\Delta p$ according to Darcy's law). Redox-active intercalation materials used in Faradaic deionization (FDI) have been shown (in experiments with non-flowing cells and modeling with flowing cells) to facilitate seawater desalination as a result of their high ion-storage concentrations (e.g., >4 mol/L) and salt adsorption capacities (SACs) (e.g., as large as ~100 mg/g). It is believed that FDI is a promising technology for energy-efficient water desalination if employed using embodiments of porous electrodes (containing redox-active intercalation materials) described herein. Demonstrations have shown that embodiments of the porous intercalation electrodes (embedded with interdigitated channels or microchannels described herein) can provide orders of magnitude higher effective hydraulic permeability over that of millimetric flow channel-based flow fields commonly used in conventional FDI approaches.

Figure 4A:
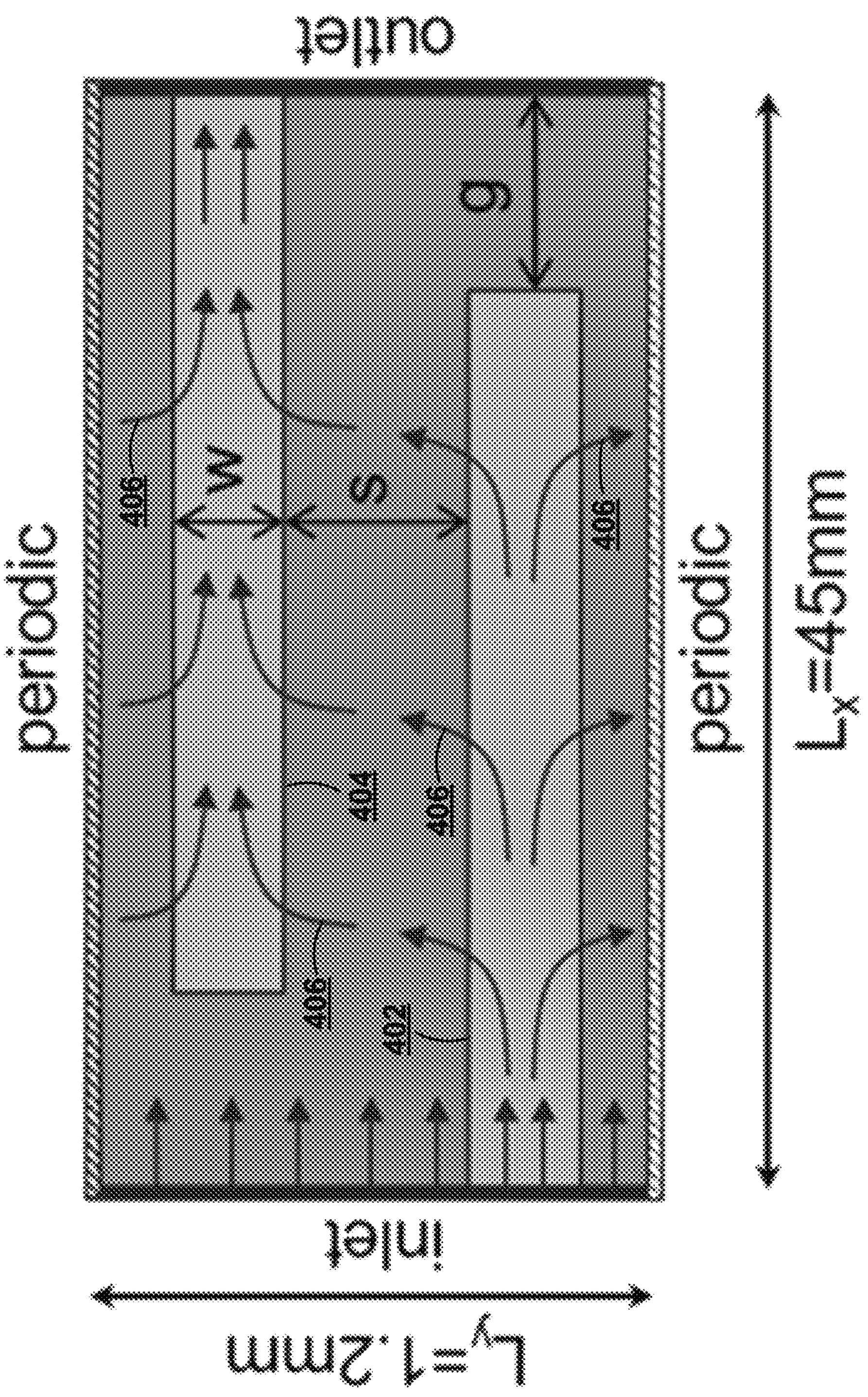
FIG. 4A is a view of a portion of an example, non-limiting embodiment of a (e.g., simulated) porous medium in accordance with various aspects described herein.

The following describes embodiments of porous intercalation electrodes that are designed with interdigitated flow fields (IDFFs) provided in the form of embedded microchannels. FIG. 4A is a view of a portion of an example, non-limiting embodiment of a (e.g., simulated) porous medium 400 in accordance with various aspects described herein. In various embodiments, the porous medium 400 may correspond to (e.g., may be the same as or similar to) one or more of the porous electrodes 120*a* and 120*b*. Patterned in the porous medium 400 is an interdigitated array of flow channels that includes an inlet channel 402 and an outlet channel 404, where the channels have a width w, a spacing s, and a gap g between their ends and electrode edges, providing a computational domain used in the Darcy-Darcy model.

In various embodiments, the microchannels may be defined to be linear or straight (or substantially linear or straight, such as with portion(s) deviating from being linear or straight by only a threshold amount). While the use of tapered channels is described above as enabling more uniformized flow through a porous medium, linear or straight channels can nevertheless provide uniform (or near uniform) flow if the appropriate design and material parameters—i.e., channel width w and electrode length (from inlet edge to outlet edge) as well as the permeability of the electrode material—are chosen. Although only one inlet channel and one outlet channel are shown in FIG. 4A, it is to be appreciated and understood that, in various embodiments, the porous medium 400 may include more or fewer inlet channels and/or more or fewer outlet channels, and thus, there may be a repetition of the interdigitated channel pattern along a transverse y-axis.

Achieving an ideal IDFF is a multi-objective optimization problem since the goal is to minimize dead zones to achieve maximum utilization of intercalation material capacity, while simultaneously maximizing hydraulic permeability and minimizing material loss due to laser ablation. The uniformity of electrolyte distribution produced by a given IDFF can be identified via its streamlines (e.g., 406 of FIG. 4A) and its residence time distribution (RTD). In various embodiments, the RTD may be calculated from the superficial velocity field obtained from a model, such as, for instance, the Darcy-Darcy flow model. The RTD is an important parameter widely used in chemical engineering practice to design reactors that allow uniform mixing and the complete reaction of raw materials, where a narrow RTD indicates that incoming fluid parcels spend a similar amount of time to travel inside the desalination cell. Such an RTD produced by certain interdigitated microchannels ensures a sharp front between diluate/brine effluent during a pause period during desalination cycling so as to minimize charge efficiency losses that arise from the intermixing of such effluents.

In exemplary embodiments, a physics-based Darcy-Darcy model may be used to guide IDFF design so as to enhance porous electrode permeability and to assure uniform (or near uniform) fluid distribution in space and time. In particular, simulation results obtained from the Darcy-Darcy model may guide the choice of dimensions for interdigitated microchannels that produce uniform flow distribution, narrow RTD, and increased hydraulic permeability, while reducing or minimizing material lost during channel embedding (e.g., laser engraving).

When designing a pattern for non-tapered interdigitated microchannels, there are three dimensions that can be varied: the macro-pore channel width w, the channel spacing s, and the channel length $l_c$. The last of these dimensions determines the gap g between the end of the channel and the edge of the electrode. The objective of choosing the correct dimensions is to ensure even distribution of flow through the electrode microstructure while increasing or maximizing effective hydraulic permeability.

To model these effects, a finite-volume solver can be implemented to solve a Darcy-Darcy model for the superficial velocity $\vec{u}_s$ [m/s] inside porous electrodes, assuming that the superficial velocity follows Darcy's law at any location in the two-dimensional domain:

$$\nabla \cdot \vec{u}_s = 0, \tag{Eq. 5}$$

$$\vec{u}_s = -\frac{k_h(x, y)}{\mu} \nabla p. \tag{Eq. 6}$$

with μ [Pa-s] being the fluid viscosity, $k_h$ (x,y) [$m^2$] being the hydraulic permeability at each location within the computational domain. This allows different permeability values to be set for porous electrode regions and microchannel regions:

$$k_h(x, y) = \begin{cases} k_{h,p}, & \text{for } (x, y) \text{ inside porous electrode region} \\ k_{h,c}, & \text{for } (x, y) \text{ inside channel region} \end{cases}. \tag{Eq. 7}$$

The permeability inside the porous region is simply equal to the measured permeability of an unpatterned calendered electrode, (e.g., taken as $k_{h,p}=0.28e^{-12}$ $m^{-2}$ for a sample pair of electrodes), whereas the permeabilities within channels are estimated from the Boussinesq solution for Poiseuille flow in rectangular cross-section channel with h-by-l size:

$$Q = \frac{k_h A}{\mu} \nabla p = \frac{hl\nabla p}{\mu}\left[\frac{h^2}{12} - \frac{16h^3}{l\pi^5}\sum_{n=1}^{\infty}\frac{1}{(2n-1)^5}\frac{\cosh(\beta_n l)-1}{\sinh(\beta_n l)}\right]. \tag{Eq. 8}$$

Thus, $$k_{h,c} = \frac{h^2}{12} - \frac{16h^3}{l\pi^5}\sum_{n=1}^{\infty}\frac{1}{(2n-1)^5}\frac{\cosh(\beta_n l)-1}{\sinh(\beta_n l)} \tag{Eq. 9}$$

Such an approach has precedent from the geosciences, where permeation through fractured rock is captured in a permeability for microscopic porosity and a separate permeability for fissures. The obtained discrete equations can be solved via the Finite Volume Method (FVM) using an iterative linear solver called the Aggregation Based Algebraic Multigrid (AGMG), and the solution of $\vec{u}_s$ can then be used to calculate the stream function via integration:

$$\psi(x, y) = \psi_0 + \int_{x_0,y_0}^{x,y} u_s(x)dy - u_s(y)dx. \tag{Eq. 10}$$

Contours of ψ can then be used to determine streamlines. The residence time of a fluid parcel can be calculated by dividing the fluid volume in each streamtube i by the volumetric flow rate inside that streamtube $$t^i_{Res} = V^i_{screamtube}/Q^i_{streamtube}.$$

Here, the volumetric flow rate is equal to the difference between stream function values at the respective walls of the streamtube:

$$Q^i_{screamtube} = \Delta\psi^i.$$

Figure 4B:
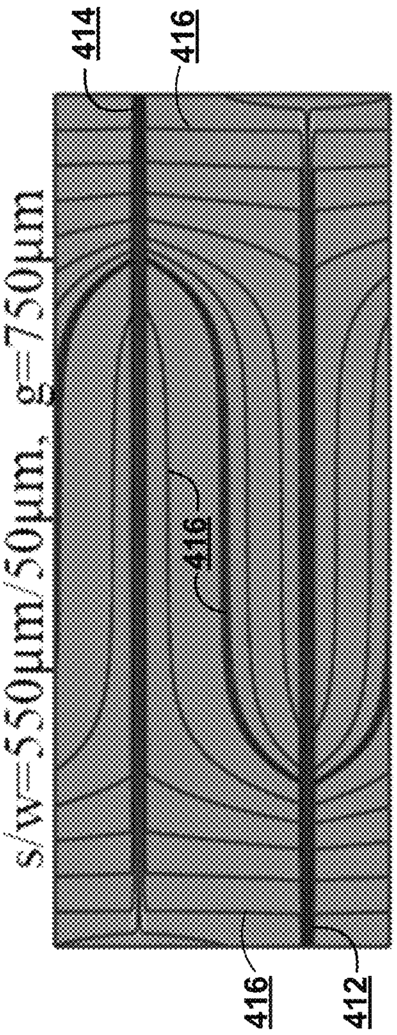
FIGS. 4B and 4C are views of portions of example, non-limiting embodiments of (e.g., simulated) porous media having the same gap g but with different channel spacings and widths, illustrating the different streamlines, in accordance with various aspects described herein.
Figure 4C:
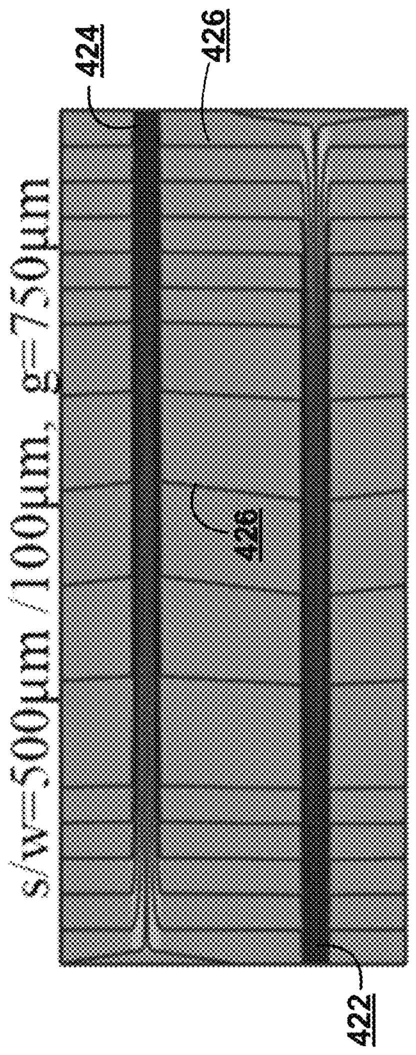
Figure 4D:
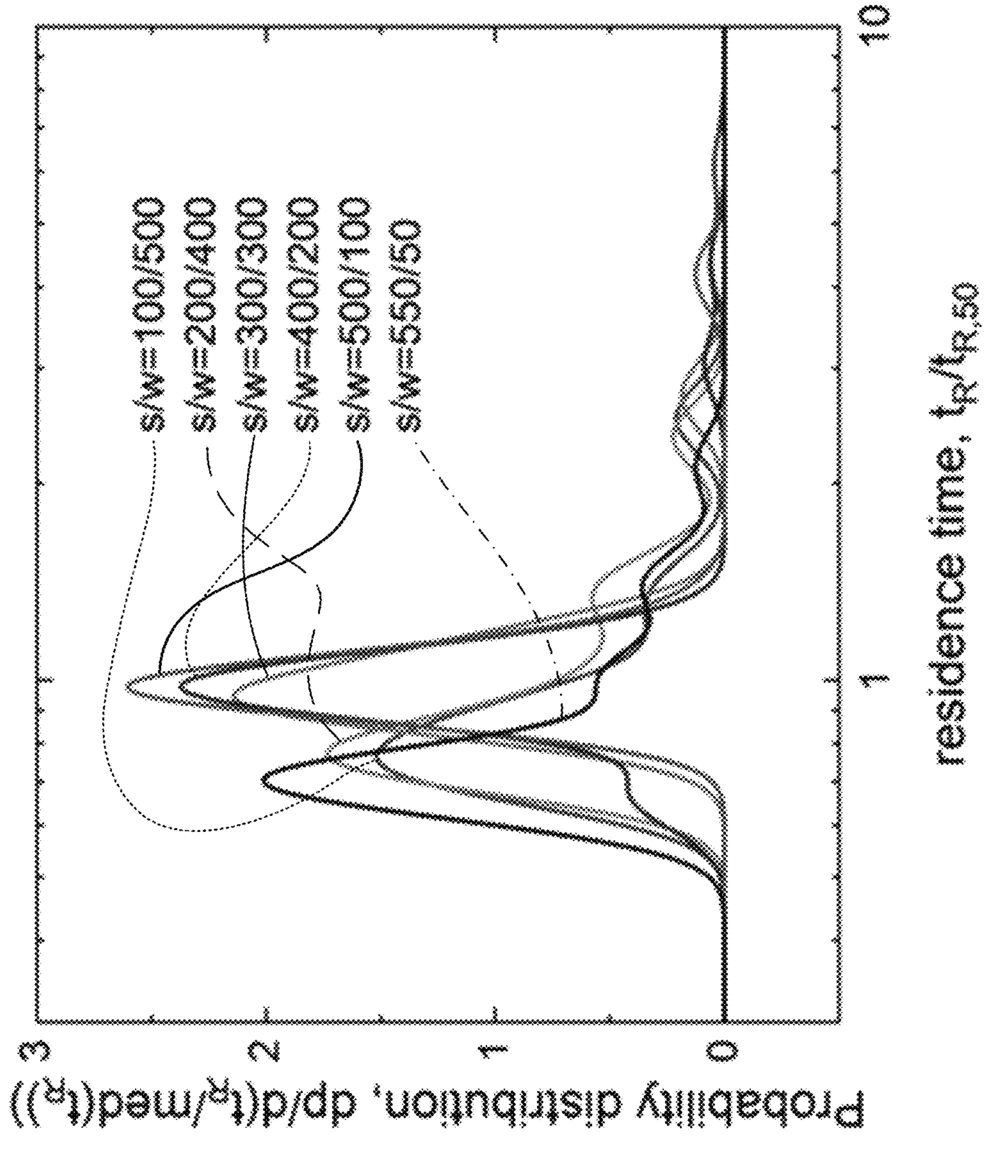
FIG. 4D illustrates Kernel density estimates of resident time distributions (RTDs) obtained from interdigitated flow fields (IDFFs) of the same gap g and various spacing/width (s/w) values, in accordance with various aspects described herein.
Figure 4E:
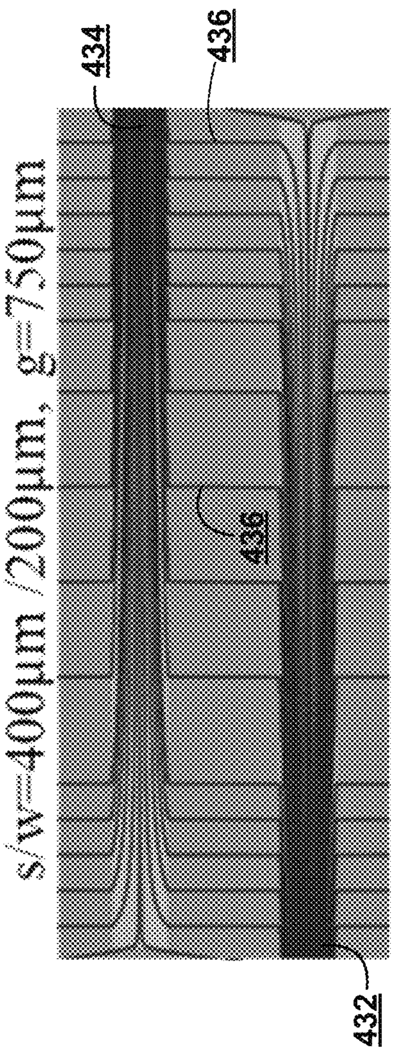
FIG. 4E is a view of a portion of another example, non-limiting embodiment of a porous medium in accordance with various aspects described herein.

FIGS. 4B and 4C are views of portions of example, non-limiting embodiments of (e.g., simulated) porous media 410 and 420 (with corresponding inlet channels 412, 422 and outlet channels 414, 424) having the same gap g but with different channel spacings and widths, illustrating the different streamlines 416 and 426, in accordance with various aspects described herein. FIG. 4D illustrates Kernel density estimates of RTDs obtained from IDFFs of the same gap g (750 μm) and various s/w values. As depicted in FIGS. 4B and 4C, increasing the channel width w from 50 μm to 100 μm results in the streamlines within the center of the porous-electrode region changing shape from serpentine to nearly perpendicular with the channels. This effect shows that fluid parcels possess similar path lengths through the porous region of the electrode for the latter channel width w that also coincides with a narrower RTD for that width (FIG. 4D). Further increase of channel width w decreases path length but does not change flow distribution significantly (compare, for instance, the porous medium 420 of FIG. 4C with the porous medium 430 of FIG. 4E having inlet and outlet channels 432, 434 and streamlines 436). Among all examined cases, the RTD is narrowest for s/w=500/100 μm (FIG. 4C), and it widens with increasing channel width w. In any case, it can be seen from FIGS. 4B, 4C, and 4E that the distribution of pressure gradient between two microchannels is not necessarily uniform (or near uniform) in the streamwise direction. A poor design (e.g., FIG. 4B) produces higher pressure gradients near the two ends of the channels, resulting in a dead zone in the middle region of the electrode where fluid becomes stagnant and hence a broader RTD. On the other hand, better designs (e.g., FIGS. 4C and 4E) result in a more uniform pressure gradient distribution and reduces or minimizes the fluid stagnation region, yielding a more narrow RTD. The slightly earlier onset of RTD in the case of s/w=400/200 (i.e., FIG. 4E) is likely due to the fluid near the inlet moving to the outlet microchannel 434 more quickly, but the overall RTD as compared to the case of s/w=500/100 (i.e., FIG. 4C) is nevertheless similar.

In essence, embedding straight channels that are too narrow (e.g., having a channel width w less than a threshold width) tend to "short circuit" the flow between ends of the channels, whereas embedding straight channels that are wide enough (e.g., having a channel width w greater than or equal to the threshold width) relative to a given size (i.e., length) of the electrode provides for more uniform (or near uniform) flow. In various embodiments, therefore, exemplary porous electrode 400 may be configured with straight channels having a width w that is greater than or equal to a threshold determined based on the size of the electrode. For instance, in a case where the electrode has a length of 45 mm, the width w of one or more of the straight channels embedded therein may be greater than or equal to a first threshold width, and in a case where the electrode has a length of 100 mm, the width w of one or more of the straight channels embedded therein may be greater than or equal to a second threshold width that is larger than the first threshold width.

Figure 4F:
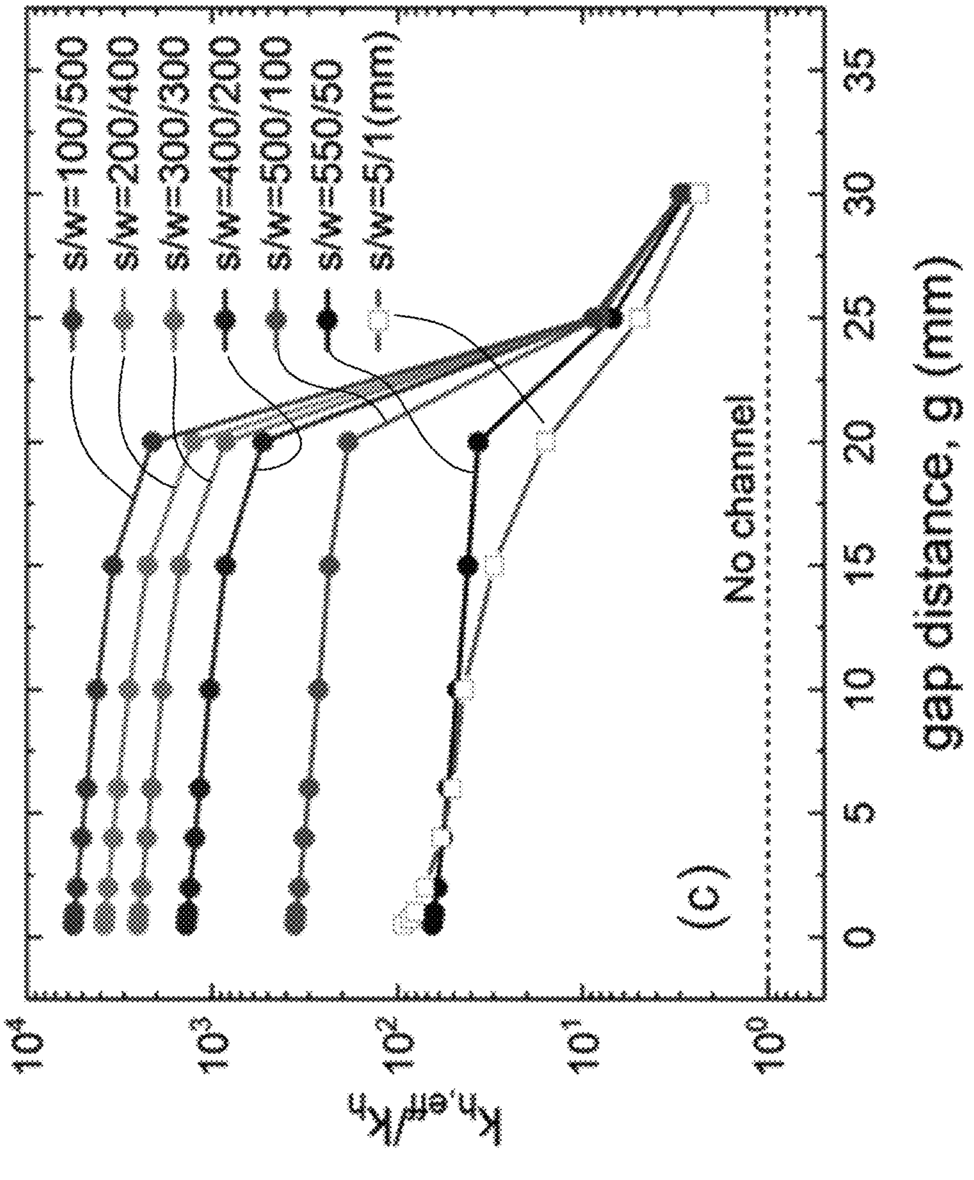
FIG. 4F illustrates ratios between permeability of various electrodes with channels and without channels in accordance with various aspects described herein.

FIG. 4F illustrates ratios between permeability of various electrodes with channels and without channels, where hollow markers represent data obtained with conventional millimetric channels having s/w=5 mm/1 mm. As depicted in FIG. 4F, the ratio between the effective hydraulic permeability of an electrode embedded with IDFFs ($k_{h,eff}$) approaches $10^4$ times higher permeability than unpatterned electrodes ($k_h$) for cases simulated using the constraint s+w=600 μm, where higher effective permeability is achieved at smaller gaps and wider channels. In addition, the increase in $k_{h,eff}$ diminishes when channels are further widened. Also, conventional millimetric IDFFs (s/w=5 mm/1 mm in FIG. 4F) are shown to be much less effective at increasing permeability as compared to microchannel IDFFs of similar spacing-to-width ratio. To this point, the IDFF with s/w=400 μm/200 μm and g=750 μm is the best design of the group with the most uniform flow distribution, a narrow RTD, and three orders of magnitude increased permeability. While the amount of electrode material lost during laser ablation may be about twice that of the IDFF with s/w=500 μm/100 μm and g=750 μm, the impregnation approach discussed above with respect to FIG. 3 can be employed to reduce or prevent such loss.

Embedding straight channels of a certain width w into an electrode of a given size generally enhances the electrode's initial permeability, resulting in an effective permeability for the entire electrode. In certain calendered electrodes with low permeability ($k_h$=0.28 $\mu m^2$), for example, straight microchannels yielded higher improvement in the effective permeability as compared to conventional, millimetric channels (see FIG. 4F).

Figure 4G:
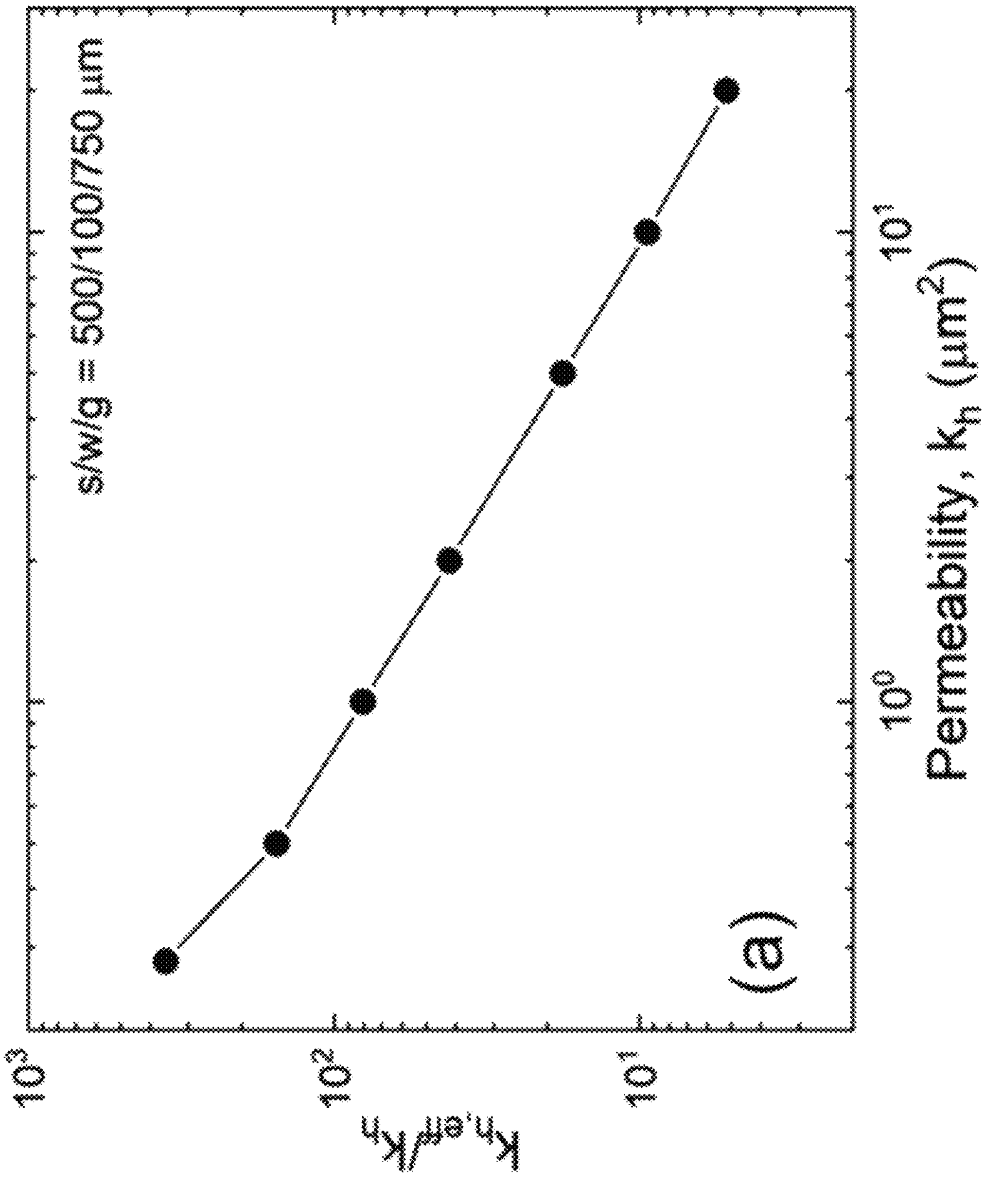
FIG. 4G is a graphical representation illustrating the normalized effective permeability of pattern electrodes with varying initial permeability.
Figure 4H:
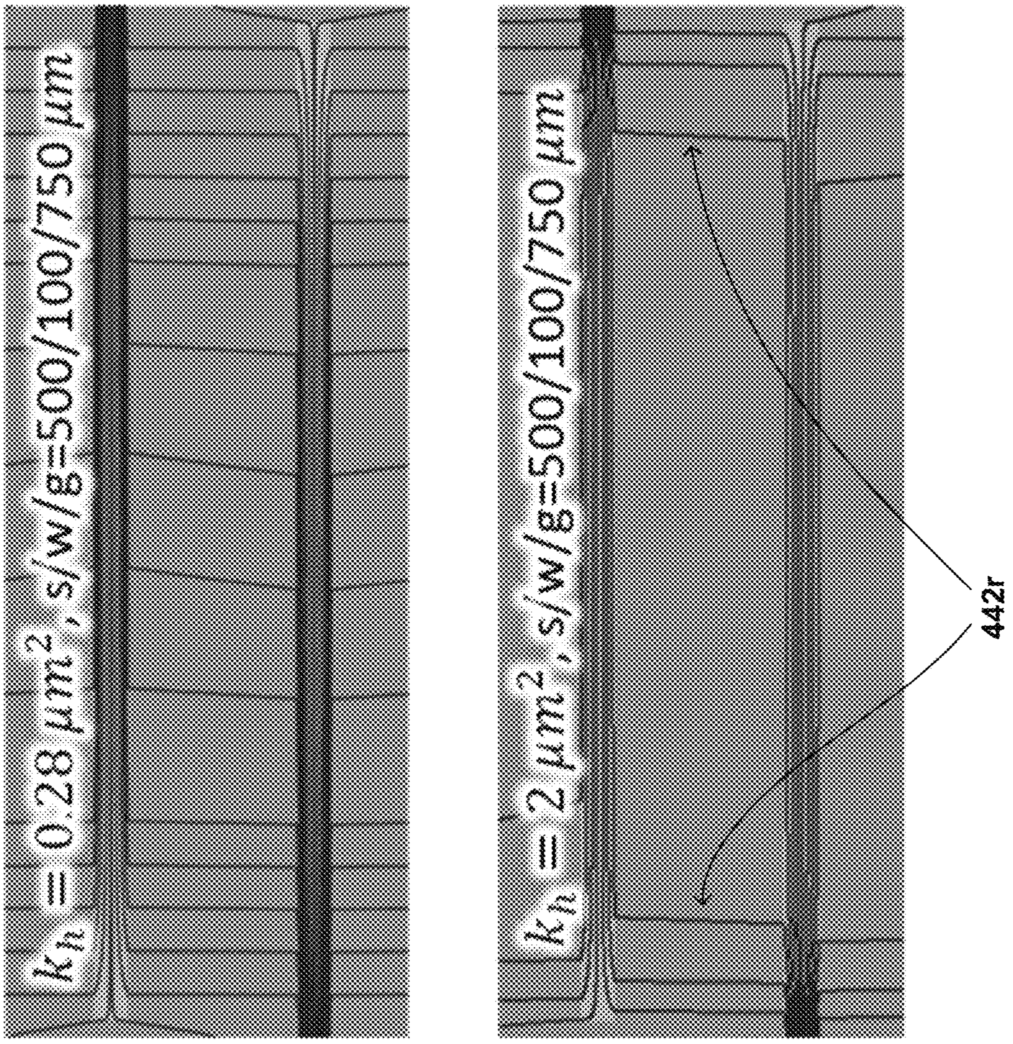
FIG. 4H shows views of portions of example, non-limiting embodiments of (e.g., simulated) porous media, illustrating streamlines for the same interdigitated flow field, but with varying electrode permeabilities.

FIG. 4G is a graphical representation illustrating the normalized effective permeability of patterned electrodes with varying initial permeability $k_h$. Based on a series of simulations using a same set of microchannel spacing s, width w, and gap g (s/w/g=500/100/750 μm), where the permeability $k_h$ of the porous electrode material was varied, it was determined that microchannels can improve the effective permeability of certain electrodes (e.g., those for desalination having permeability of about 0.28 $\mu m^2$) by several orders of magnitude. However, as shown in FIG. 4G, this effect decreases exponentially if used for electrodes that are already highly permeable (such as those in redox-flow batteries (RFBs)). That is, for electrodes having higher (initial) permeabilities, the enhancement in permeability possible from embedding straight channels therein is less (or modest) as compared to that for electrodes having lower (initial) permeabilities. For instance, as can be seen in FIG. 4H (which shows streamlines for the same interdigitated flow field, but with varying electrode permeabilities), straight channels of a width w that provide for uniform (or near uniform) flow in a first electrode (440) having a low initial permeability may not provide such uniform (or near uniform) flow in a second electrode (442) having a higher (say, an order of magnitude higher) initial permeability. Rather, in the second electrode (442), undesired routing (442*r*) of fluid may nevertheless occur at the ends of the straight channels. Thus, while straight channels might have a threshold width w above which they will generally provide a desired flow-related function, that threshold width w may depend not only on the size of the electrode but also on the electrode's initial permeability. In other words, the permeability of an electrode will not necessarily increase significantly just by engraving a flow field design with arbitrary channel sizes (such as with channels that are similar in size to those used in conventional RFBs).

While hierarchical networks are described herein as being capable of facilitating uniform (or near uniform) fluid flow through a porous electrode, it has been determined through modeling that hierarchical networks are not, in general (or as a rule), beneficial. Instead, judicious selection of various design parameters must be made in order to yield the desired flow path length and apparent (or resulting) permeability of the resulting porous electrode. In essence, what is desired are electrodes that have a high apparent permeability (to reduce or minimize pressure required to flow at a certain flow rate) while having a small path length (to increase or maximize ion diffusion). As described in more detail below, a model may be created to predict the apparent permeability of a two-scale hierarchically patterned electrode as a function of its design parameters. From this, a Pareto plot of that apparent permeability normalized by the permeability of the electrode material (i.e., the apparent permeability factor) versus a minimum path length may be constructed. Designs may be constrained to have a fixed fraction of macroporosity constituted by channels—e.g., 20% in one case, where 80% of the electrode material remains after patterning. As discussed below, not all hierarchical patterns are beneficial. In fact, some hierarchical channel designs yield poor permeability—i.e., permeability that is lower than that produced by a single scale of channels. It has been determined that the best hierarchical channel designs are dependent on the magnitude of the porous electrode material's permeability among a multitude of other factors.

In one study, an exemplary model may be created to predict the apparent permeability of two-scale hierarchical networks incorporating tapered, interdigitated channels. It is to be understood and appreciated that similar modeling may be done for two-scale hierarchical networks incorporating channels of other shapes or a combination of one or more shapes. Similar modeling may also be done for higher-scale hierarchical networks that incorporate tapered, interdigitated channels or channels of other shapes or a combination of one or more shapes.

The apparent permeability factor is defined as apparent permeability divided by the permeability of an unpatterned porous electrode material and thus represents the multiple by which apparent permeability is enhanced relative to that of the unpatterned porous electrode material. Again, optimal electrodes possess short flow path lengths that facilitate diffusion within the electrodes. Employing the same theoretical technique used to determine apparent permeability, the orientation of local velocity within porous electrode domains surrounded by the secondary and primary channels can be estimated. This orientation enables the estimation of flow path length within the corresponding porous electrode domains based on the dimensions of such domains along the flow path.

Figure 5A:
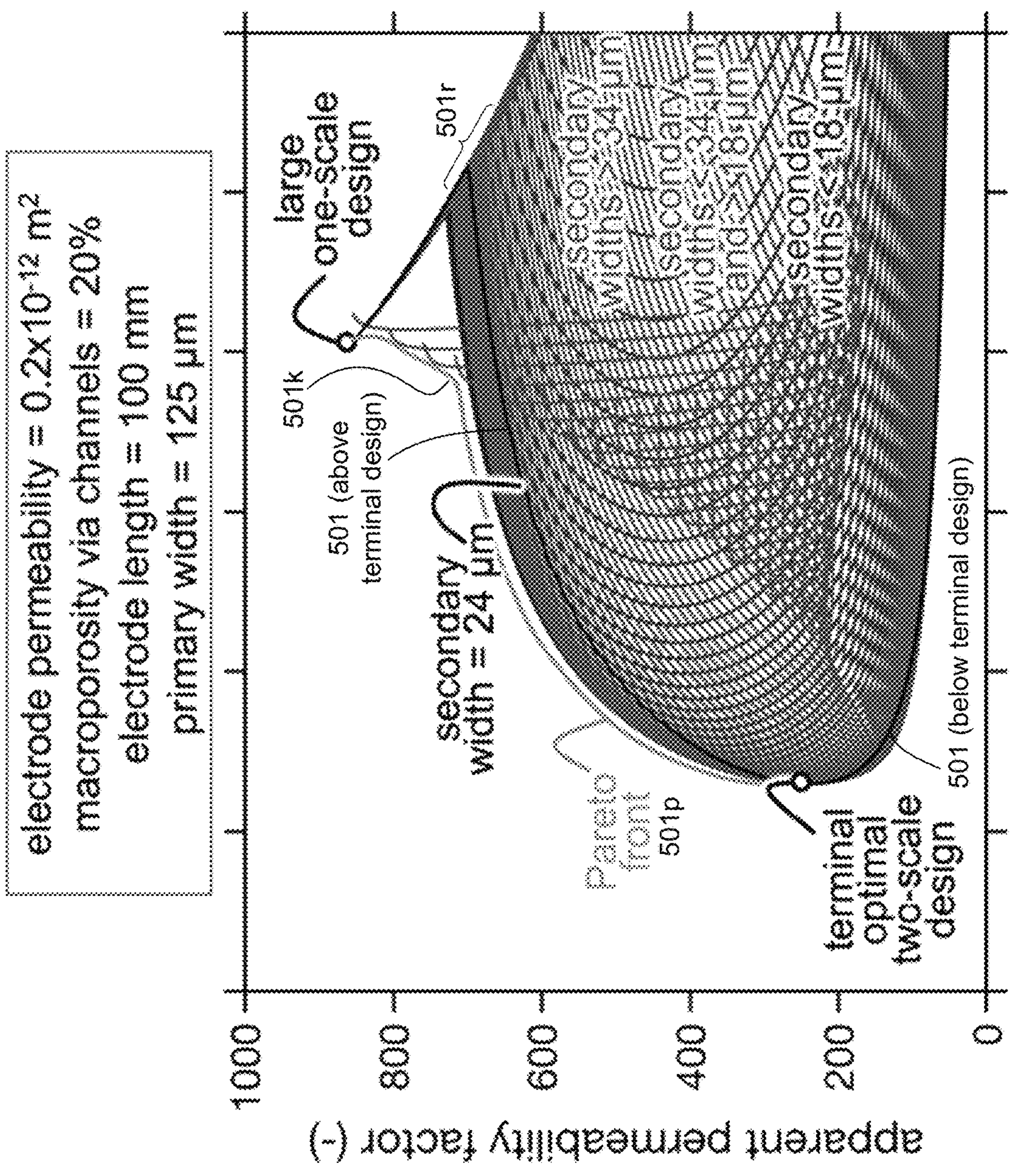
FIGS. 5A and 5B show Pareto plots of the apparent permeability factor versus flow path length for two scale hierarchical flow networks using cube-root tapered channels that are interdigitated with total macroporosity fixed, in accordance with various aspects described herein.
Figure 5B:
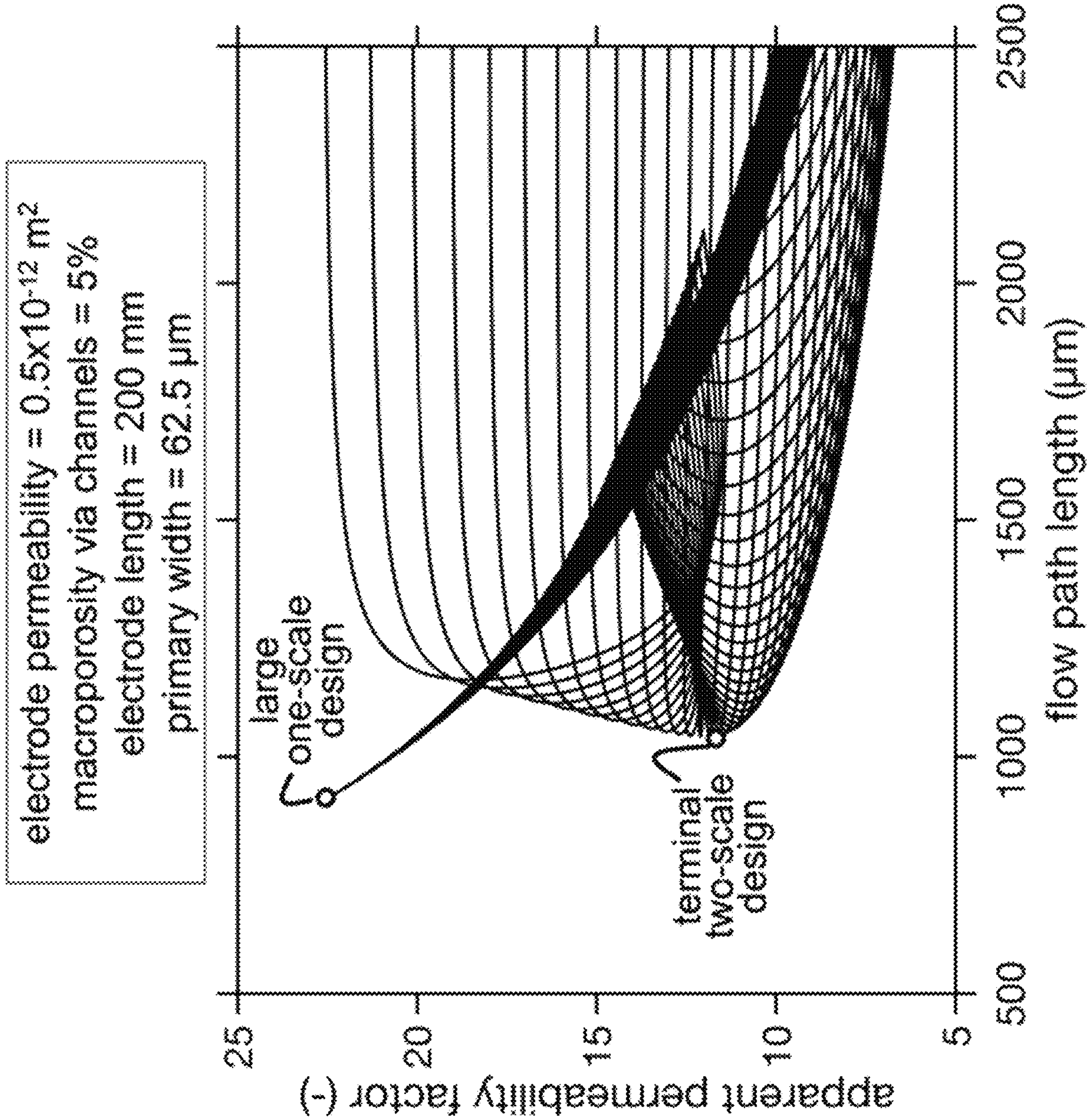

FIGS. 5A and 5B show Pareto plots of the apparent permeability factor versus flow path length for two-scale hierarchical flow networks using cube-root tapered channels that are interdigitated with total macroporosity fixed, in accordance with various aspects described herein. As shown, the Pareto plots define the performance of such two-scale hierarchical networks with axes showing the apparent permeability factor (which we desire to increase or maximize) and showing the flow path length (which we desire to reduce or minimize). The Pareto plots thus facilitate multi-objective improvement or optimization in relation to flow path length and apparent permeability.

Certain constraints on the design of these networks can be introduced for a given Pareto plot—i.e., by fixing the total macroporosity constituted by all channels (both secondary and primary channels), the width of primary channels (i.e., measured at a widest part of the primary channel), the overall length of the corresponding unpatterned electrode in which the channels are to be embedded, and/or the hydraulic permeability of the unpatterned porous electrode material. Here, the individual curves in the plots of FIGS. 5A and 5B were obtained using a certain maximum width for secondary channels (i.e., measured at a widest part of the secondary channel) and by varying the spacing between secondary channels and the spacing between primary channels so as to constrain total macroporosity to the value of interest.

Depicted in FIG. 5A is a plot for an example case in which a subset of two-scale designs constitutes a Pareto front 501*p*, so as to achieve smaller flow path lengths than a corresponding large, one-scale design. This plot was constrained to use only 20% macroporosity for channels, thus retaining 80% of the porous electrode material that was available before patterning. Further, primary channels with a maximal width of 125 μm were used. The curves in this Pareto plot are generated by varying the secondary channel spacing. As depicted, the Pareto plot exhibits numerous two-scale hierarchical designs that form the Pareto front 501*p* along which substantially decreased flow path length is achieved relative to a corresponding one-scale design composed only of 125 μm wide primary channels. Further, there is a particular secondary channel width of approximately 24 μm (curve 501) that minimizes flow path length globally (approximately 130 μm versus 910 μm for the large one-scale design), while also being the terminal design on the Pareto front 501*p*. The portion of curve 501 above the terminal design location corresponds to designs in which the secondary channel spacing is larger than that of the terminal design, and the portion of curve 501 below the terminal design location corresponds to designs in which the secondary channel spacing is smaller than that of the terminal design. Though the particular secondary channel width (24 μm) only coincides with the Pareto front 501*p* at its terminal location, the other designs that utilize this secondary channel width, albeit with a larger spacing between secondary channels than in the terminal design, nevertheless produce apparent permeability and flow path length that are relatively close to those of the Pareto front 501*p*—i.e., producing an apparent permeability factor as large as approximately 700X.

In addition, as depicted, a range of secondary channel widths produce flow path lengths near that of the terminal design, while simultaneously coinciding with the Pareto front 501*p* at certain points. Recognizing this feature of the performance space for two-scale hierarchical networks, those secondary channel widths that provide flow path lengths within a threshold (e.g., within 10%) of the terminal value can be identified to determine the associated range of secondary channel widths that produce performance curves immediately adjacent to or coinciding with the Pareto front 501*p*. The set of performance curves for such secondary channel widths (approximately 18 μm to 34 μm), which respectively correspond to various secondary channel spacings, are shown approximately by reference number 501*r*. It can be seen that, above an apparent permeability factor of approximately 700X, the Pareto front 501*p* begins to deviate from the performance of the aforementioned group of designs. Notably, two-scale designs using secondary channel widths that are substantially larger than 34 μm emerge as the designs comprising the Pareto front 501*p* for the remainder of the Pareto front 501*p*'s extent toward the limit of a large one-scale design. The foregoing illustrates that, under certain constraints and electrode parameters, there exist a subset of two-scale hierarchical designs that achieve substantially reduced flow path length relative to the corresponding large, one-scale design in the corresponding space. However, it is also possible that, when the values of certain constraints and electrode parameters are changed, the performance space can have no two-scale hierarchical designs that belong to the Pareto front 501*p*. An example scenario of this is illustrated in FIG. 5B with different constraints—i.e., a substantially lower macroporosity via channels (only 5%), a higher porous electrode permeability (5 $\mu m^2$), and a smaller primary channel width (62.5 μm). In this scenario, all two-scale designs produce higher flow path length and lower apparent permeability than the corresponding large one-scale design in the same space. This example demonstrates that hierarchical networks are not, in general, beneficial. Instead, judicious selection of the associated design parameters must be made in order to yield the desired flow path length and apparent permeability.

Figure 5C:
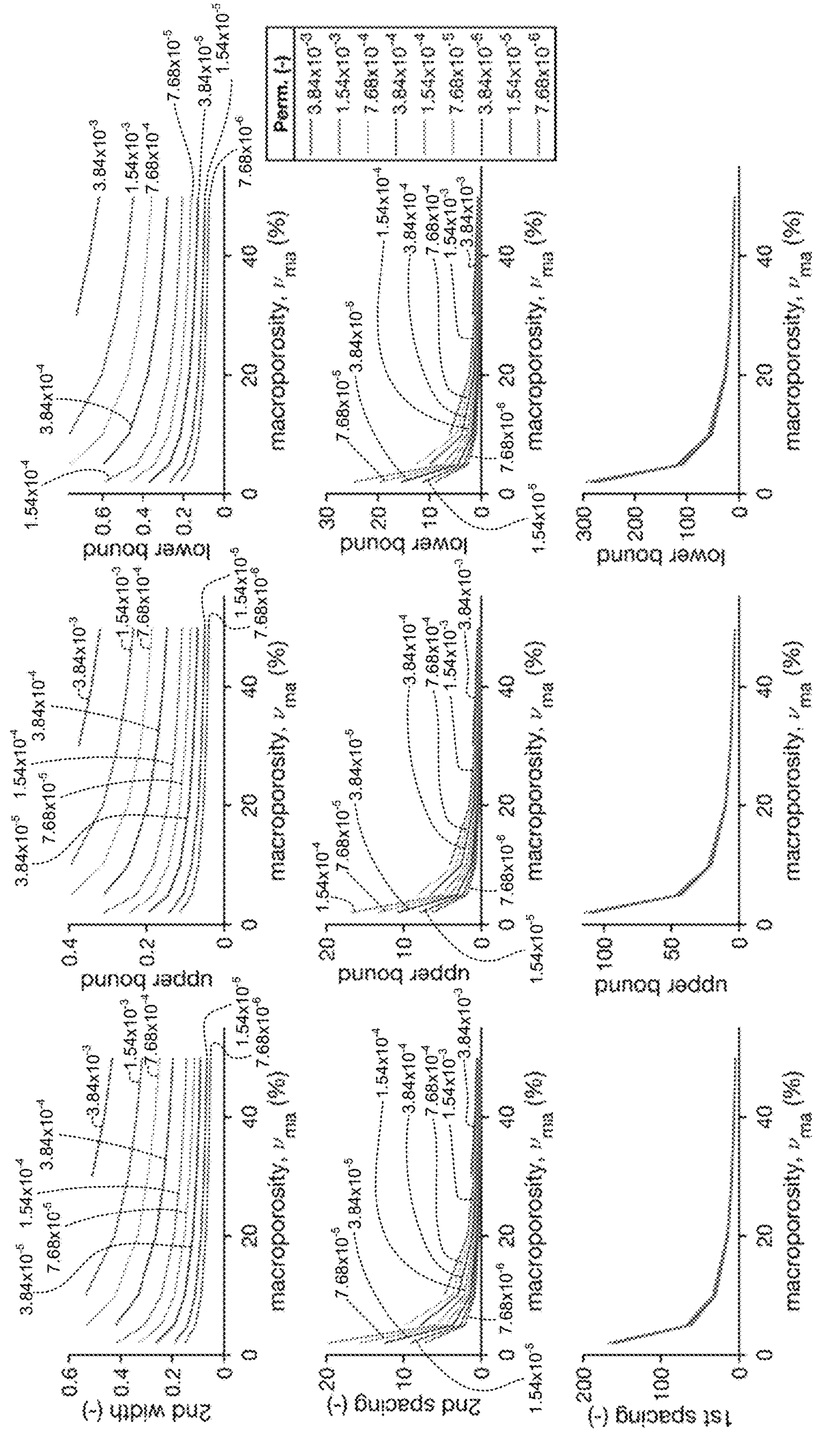
FIG. 5C shows non-dimensional similarity variables that define the geometry of terminal two-scale hierarchical designs, as a function of macroporosity, in accordance with various aspects described herein.
Figure 5D:
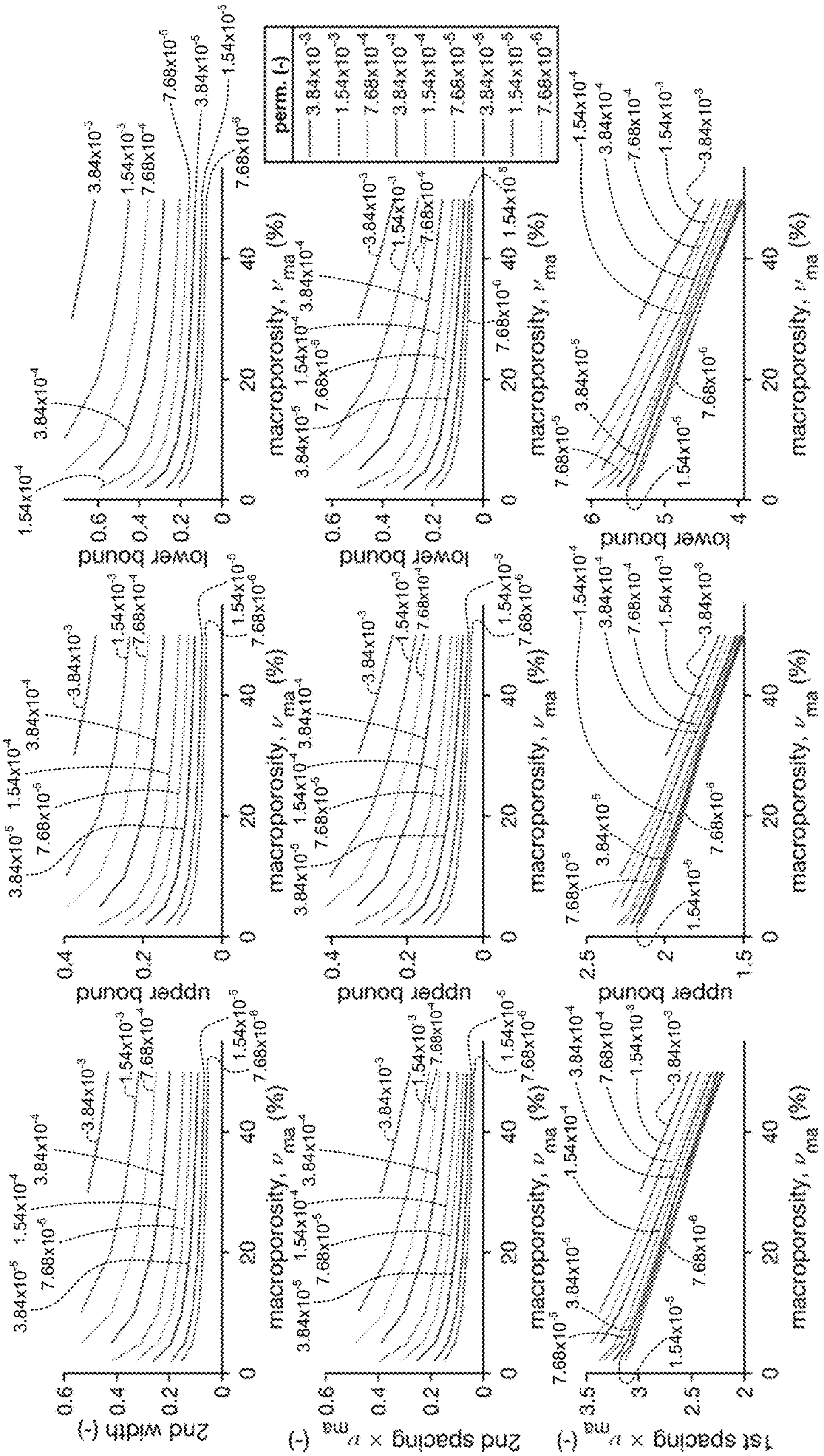
FIG. 5D shows macroporosity-scaled non-dimensional similarity variables for terminal two-scale hierarchical designs, as a function of macroporosity, in accordance with various aspects described herein.
Figure 5E:
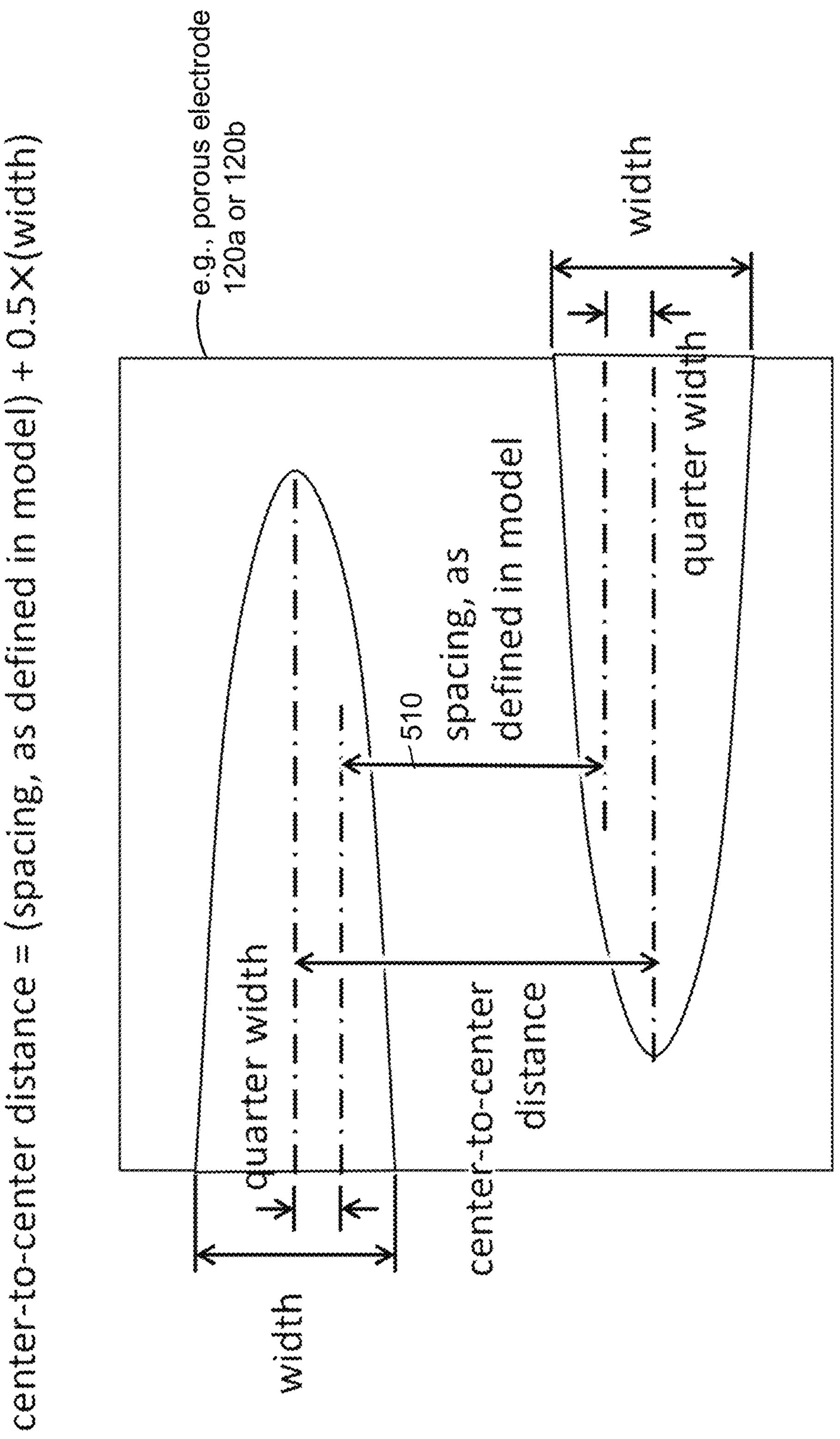
FIG. 5E illustrates how the spacing between channels may be defined for modeling using a Pareto plot, in accordance with various aspects described herein.

It is to be understood and appreciated that, while the foregoing proposes identifying "terminal designs" and sets of designs in their vicinity, the terminal design in itself can provide a guideline for other designs found over much of the remainder of the Pareto front 501*p*. In particular, by using the terminal secondary channel width (or any secondary channel width in an approach range having minimum flow path length in its vicinity), secondary channel spacing values can be chosen that are larger (not smaller) than the terminal secondary channel spacing to follow the trajectory of the Pareto front 501*p* to achieve increased apparent permeability. It is worth noting how channel spacing (whether between primary channels or between secondary channels) may be defined for purposes of the aforementioned modeling. For instance, FIG. 5E illustrates how the spacing between channels is defined for the modeling described above. Particularly, channel spacing may be defined as shown by reference number 510, where the center-to-center distance between channels may be equal to that spacing 510 plus one-half of the channel width at its widest point.

Returning briefly to FIG. 5A, while the terminal design may be the design that provides the smallest flow path length while having the best apparent permeability factor for that flow path length, it can be seen that there are nevertheless other practical configurations that can be used—e.g., designs with other secondary channel spacings, such as those that are slightly larger than (e.g., within a threshold from) that of the terminal design, which provide for flow path lengths that are just slightly larger than that of the terminal design and apparent permeability factors that are even higher than that of the terminal design.

Further, it can be seen that there is a point (or "kink") 501*k* in the Pareto front 501*p* where the optimal configuration varies from those with secondary channel widths that are in the vicinity of the secondary channel width of the terminal design (e.g., much smaller than the primary channel width) to drastically different configurations with very large secondary channel widths that approach the primary channel width. Care may be taken to identify such a point 501*k*, which can facilitate selection of appropriate design parameters.

The aforementioned Pareto plots were constructed using example scenarios with certain design constraints and electrode parameters in order to illustrate the principles that govern their design. What follows is a discussion of how the better hierarchical channel designs depend on the values of design constraints and electrode parameters. In an example demonstration, the set of secondary channel widths that produce minimum flow path lengths within 10% of that provided by the terminal point of the Pareto front in the corresponding performance space (as defined by the associated constraints and electrode parameters) are identified.

One parameter investigated in this regard is the length of the unpatterned electrode, the results of which are shown in Table 1 as a function of the macroporosity comprised by channels within the electrode. Inspection of these optimal two-scale design dimensions reveals insignificant changes when electrode length is varied either two-fold or five-fold, providing the confidence that these optimal designs are robust with respect to electrode size. However, while secondary channel width, secondary channel spacing, and primary channel spacing are relatively invariant with electrode length, the corresponding primary channel length must in fact scale with the extent of the electrode.

TABLE 1

Terminal optimal two-scale design dimensions versus macroporosity predicted with 0.2 μm$^2$ porous electrode permeability and 125 μm primary width for different electrode lengths. The emboldened line in Table 1 shows dimensions for the case shown in FIG. 5A. The values of secondary channel width, secondary channel spacing, and primary channel spacing first show the corresponding values that define the terminal point on the Pareto front, while each range of dimensions in parentheses indicates the range of values that produce minimum flow path lengths within 10% of that of the terminal point.

| electrode length (m) | macroporosity via channels (%) | secondary width (μm) | secondary spacing (μm) | primary spacing (mm) |
|---|---|---|---|---|
| 0.1 | 5 | 38.3 (28.5-54.1) | 719.1 (618.1-902.2) | 8.0756 (5.5151-14.1663) |
| 0.1 | 10 | 30.3 (22.7-42.8) | 276.1 (239.7-345.4) | 3.8685 (2.6419-6.7862) |
| 0.1 | 20 | 24.1 (18-34.1) | 102.8 (89.3-128.1) | 1.7922 (1.2322-3.165) |
| 0.1 | 30 | 21.1 (15.8-29.9) | 55.7 (48.5-69.3) | 1.1145 (0.7611-1.9682) |
| 0.1 | 40 | 19.3 (14.5-27.3) | 35 (30.6-43.5) | 0.7766 (0.5268-1.3714) |
| 0.1 | 50 | 18 (13.5-25.5) | 23.8 (20.8-29.5) | 0.567 (0.3847-1.0081) |
| 0.2 | 5 | 38.3 (28.5-54.1) | 718.2 (617.6-901.7) | 8.1091 (5.5233-14.2141) |
| 0.2 | 10 | 30.3 (22.7-42.8) | 276.5 (239.8-345.4) | 3.8463 (2.6392-6.792) |
| 0.2 | 20 | 24.1 (18-34.1) | 102.7 (89.6-128) | 1.7977 (1.2244-3.1744) |
| 0.2 | 30 | 21.1 (15.8-29.9) | 55.7 (48.7-69.2) | 1.1123 (0.7576-1.9788) |
| 0.2 | 40 | 19.3 (14.5-27.3) | 35 (30.6-43.5) | 0.7746 (0.5276-1.378) |
| 0.2 | 50 | 18 (13.5-25.5) | 23.8 (20.8-29.5) | 0.568 (0.3841-1.0105) |
| 0.5 | 5 | 38.3 (28.5-54.1) | 719.2 (618.4-901.9) | 8.071 (5.5089-14.1941) |
| 0.5 | 10 | 30.3 (22.7-42.8) | 276.3 (239.2-345.5) | 3.855 (2.6532-6.7797) |
| 0.5 | 20 | 24.1 (18-34.1) | 102.8 (89.5-128.1) | 1.796 (1.2259-3.1586) |
| 0.5 | 30 | 21.1 (15.8-29.9) | 55.6 (48.7-69.3) | 1.1189 (0.7574-1.9678) |
| 0.5 | 40 | 19.3 (14.5-27.3) | 35 (30.6-43.5) | 0.7765 (0.5256-1.377) |
| 0.5 | 50 | 18 (13.5-25.5) | 23.8 (20.8-29.5) | 0.5664 (0.3834-1.0128) |

Despite the relative insensitivity of optimal designs to electrode length, it can be seen that there is a strong dependence of optimal design parameters on porous electrode permeability and on primary channel width. Table 2 shows the corresponding optimal two-scale design dimensions obtained with various values of electrode permeability. From this data, it is evident that the terminal secondary channel width increases by roughly 25% when permeability is doubled, with similar increases occurring for secondary channel spacing.

TABLE 2

Terminal optimal two-scale design dimensions versus macroporosity predicted with 125 μm primary width and 0.1 m electrode length for different porous electrode permeability values. The values of secondary width, secondary spacing, and primary spacing first show the corresponding values that define the terminal point on the Pareto front, while each range of dimensions in parentheses indicates the range of values that produce minimum flow path lengths within 10% of that of the terminal point. In contrast, the primary spacing is practically invariant with the same level of permeability change.

| electrode permeability length (μm$^2$) | macroporosity via channels (%) | secondary width (μm) | secondary spacing (μm) | primary spacing (mm) |
|---|---|---|---|---|
| 0.1 | 5 | 30.3 (22.7-42.8) | 570.7 (493.6-714.6) | 7.9683 (5.4783-13.978) |
| 0.1 | 10 | 23.9 (17.9-33.8) | 219.6 (190.8-273.6) | 3.7917 (2.6068-6.696) |
| 0.1 | 20 | 19.1 (14.3-26.9) | 81.6 (71.1-101.5) | 1.7684 (1.2158-3.1229) |
| 0.1 | 30 | 16.7 (12.5-23.6) | 44.2 (38.6-54.8) | 1.0997 (0.751-1.9551) |
| 0.1 | 40 | 15.3 (11.4-21.6) | 27.8 (24.4-34.5) | 0.7662 (0.5198-1.3622) |
| 0.1 | 50 | 14.3 (10.7-20.1) | 18.9 (16.6-23.4) | 0.5595 (0.3795-1.0014) |
| 0.2 | 5 | 38.3 (28.5-54.1) | 719.1 (618.1-902.2) | 8.0756 (5.5151-14.1663) |
| 0.2 | 10 | 30.3 (22.7-42.8) | 276.1 (239.7-345.4) | 3.8685 (2.6419-6.7862) |
| 0.2 | 20 | 24.1 (18-34.1) | 102.8 (89.3-128.1) | 1.7922 (1.2322-3.165) |
| 0.2 | 30 | 21.1 (15.8-29.9) | 55.7 (48.5-69.3) | 1.1145 (0.7611-1.9682) |
| 0.2 | 40 | 19.3 (14.5-27.3) | 35 (30.6-43.5) | 0.7766 (0.5268-1.3714) |
| 0.2 | 50 | 18 (13.5-25.5) | 23.8 (20.8-29.5) | 0.567 (0.3847-1.0081) |
| 0.5 | 5 | 52.7 (38.9-74.4) | 977.1 (830.2-1232.8) | 8.4064 (5.7027-14.7466) |
| 0.5 | 10 | 41.6 (30.9-58.8) | 375.7 (322.9-472.4) | 4.0001 (2.7136-7.0171) |
| 0.5 | 20 | 32.9 (24.6-46.8) | 139.2 (120.7-175.2) | 1.8408 (1.2571-3.2727) |
| 0.5 | 30 | 28.9 (21.6-40.8) | 75.5 (65.6-94.2) | 1.1371 (0.7766-2.0081) |
| 0.5 | 40 | 26.4 (19.6-37.3) | 47.5 (41.2-59.3) | 0.7923 (0.5339-1.3992) |
| 0.5 | 50 | 24.6 (18.3-34.8) | 32.2 (28.1-40.2) | 0.5785 (0.3872-1.0285) |

Table 3 shows the corresponding optimal two-scale design dimensions obtained with various values of primary channel width. Interestingly, the doubling of primary channel width is shown to affect the terminal secondary channel width and secondary channel spacing in a manner that is nearly identical to the doubling of electrode permeability shown in Table 2. Primary channel spacing, however, scales in direct proportion to the primary channel width. There are also other variations in the associated terminal design parameters.

TABLE 3

Terminal optimal two-scale design dimensions versus macroporosity predicted with 0.2 μm$^2$ porous electrode permeability and 0.1 m electrode length for different primary channel widths. The values of secondary width, secondary spacing, and primary spacing first show the corresponding values that define the terminal point on the Pareto front, while each range of dimensions in parentheses indicates the range of values that produce minimum flow path lengths within 10% of that of the terminal point.

| primary width (μm) | macro-porosity via channels (%) | secondary width (μm) | secondary spacing (μm) | primary spacing (mm) |
|---|---|---|---|---|
| 62.5 | 5 | 30.9 (22.8-43.9) | 570.3 (483.8-725.4) | 4.2697 (2.8868-7.5396) |
| 62.5 | 10 | 24.4 (18.1-34.7) | 219.5 (187.8-278.1) | 2.0252 (1.3794-3.5762) |
| 62.5 | 20 | 19.4 (14.4-27.4) | 81.7 (70.4-102.6) | 0.9395 (0.6352-1.6469) |
| 62.5 | 30 | 17 (12.7-24.1) | 44.3 (38.2-55.4) | 0.5814 (0.3931-1.0266) |
| 62.5 | 40 | 15.5 (11.5-22) | 27.8 (24-34.9) | 0.3989 (0.2697-0.7149) |
| 62.5 | 50 | 14.4 (10.7-20.5) | 18.8 (16.3-23.7) | 0.2925 (0.1963-0.5243) |
| 125 | 5 | 38.3 (28.5-54.1) | 719.1 (618.1-902.2) | 8.0756 (5.5151-14.1663) |
| 125 | 10 | 30.3 (22.7-42.8) | 276.1 (239.7-345.4) | 3.8685 (2.6419-6.7862) |
| 125 | 20 | 24.1 (18-34.1) | 102.8 (89.3-128.1) | 1.7922 (1.2322-3.165) |
| 125 | 30 | 21.1 (15.8-29.9) | 55.7 (48.5-69.3) | 1.1145 (0.7611-1.9682) |
| 125 | 40 | 19.3 (14.5-27.3) | 35 (30.6-43.5) | 0.7766 (0.5268-1.3714) |
| 125 | 50 | 18 (13.5-25.5) | 23.8 (20.8-29.5) | 0.567 (0.3847-1.0081) |
| 250 | 5 | 47.9 (35.8-67.2) | 907 (788.6-1126.8) | 15.6597 (10.7331-27.1871) |
| 250 | 10 | 37.9 (28.3-53.5) | 348.5 (304.1-433.8) | 7.4899 (5.1335-13.1602) |
| 250 | 20 | 30.1 (22.5-42.6) | 129.5 (113.2-160.7) | 3.4975 (2.3971-6.1822) |
| 250 | 30 | 26.6 (19.9-37.3) | 70.3 (61.7-86.9) | 2.2041 (1.4927-3.8496) |
| 250 | 40 | 24.3 (18.2-34.1) | 44.3 (38.9-54.6) | 1.5289 (1.0354-2.6864) |
| 250 | 50 | 22.7 (17-31.8) | 30 (26.4-37) | 1.1194 (0.7581-1.9786) |

As discussed, the geometry of terminal two-scale hierarchical designs varies strongly with primary channel width and porous electrode permeability, while being practically invariant with changes to electrode length. Based on these findings, the following discusses an analysis using dimensional similitude, where the relationships between terminal geometric parameters and other essential parameters, including macroporosity via channels, primary channel width, and electrode permeability, are simplified to allow for improved or optimal design parameters to be non-dimensionalized. This yields certain relatively general design guidelines, at least in the case of two-scale hierarchical networks with tapered, interdigitated channels. Similar simplification of parameters may be done for two-scale hierarchical networks incorporating channels of other shapes or a combination of one or more shapes. Similar simplification of parameters may also be done for higher-scale hierarchical networks that incorporate tapered, interdigitated channels or channels of other shapes or a combination of one or more shapes.

Similarity variables may be defined for each parameter that are made non-dimensional through appropriate normalization using primary channel width as a characteristic length scale, namely, where (i) electrode permeability is divided by a value based on the primary channel width (e.g., one-twelfth of the square of the primary channel width), (ii) electrode length is divided by primary channel width, and (iii) terminal geometric parameters are divided by primary channel width. Using this approach, non-dimensional versions of all terminal geometric parameters were obtained as a function of all non-dimensional parameters that constrain their design, including electrode permeability, primary channel width, macroporosity, and electrode length. FIG. 5C shows non-dimensional similarity variables that define the geometry of terminal two-scale hierarchical designs, as a function of macroporosity, in accordance with various aspects described herein. Different curves are shown for different values of non-dimensionalized electrode permeability. The results shown in FIG. 5C include upper and lower bounds determined based on the same criteria used to determine ranges in the above-described analysis (i.e., all designs having minimum flow path length within 10% of the terminal configuration). As depicted in FIG. 5C, in the limit of large macroporosity, the primary channel spacing (labeled 1$^{st}$ spacing) approaches a certain finite value, provided that electrode permeability is sufficiently small. This is a very useful result, as it indicates robustness in the selection of primary channel width, irrespective of macroporosity, based on the magnitude of electrode permeability. Further, in the limit of very low electrode permeability, the secondary width (labeled 2$^{nd}$ width, and normalized by primary width as indicated above) at large macroporosity approaches a constant value of 0.053 (0.040-0.074 as a range).

As can be seen, as electrode permeability is increased to relatively high non-dimensional values, smaller macroporosity levels become infeasible due to the relative ineffectiveness in the functioning of two-scale hierarchical networks embedded in highly porous electrodes. However, upon inspection of FIG. 5C, it can also be seen that the non-dimensional versions of secondary spacing (2nd spacing) and primary spacing (1st spacing) decrease strongly with increasing macroporosity. To determine estimates for the scaling of secondary channel spacing and primary channel spacing in the limit of high macroporosity $v_{ma}$, these two parameters were multiplied by macroporosity (FIG. 5D). FIG. 5D shows macroporosity-scaled non-dimensional similarity variables for terminal two-scale hierarchical designs, as a function of macroporosity, in accordance with various aspects described herein. Different curves are shown for different values of non-dimensionalized electrode permeability. As depicted in FIG. 5D, in the limit of large macroporosity, the secondary spacing multiplied by macroporosity approaches a constant value of 0.035 (0.031-0.043 as a range), provided that electrode permeability is sufficiently small. In contrast, the primary spacing multiplied by macroporosity exhibits linear variation with macroporosity in the limit of large macroporosity. However, we note that after macroporosity, secondary channel width, secondary channel spacing, and primary channel width are chosen for a certain design, primary channel spacing is not an independent parameter. That is, primary channel spacing results from the choice of those four design parameters. Hence, it is arguably less important to derive a simplistic design criterion for primary channel spacing, given that the design criteria for the other four parameters have been derived.

In scenarios where interdigitated channels are used in which the viscosity and/or density of the fluids flowing into and out of the electrode are substantially different (e.g., viscosity and/or density of the fluids flowing into the electrode are different from the viscosity and/or density of the fluids flowing out of the electrode by more than a threshold amount), inlet and outlet channels may be defined with different dimensions so as to cause the pressure gradients along the inlet and outlet channels to be identical or at least as close in magnitude as possible (e.g., within a threshold difference in magnitude). Such a scenario is realized in electrolysis cells for which inflowing fluid is liquid and outflowing fluid is gas, but other scenarios where gas is either produced from a liquid feed or liquid is produced from a gaseous feed are also conceivable. Further, even in electrodes where the inflowing and outflowing fluids are of the same phase, changes in density are possible by virtue of changes in the composition of the fluids themselves, in particular as a result of the electrochemistry taking place within the electrodes. In the electrolysis scenario, the fluid in inlet channels will possess a higher dynamic viscosity μ and higher mass density ρ (and likely a lower volumetric flow rate through the channel) than the fluid in outlet channels. While either straight or tapered channels may be used for both the inlet and outlet channels of such an electrode, the size of the inlet channels may be scaled relative to the outlet channels so as to cause inlet and outlet channels to possess identical pressure gradients (or pressure gradients that are within a threshold difference) along the respective channels. To determine a quantitative criterion for such a design condition, we consider that the pressure gradient Δp/s along a given channel scales in the following manner:

$$\frac{\Delta p}{s} \sim \frac{\mu \cdot \dot{V}}{f \cdot h \cdot l}, \quad \text{(Eq. 11)}$$

where $\dot{V}$ is volumetric flow rate through the channel, μ is dynamic viscosity, and the remaining parameters carry the same meaning based on the definitions already given. Recognizing that the reactant (inflowing) fluid is converted to product (outflowing) fluid subject to conservation of total mass, it can readily be shown that volumetric flow rate is inversely related to fluid density ρ:

$$\frac{\dot{V}_{in}}{\dot{V}_{out}} = \frac{\rho_{out}}{\rho_{in}}. \quad \text{(Eq. 12)}$$

Consequently, the following condition can be derived to relate the dimensions of the outlet and inlet channels that are required to equalize (or near equalize) their pressure gradients, subject to the kinematic viscosity v≡μ/ρ of fluid in the respective channels:

$$\left.\frac{v}{f \cdot h \cdot l}\right|_{in} = \left.\frac{v}{f \cdot h \cdot l}\right|_{out}. \quad \text{(Eq. 13)}$$

By defining certain design constraints for channel width h and channel depth l, it can be shown that the ratio of the dimensions of inlet and outlet channels scale with the ratio of kinematic viscosity to a certain power that depends on the magnitude of h relative to l:

(a) If the channel width h is much smaller than the channel depth l(such that $f \approx h^2/12$) and the channel width is varied while holding the depth constant among the inlet and outlet channels, then the associated power would be ⅓. Similarly, if the channel depth l is much smaller than the channel width h (such that $f \approx l^2/12$) and the channel depth is varied while holding the depth constant among the inlet and outlet channels, then the associated power would be ⅓.

(b) If the channel width h is much bigger than the channel depth l (such that $f \approx l^2/12$) and the channel width is varied while holding the depth constant among the inlet and outlet channels, then the associated power would be 1 (i.e., unity). Similarly, if the channel depth/is much larger than the channel width h (such that $f \approx h^2/12$) and the channel depth is varied among the inlet and outlet channels, then the associated power would be 1 (i.e., unity).

(c) If the channel width h and channel depth l are varied in proportion among the inlet and outlet channels or if another channel cross-section (e.g., a circle, semi-circle, or equilateral triangle) is used wherein its major and minor dimensions are varied in proportion among the inlet and outlet channels, then the associated power would be ¼.

For instance, considering that hydrogen gas has a kinematic viscosity of $1.11\times10^{-4}$ $m^2/s$ at 27° C. and that liquid water has a kinematic viscosity of $8.58\times10^{-7}$ $m^2/s$ at 27° C., the channels for the gas may be five-fold that of the channels for liquid, provided that either (1) depth is held constant and width is much smaller than depth or (2) width is held constant and depth is much smaller than width.

In various embodiments, whether tapered or straight interdigitated channels are utilized in the finest scale of hierarchical networks, these channels may be defined with fixed, arbitrary cross-section that span the entire expanse between inlet and outlet channels of the next finest scale, rather than having a gap between the tip of such finest channels and the edge of the next finest scale of channels (e.g., in FIG. 2K, the gap between 244*p* of a secondary outflow channel 244 and an edge of a primary inlet channel 232 or the gap between 242*e* of a secondary inflow channel 242 and an edge of a primary outlet channel 234). Hereafter, such channels are referred to as capillaries by way of analogy with vascular networks in biological organisms. As a result, flow at the finest scale would occur to (e.g., only) a limited extent through the unpatterned porous electrode material but would instead be directed through such capillaries for it traverse from inlet to outlet channels of the next finest scale. Such a hierarchical network could be particularly useful in contexts where solid precipitates are expected to form as a result of the electrochemistry occurring within the electrodes or in contexts where microparticles (e.g., those particles constituting turbidity) are dispersed in the inflowing solution. Here, the size of capillaries can be chosen so as to facilitate the transmission of such microparticles while dispersed in either the inflowing or outflowing fluid, thus making the process more robust by preventing scaling, fouling, and pore blockage.

It is to be understood and appreciated that, although various of the drawing figures are described herein as pertaining to various processes and/or actions that are performed in a particular order, some of these processes and/or actions may occur in different orders and/or concurrently with other processes and/or actions from what is depicted/described above. Moreover, not all of these processes and/or actions may be required to implement the systems and/or methods described herein.

Any use of the terms "first," "second," and so forth, in the claims, unless otherwise clear by context, is for clarity only and doesn't otherwise indicate or imply any order in time. For instance, "a first determination," "a second determination," and "a third determination" does not indicate or imply that the first determination is to be made before the second determination, or vice versa, etc.

While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative (rather than in a restrictive) sense.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A porous electrode, comprising:

a porous layer; and a pattern of flow channels defined in the porous layer, wherein a first flow channel in the pattern of flow channels has a shape that is a combination of profiles, including a linear profile, in which a width of the first flow channel varies linearly with position in a longitudinal direction of the first flow channel, that transitions to a cube-root profile, in which the width of the first flow channel varies with a cube-root of position in the longitudinal direction of the first flow channel.

2. The porous electrode of claim 1, wherein the pattern of flow channels comprises an interdigitated arrangement of inlet flow channels and outlet flow channels.

3. The porous electrode of claim 1, wherein a portion of the first flow channel that has the linear profile is longer than a portion of the first flow channel that has the cube-root profile.

4. The porous electrode of claim 1, wherein the linear profile transitions to the cube-root profile in a continuous manner or in one or more discrete steps.

5. The porous electrode of claim 1, wherein the shape of the first flow channel is defined based on selected dimensions of an inlet of the first flow channel.

6. The porous electrode of claim 1, further comprising:

an impervious substrate to which the porous layer is affixed.

7. The porous electrode of claim 6, wherein the impervious substrate comprises a second pattern of flow channels defined therein.

8. The porous electrode of claim 1, wherein a second flow channel in the pattern of flow channels also has the shape that is the combination of the profiles.

9. The porous electrode of claim 1, wherein a portion of the first flow channel that has the cube-root profile has an optimal end-width of zero.

10. The porous electrode of claim 1, wherein a portion of the first flow channel that has the cube-root profile is truncated such that the width at an end of the first flow channel has a finite value other than zero.

11. The porous electrode of claim 1, wherein the porous electrode is included in a system having a second porous electrode.

12. The porous electrode of claim 11, wherein the second porous electrode includes:

a second porous layer; and a second pattern of flow channels defined in the second porous layer, wherein a second flow channel in the second pattern of flow channels also has the shape that is the combination of the profiles.

13. The porous electrode of claim 11, wherein the system includes a separator disposed between the porous electrode and the second porous electrode, and wherein the system is included as part of a reduction-oxidation (redox) flow battery, a fuel cell, an electrolysis cell, or another apparatus configured to facilitate enzymatic reactions, electrochemical separation processing, metal recovery processing, or purification processing.

14. The porous electrode of claim 1, wherein a portion of the first flow channel that has the linear profile is shorter than a portion of the first flow channel that has the cube-root profile.

15. A porous electrode, comprising:

a porous layer; and a pattern of flow channels defined in the porous layer, wherein a shape of a first portion of a first flow channel in the pattern of flow channels has a cube-root profile in which a width of the first flow channel varies with a cube-root of position in a longitudinal direction of the first flow channel.

16. The porous electrode of claim 15, wherein the pattern of flow channels comprises an interdigitated arrangement of inlet flow channels and outlet flow channels.

17. The porous electrode of claim 15, wherein a shape of a second portion of the first flow channel has a linear profile, and wherein the second portion of the first flow channel is longer than the first portion of the first flow channel.

18. The porous electrode of claim 15, wherein a shape of a second portion of the first flow channel has a linear profile, and wherein the second portion of the first flow channel is shorter than the first portion of the first flow channel.

19. A porous electrode, comprising:

a porous layer; and a pattern of flow channels defined in the porous layer, wherein a first flow channel in the pattern of flow channels has a shape that is a combination of profiles, including a linear profile, in which a width of the first flow channel varies linearly in a longitudinal direction of the first flow channel, that transitions to a cube-root profile, in which the width of the first flow channel varies with a cube-root of position in the longitudinal direction of the first flow channel, and wherein a length of a portion of the first flow channel that has the linear profile is different from a length of a portion of the first flow channel that has the cube-root profile.

20. The porous electrode of claim 19, wherein a depth of the first flow channel varies along at least a portion of the first flow channel.

* * * * *